United States Patent [19]

Hio et al.

[11] Patent Number: 5,533,905
[45] Date of Patent: Jul. 9, 1996

[54] UNIT INTEGRATED SYSTEM AND CONNECTOR

[75] Inventors: Masahide Hio; Takao Nozaki, both of Yokkaichi; Hitoshi Hashiba, Osaka; Isao Isshiki, Osaka; Yoshiharu Nakai, Osaka; Seiji Ueda, Osaka; Itaru Wada, Osaka, all of Japan

[73] Assignees: Sumitomo Wiring Systems, Ltd.; Sumitomo Electric Industries, Ltd., both of Japan

[21] Appl. No.: 282,053

[22] Filed: Jul. 28, 1994

[30] Foreign Application Priority Data

| Jul. 29, 1993 | [JP] | Japan | 5-208423 |
| Jul. 30, 1993 | [JP] | Japan | 5-208656 |
| Jul. 30, 1993 | [JP] | Japan | 5-208713 |
| Jul. 30, 1993 | [JP] | Japan | 5-208841 |
| Jul. 30, 1993 | [JP] | Japan | 5-208845 |
| Jul. 30, 1993 | [JP] | Japan | 5-208851 |
| Aug. 2, 1993 | [JP] | Japan | 5-211007 |
| Aug. 3, 1993 | [JP] | Japan | 5-212227 |
| Aug. 3, 1993 | [JP] | Japan | 5-212242 |
| Aug. 4, 1993 | [JP] | Japan | 5-213388 |
| Aug. 4, 1993 | [JP] | Japan | 5-213390 |

[51] Int. Cl.$^6$ ................................................. H05K 5/06
[52] U.S. Cl. ................................ 439/76.2; 361/752
[58] Field of Search .................... 439/34, 76, 76.2; 361/752, 833, 736, 646, 648, 775

[56] References Cited

U.S. PATENT DOCUMENTS

| 4,059,739 | 11/1977 | Girismen | 200/51.09 |
| 4,555,638 | 11/1985 | Lobe | 361/752 |
| 4,685,753 | 8/1987 | Isshiki et al. | 439/74 |
| 4,850,884 | 7/1989 | Sawai | 361/752 |
| 4,944,684 | 7/1990 | Leibowitz | 361/792 |
| 5,022,717 | 6/1991 | Heibel et al. | 303/119 |
| 5,038,050 | 8/1991 | Minoura | 361/833 |
| 5,137,455 | 8/1992 | Moerbe et al. | 439/34 |
| 5,174,787 | 12/1992 | Shirai et al. | 439/489 |
| 5,253,143 | 10/1993 | Klinger et al. | 361/736 |
| 5,288,141 | 2/1994 | Isshiki | 439/34 |
| 5,374,777 | 12/1994 | Hofmann | 439/346 |

FOREIGN PATENT DOCUMENTS

| 0519736 | 12/1992 | European Pat. Off. . |
| 8910805 | 2/1991 | Germany . |
| 8900298 | 3/1989 | WIPO . |

Primary Examiner—Neil Abrams
Attorney, Agent, or Firm—Jordan B. Bierman; Bierman and Muserlian

[57] ABSTRACT

A connector having terminal groups (222) intended to carry a large current from a source of electrical power to an actuator for a hydraulic unit. The connector also has another terminal group (223) for a smaller current which is electrically connected to components of an electronic control unit (2) for hydraulic unit (1). Connector housing (221) is provided with base plate (221a) which carries terminal groups (222 and 223) and tubular housing body (221b) encloses both terminal groups (222 and 223). The terminals of both groups are joined at their outer ends to a harness-side connector (219) and at their inner ends the terminal group (222) is joined by wiring (224) to a motor (205) and the terminal group (223) is joined to a printed board (209). The board (209) along with a junction block (210) are housed within a pair of case elements (213a and 213b). There is also disclosed a unit integrated system wherein a hydraulic unit (1), having an upper surface (3a) defining an oil inlet, and an electronic control unit (2) for controlling the drive of the hydraulic unit (1) are integrated in juxtaposition to each other in such a manner that an upper surface (2a) of the electronic control unit is located at a position equal to or lower than the upper surface (3a) of the hydraulic unit (1), whereby an operating space (35) of a piping tool is insured above the electronic control unit (2).

7 Claims, 58 Drawing Sheets

UNIT INTEGRATED SYSTEM AND CONNECTOR

BACKGROUND OF THE INVENTION

1. Field of the Invention

The present invention relates to an improvement in a unit integrated system including an electronic control unit and a hydraulic unit which are formed integrally and to a connector for a vehicle-mounted system such as an ABS (antilock brake system), a TCS (traction control system) and the like.

2. Description of the Prior Art

One of the systems for enhancing the safety of automotive vehicles is an ABS for preventing wheel lock when the brakes are applied suddenly or on a slippery road. In general, conventional ABSs have been constructed such that a hydraulic unit is disposed in the engine room and an electronic control unit is disposed in the cabin, for example, under seats or within front panels.

However, separate provision of the hydraulic unit in the engine room and the electronic control unit in the cabin requires wiring harnesses extending from the engine room to the cabin for electrical connection between the hydraulic unit and the electronic control unit, resulting in elongated wiring harnesses and complicated operation of laying the harnesses.

Recently, it has been proposed to provide the electronic control unit and hydraulic unit which are integrated together in the engine room for reduction in length of the wiring harnesses and simplification of the laying operation of the harnesses in an assembly line. Such an integrated system is disclosed in, for example, Japanese Patent Application No. 3-177132 (1991).

In the above-mentioned system in which the hydraulic unit and the electronic control unit are integrated, mere combination of the two units causes difficulty in pouring oil into the hydraulic unit, depending upon size and positions of the two units.

Typically, oil is poured into the hydraulic unit through a hydraulic pipe connected to an oil inlet provided on an upper surface of the hydraulic unit. As shown in FIG. 19, for system size reduction, an electronic control unit 102 is assembled to the hydraulic unit 101 having the oil inlet on its upper surface in juxtaposition with each other. In the assembling, if an upper surface 102a of the electronic control unit 102 is higher than an upper surface 103a of the hydraulic unit 101, since connection of a hydraulic pipe 134 to the oil inlet of the hydraulic unit 101 with an existing spanner-shaped piping tool (not-shown) necessitates a space enclosed by broken lines 135 of FIG. 19 for operation of the tool, the piping tool interferes with an upper part 102b of the electronic control unit 102 extending upwardly above the upper surface 103a of the hydraulic unit 101, resulting in impracticable piping connection. One of the solutions of this problem is the use of a separately developed piping tool for exclusive use, which however requires additional labor and costs.

Further, in the conventional assembly of the hydraulic unit as shown in FIG. 20, a flow control valve 105 and a solenoid 106 for opening and closing oil passages are mounted in a housing 103 defining the suitable oil passages, and a positioning sleeve 113 of a predetermined height L and a base plate 107 are fixed to the housing 103 by fixing bolts 129, whereby the flow control valve 105 and the solenoid 106 are mounted so that they are located in predetermined positions.

As disclosed in Japanese Patent Application No. 3-177132, a mounting portion formed in the electronic control unit is bolted in a predetermined mounting position of the hydraulic unit, to integrally form the electronic control unit and the hydraulic unit.

This requires the separate mounting portions for the electronic control unit and the hydraulic unit, and the fixing bolts and work thereof, resulting in increased size and cost.

Further, the structure disclosed in Japanese Patent Application No. 3-177132 is adapted such that a connector mounted to an end of wiring harnesses extending from the hydraulic unit is electrically connected to a group of terminals of the electronic control unit. For the purpose of insuring a waterproofing property, the connector should be a waterproof connector. However, the waterproof connector is costly and large-sized, which causes increased costs and increased size of the structure.

Another conventional unit integrated system is shown in FIG. 21 wherein the electronic control unit 102 is merely coupled to the hydraulic unit 101 on its first major surface 140. This unit integrated system has a relatively large size in a direction X in which the hydraulic unit 101 and the electronic control unit 102 are arranged, which is a significant hindrance to size reduction. This results from a large size, in the X direction, of the electronic control unit 102 which includes a junction block 110 connected to a relay 112 and disposed adjacent the major surface 140 of the hydraulic unit 101, and a printed board 109 having a control circuit incorporated therein and disposed in parallel with the junction block 110, the junction block 110 and the printed board 109 being arranged in the X direction.

The foregoing unit integrated system may achieve size reduction by integration of the hydraulic unit 101 and the electronic control unit 102, but does not meet the requirement of further size reduction because of its large size in the X direction.

Referring to FIG. 21, the electronic control unit 102 further includes a case 160 (170) which houses and protects the junction block 110 connected to the relay 112 and electronic components such as the control circuit built-in printed board 109.

FIG. 22 is an exploded perspective view of the conventional case. The case 160 includes divided case elements 161, 162 permitted to be integrated. Through holes 163 are formed in the four corners of the divided case element 161, and through holes 164 are formed in the divided case element 162 in corresponding relation to the through holes 163. The divided case element 162 is finished in the form of a thin plate and has a groove (not shown) on its one major surface. A sealing member 165 is fitted in the groove. After the engagement of the divided case elements 161, 162, with the electronic components housed within the divided case element 161, four screws 166 are inserted in the through holes 163, 164 from above the divided case element 161 and tightened with nuts 167 from below the divided case element 162. Then the divided case elements 161, 162 are integrated into the electronic control unit 102.

FIG. 23 is an exploded perspective view of another conventional case. The case of FIG. 23 is substantially similar in construction to the case of FIG. 22 except that a divided case element 172 is finished in the form of a cup and includes an outer peripheral portion 172a having female threaded portions 174 corresponding to through holes 173 formed in the four corners of a divided case element 171, and a sealing element 175. Like reference numerals are used herein to designate parts corresponding to those of FIG. 22, and description thereof will be omitted.

In the case of FIG. 22, however, the nuts 167 project from the divided case element 162, and the projecting portions (forward ends of the screws 166 and the nuts 167) from the case 160 are obstacles in designing when the electronic control unit 102 and the hydraulic unit 101 are integrated. A need exists to determine the configuration of the hydraulic unit 101 so as not to interfere with the projecting portions, thereby lowering the degree of designing freedom. A space for the projecting portions are further required.

On the other hand, the case of FIG. 23 is adapted such that the female threaded portions 174 in the outer peripheral portion 172a of the divided case element 172 are provided to tighten screws 176, and has no portion projecting from the case 170, thereby solving the problem. However, the provision of the female threaded portions 174 requires a relatively great height of the outer peripheral portion 172a in the longitudinal direction X of the screws 176, resulting in increased size of the case 170 in the X direction. Further, the provision of the sealing member 175 in the outer peripheral portion 172a with a given strength or more insured requires a relatively great thickness t of the outer peripheral portion 172a, which is a significant hindrance to the size reduction of the case 170.

The relatively long screws 166, 176 are needed for the cases 160, 170 of FIGS. 22 and 23. For this reason, the cases 160 and 170 cannot employ commercially available general-purpose screws but require the screws 166, 176 for exclusive use which are a factor of increased cost.

A braking control device such as the ABS has been constructed as shown in FIG. 24, for example.

Referring to FIG. 24, a power supply terminal of an electronic control unit 152 is connected to a positive terminal of a battery +B having a grounded negative terminal through an ignition switch 151. A fail-safe make-break relay 153 includes a relay coil having a first end connected to the positive terminal of the battery +B through the ignition switch 151 and a second end connected to a control output terminal of the electronic control unit 152. The fail-safe relay 153 has a make contact connected directly to the positive terminal of the battery +B and a break contact grounded. A braking load 154 such as a solenoid for controlling a brake fluid pressure has a first end connected to a common terminal of the fail-safe relay 153 and a second end connected to a load control output terminal of the electronic control unit 152. A warning lamp 155 has a first end connected to the positive terminal of the battery +B through the ignition switch 151 and a second end connected to the common terminal of the fail-safe relay 153 through the anode and cathode of a back-flow checking diode 156.

The electronic control unit 152 is generally disposed within the cabin whereas the fail-safe relay 153 and the braking load 154 are disposed in the engine room. Thus connection of the electronic control unit 152 to the fail-safe relay 153, braking load 154, and ignition switch 151 is made by a wiring harness and a connector 157 shown in dashed-and-dotted line in FIG. 24.

The electronic control unit 152 receives an output signal from a wheel speed sensor for detecting the rotational speed of the respective wheels and various switch signals. For example, the electronic control unit 152 calculates the control amount of the solenoid 154 serving as a load in response to the output of the wheel speed sensor to electrify and drive the solenoid 154 through the make contact of the fail-safe relay 153 in accordance with the control amount.

In such a construction, if no electrical connection is made because the connector 157 is not connected or an abnormality occurs within the electronic control unit 152, the excitation of the relay coil of the fail-safe relay 153 is released and the common terminal of the fail-safe relay 153 is connected to the break contact. Then current flows from the battery +B through the ignition switch 151, the warning lamp 155, the diode 156 and to the common terminal and the break contact of the fail-safe relay 153, and the warning lamp 155 lights up, signalling the unconnected condition of the connector 157.

Recently, there has been an increasing demand to insure a possibly large interior space within the cabin whereas the types of the electronic control unit have increased with better performance of the automotive vehicles. The provision of the electronic control unit 152 within the cabin and the provision of the fail-safe relay 153, solenoid 154 within the engine room increase the wiring harnesses for connection between the cabin and the engine room, causing difficulty in meeting the requirement of insuring a large interior space within the cabin.

To meet the requirement, as shown in FIG. 25, a control circuit 152a and the fail-safe relay 153 are formed into the electronic control unit 152 which is then integrated with the braking load 154, and the integrated unit is disposed in the engine room.

Since the electronic control unit 152 containing the fail-safe relay 153 is placed in the engine room, the need for the warning lamp 155 of FIG. 24 is eliminated. In FIG. 25, the warning lamp 155 and diode 156 of FIG. 24 are not shown, and the break contact of the fail-safe relay 153 is grounded.

As shown in FIG. 25, the electronic control unit 152 is connected to the battery +B, the ignition switch 151, the solenoid 154, and the sensor by a single connector (indicated by open circles of FIG. 25).

In the arrangement of FIG. 25, the make-break relay is used as the fail-safe relay 153 although the warning lamp 155 is not adapted to light up by using the break contact of the fail-safe relay 153 as shown in FIG. 24. The fail-safe relay 153 is very costly, and no means indicates the unconnectedness of the connector, if occur.

In general, for feeding power or an electric signal to components within a device from the exterior of the device, a connector is mounted on a box-shaped element of the device for connection to external lines to feed power or electric signal to the components from a connecting terminal of the connector.

The connector, as shown in FIG. 58, includes a housing 751 mounted on a box-shaped element A and made of an insulative resin, and a connecting terminal 752 held by and housed in the housing 751. Connection to the components in the box-shaped element A, for example a junction block, is made through lines such as wiring harnesses 753 as shown in FIG. 58. After one end of the harnesses 753 is connected to the component, the other end of the harnesses 753 is housed in a connector housing 154 and is connected to a connector receiving portion 755.

The prior art connector, however, connects the external lines and the components within the device in one-to-one corresponding relation. Two pairs of components to be connected inside and outside the device reasonably require two connectors. The connector of FIG. 58 results in an increased number of components and an increased number of assembling steps for connection of the connectors.

This type of connector may be constructed such that the connector housing made of an insulative resin for housing and holding the connecting terminal is mounted on the box-shaped element of the device while being exposed to the exterior of the device, and the terminals of the connector and the components are connected by soldering or the like within the device.

Unfortunately, such a connector cannot readily make the connection of the terminals of the connector and the components within the device by soldering. The result is an increased number of connecting steps between the connector and the components within the device.

Further, in the connector of FIG. 58, since the components within the device are connected by lines such as the wiring harnesses 753, it is necessary to initially connect one end of the harnesses 753 to the components and thereafter to house the other end of the harnesses 753 in the connector housing 754 and connect it to the connector receiving portion 755. This necessarily increases the number of components and the number of assembling steps.

In the above-mentioned case, the connection of the connector and the electrical components is often made by using a junction block in terms of reduction in the number of lines of the wiring harnesses for connection, decrease in diameter of the wiring harnesses by joint reduction, and facilitation of fabrication. The connection is often made through the junction block in the case where the junction block is not particularly required.

This is because the connection of the connector and the components without using the junction block increases the number of connectors for connection, resulting in increased costs, an increased number of assembling steps, and deterioration of working efficiency.

However, the constant connection through the junction block, if not required, causes the junction block to grow larger more than necessary and increases the amount of bus bars to be used. The result is increased costs of the junction block itself, and a large area of the junction block in the device.

Further, the connector for connecting the electrical components by the lines such as the harnesses 753 as shown in FIG. 58 requires some space for connection. It is difficult to connect the electrical components positioned very close to the connector.

In particular, connection by the harnesses is made in such a manner that the harnesses are initially connected to one of the connector and the electrical components and then connected to the other. This necessarily increases the number of assembling steps.

SUMMARY OF THE INVENTION

According to the present invention, a unit integrated system comprises: a hydraulic unit having an upper surface defining an oil inlet, and an electronic control unit for controlling drive of the hydraulic unit, the hydraulic unit and the electronic control unit being integrated together in juxtaposition with each other, the electronic control unit having an upper surface located at a level equal to or lower than the upper surface of the hydraulic unit.

As above stated, according to the unit integrated system of the present invention, the upper surface of the electronic control unit is located at a level equal to or lower than the upper surface of the hydraulic unit. When a hydraulic pipe is connected to the oil inlet in the upper surface of the hydraulic unit, an operating space for a piping tool is insured above the electronic control unit. The hydraulic pipe is securely connected to the oil inlet of the hydraulic unit by using the existing spanner-shaped piping tool without interference of the tool with an upper portion of the electronic control unit.

In a second aspect of the present invention, the unit integrated system comprises: a hydraulic unit including a solenoid, an electronic control unit including a control circuit electrically connected to the solenoid and a case for housing the control circuit, an assembling structure element for the electronic control unit formed integrally with the case of the electronic control unit, and fixing means for fixing the assembling structure element to the hydraulic unit while being inserted through the assembling structure element to integrate the hydraulic unit and the electronic control unit together.

According to the second aspect of the present invention, the assembling structure element of the hydraulic unit is formed integrally with the case of the electronic control unit, and the hydraulic unit is mounted integrally to the electronic control unit by using the assembling structure element. This provides the combined use of the members and the size reduction of the whole structure.

Further, the combined use of the members contributes to reduction in the number of fixing bolts and in working cost, thereby achieving reduction in production costs.

Preferably, the solenoid and the control circuit are electrically connected to each other by a wiring harness, the case of the electronic control unit including a through hole for receiving the wiring harness, and there is provided a waterproof seal between the periphery of the through hole and the wiring harness.

The wiring harness extending from the solenoid of the hydraulic unit is inserted through the through hole of the case of the electronic control unit and is connected to the control circuit in the electronic control unit, and the waterproof seal is provided between the periphery of the through hole and the wiring harness. This prevents the wiring harness from being drawn around the units and eliminates the need for the use of the waterproof connector. Therefore, the unit integrated system of the present invention achieves size reduction and production cost reduction.

A third aspect of the present invention is intended for a unit integrated system including an electronic control unit having a case defining a through hole and a hydraulic unit having an actuator, the electronic control unit and the hydraulic unit being integrated together, the actuator of the hydraulic unit being electrically connected to a connecting portion in the electronic control unit through a wiring harness. According to the third aspect of the present invention, the unit integrated system comprises: an elastic bushing element fitted in the through hole of the case of the electronic control unit in liquid tight relation and including a harness through hole receiving the wiring harness; and a heat-shrinkable tube adhering to an outer peripheral surface of the elastic bushing element and an outer peripheral surface of the wiring harness.

According to the third aspect of the present invention, the wiring harness having one end connected to the connecting portion of the electronic control unit is inserted through the harness through hole of the elastic bushing element fitted in the through hole formed in the case of the electronic control unit. The other end of the wiring harness extending outwardly of the case is connected to the actuator. The elastic bushing element is fitted in the through hole of the case in liquid tight relation, and the heat-shrinkable tube adheres to the outer peripheral surface of the elastic bushing element and the outer peripheral surface of the wiring harness. This effectively prevents water from permeating into the electronic control unit from between the case and the elastic bushing element and between the elastic bushing element and the wiring harness.

A fourth aspect of the present invention is intended for a unit integrated system including an electronic control unit having a case defining a through hole and a hydraulic unit having an actuator, the electronic control unit and the hydraulic unit being integrated together, the actuator of the hydraulic unit being electrically connected to a connecting portion in the electronic control unit through a wiring harness. According to the fourth aspect of the present invention, the unit integrated system comprises: an elastic bushing element fitted in the through hole of the case of the electronic control unit in liquid tight relation and including a harness through hole receiving the wiring harness; and a circumferential annular sealing ledge for the harness through hole, the sealing ledge being formed integrally with an inner peripheral surface of the harness through hole and adhering to an outer peripheral surface of the wiring harness inserted through the harness though hole.

According to the fourth aspect of the present invention, the sealing ledge formed integrally with the inner peripheral surface of the harness through hole of the elastic bushing element adheres to the outer peripheral surface of the wiring harness, thereby effectively preventing water from permeating into the electronic control unit from between the case and the elastic bushing element and between the elastic bushing element and the wiring harness.

As above described, according to the unit integrated system of the present invention, the connecting portion of the electronic control unit and the actuator of the hydraulic unit can be electrically connected to each other while the waterproofing property of the electronic control unit is insured without the use of the waterproof connector in the system including the electronic control unit and hydraulic unit which are integrated together. This achieves cost reduction and size reduction.

In a fifth aspect of the present invention, the unit integrated system comprises: an electronic control unit having a relay and a control circuit, and a hydraulic unit having a solenoid, the electronic control unit and the hydraulic unit being integrated together, the relay, the control circuit, and the solenoid being electrically connected to each other, the relay being located adjacent a first major surface of the hydraulic unit, the control circuit being located adjacent a second major surface of the hydraulic unit.

According to the fifth aspect of the present invention, the relay and the control circuit forming the electronic control unit are located adjacent the different major surfaces of the hydraulic unit, which contributes to size reduction in the direction of the arrangement of the hydraulic unit and the electronic control unit as compared with a unit integrated system wherein the relay and the control circuit (printed board) are arranged adjacent one major surface of the hydraulic unit in a predetermined direction (in the direction of the arrangement of the hydraulic unit and the electronic control unit).

As above mentioned, according to the unit integrated system of the present invention, the relay forming the electronic control unit is located adjacent one major surface of the hydraulic unit whereas the control circuit forming the electronic control unit is located adjacent another surface of the hydraulic unit, thereby reducing the size of the unit integrated system in the direction of the arrangement of the hydraulic unit and the electronic control unit.

In a sixth aspect of the present invention, the unit integrated system comprises: an electronic control unit and a hydraulic unit integrated together, the electronic control unit including first and second divided case elements formed into an integral configuration, and a plurality of screws for fixing the first and second divided case elements in joined relation, the first divided case element including a plurality of fixing members projecting toward the second divided case element from a surface of the first divided case element opposed to the second divided case element when the first divided case element is integrated with the second divided case element, the second divided case element including a plurality of screw support members projecting outwardly from an outer surface thereof in corresponding relation to the fixing members, the screw support members having screw support holes receiving the screws, respectively, the fixing members including female threaded portions in threaded engagement with the screws inserted into the screw support holes, with the first and second divided case elements joined together.

According to the sixth aspect of the present invention, the screws are inserted into the screw support holes in the screw support members, with the first and second divided case elements in engagement with each other, and the front ends of the screws are put into threaded engagement with the female threaded portions of the fixing members, whereby the first and second divided case elements are joined together.

As above described, the electronic control unit comprises the first and second divided case elements which are finished into the integral configuration. The first divided case element includes the plurality of fixing members, and the second divided case element includes the plurality of screw support members in corresponding relation to the fixing members. The screws are inserted into the screw support holes of the screw support members, with the first and second divided case elements in engagement with each other, and the front ends of the screws are put into threaded engagement with the female threaded portions of the fixing members, whereby the first and second divided case elements are joined together. This provides for size reduction of the electronic control unit with an ensured given strength.

Preferably, the screw support members are provided adjacent the first divided case element so that the longitudinal length of the screws including the fixing members and the screw support members is less than that of the first and second divided case elements joined together.

As above discussed, the provision of the screw support members adjacent the first divided case element allows the screws including the fixing members and the screw support members to have a longitudinal length less than that of the first and second divided case elements joined together. The first and second divided case elements are integrated together by relatively short screws.

In a seventh aspect of the present invention, the unit integrated system comprises: an electronic control unit having a fail-safe relay including a make relay, and a control circuit; a hydraulic unit integrated with the electronic control unit and having a solenoid operated by a control output from the control circuit; a battery; a connector for connecting the fail-safe relay and the control circuit to the solenoid and the battery; alarm means for signalling the unconnectedness of the connector; and conduction means provided in a current conduction path extending from the battery to the alarm means for rendering the current conduction path conductive when the connector is not connected, the fail-safe relay including a relay coil having a first end connected to the battery and a second end connected to the control circuit.

According to the seventh aspect of the present invention, connection of the unit of the fail-safe make relay and the control circuit to the battery and the braking load is made only by one connector. The current conduction path between the battery and the alarm means is made conductive by the conduction means when the connector is in the unconnected condition. Required is the relay which is less expensive than the make-break relay. The number of wiring harnesses is reduced by the unit. The unconnected condition of the connector is indicated by an inexpensive structure. The connection failure of the connector is previously prevented in the automotive assembly line.

The present invention is also intended for a connector provided on a device for electrical connection between the interior and exterior of the device. According to the present invention, the connector comprises: a first terminal group including a plurality of terminals electrically connected to a first component provided within the device; a second terminal group including a plurality of terminals electrically connected to a second component provided within the device; and a connector housing including a base plate for holding the first and second terminal groups, and a tubular housing body formed integrally with the base plate for enclosing the first and second terminal groups.

According to the connector of the present invention, the terminals forming the first terminal group and the terminals forming the second terminal group are housed in one connector housing. If two pairs of components to be connected are located inside and outside the device, two connectors are not required but one connector is sufficient. This is advantageous in reduction in the number of components and the number of assembling steps for connection of the connector.

Preferably, the connector housing includes a connector portion formed on a surface of the base plate on which the housing body is not formed, and the connector portion includes a tubular housing formed integrally with the base plate and enclosing a portion of the first or second terminal group which is directed outwardly of the connector housing.

As above discussed, the connector portion is formed in at least a part of the portion of the first terminal group in the connector housing which portion is directed outwardly of the connector housing. Required is the fitting of the connector portion to the corresponding connector portion of the component without the prior art soldering step. This facilitates the connection between the connector and the component and reduces the number of connecting steps.

Similar effects are provided by providing a relay terminal in at least a part of the first terminal group.

Preferably, the first terminal group is electrically connected to the first component through a wiring harness, and at least some terminals of the first terminal group include terminals electrically connected to an end of the wiring harness.

Since at least the part of the first terminal group is formed by the terminal connected to the end of the wiring harness, required is neither the connector housing which houses the terminal connected to the end of the wiring harness nor the step of connection to the connector housing. The number of components and the number of assembling steps for connection of the connector are reduced.

Preferably, the first component is a junction block provided within the device, and the second terminal group is connected to the second component provided within the device while being inserted through the junction block without electrical contact with the junction block.

According to the connector of the present invention, the terminal inserted through the junction block and connected to the component within the device may be handled in the same manner as the terminal portion of the junction block formed at the bus bar of the junction block. Further, since the terminal connected to the component within the device is not in electrical contact with the junction block, the bus bar for exclusive use is not required.

The connector is constructed so that the terminal connected to the component within the device passes through the junction block and is connected to the component within the device without electrical contact with the junction block. There is no need to provide the bus bar for connecting the component within the device to the outside of the device in the junction block, permitting size reduction of the junction block.

The connector wherein a part of the bus bar of the junction block is used as a part of the terminal housed in the connector reduces the number of components of the connector and reduces the number of assembling steps because it is unnecessary to connect the connector and the junction block by a separate member.

In another aspect of the present invention, the connector comprises: a connector housing fixed and supported by a box element within a device, and a terminal housed and held by the connector housing and electrically connected to a conductive member of a component within the device, the terminal including a part of the conductive member of the component.

As above described, the connector of the present invention is constructed so that a part of the conductive member of the component to be connected is used as the connecting terminal, eliminating the need to provide the separate connecting terminal to the connector and reducing manufacture costs.

Further, it is unnecessary to electrically connect the connector and the component by the separate member, the connector is advantageous in reduction in the number of assembling steps and effective use of the space.

It is a primary object of the present invention to provide a unit integrated system which is capable of performing an oil pouring operation into a hydraulic unit by using an existing piping tool, with the hydraulic unit and an electronic control unit being integrated together in juxtaposition.

It is a more specific object of the invention to provide a unit integrated system which achieves reduction in size and production costs by the combined use of members.

It is another object of the invention to provide a unit integrated system which allows the electronic control unit and the hydraulic unit to be electrically connected to each other without using a waterproof connector.

It is still another object of the invention to provide a unit integrated system which is reduced in size in the direction of the arrangement of the hydraulic unit and the electronic control unit.

It is a further object of the invention to provide a unit integrated system which achieves size reduction of the electronic control unit while insuring a given or more bonding strength of divided case elements of the electronic control unit and which allows the electronic control unit to be assembled with relatively short screws.

It is a still further object of the invention to provide a unit integrated system which is capable of signalling the unconnected condition of a connector with an inexpensive structure.

It is another object of the invention to provide a connector which has a small number of components and which is inexpensive in production cost.

It is still another object of the invention to facilitate connection between the connector and components.

It is a further object of the invention to provide a connector which achieves reduction in production cost by reduction in the number of components.

It is a still further object of the invention to improve a connecting structure of a connector for size reduction of a junction block.

It is another object of the invention to provide a connector which is well adapted for connection to electrical components very close thereto, which includes a small number of components, and which is inexpensive in production cost.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
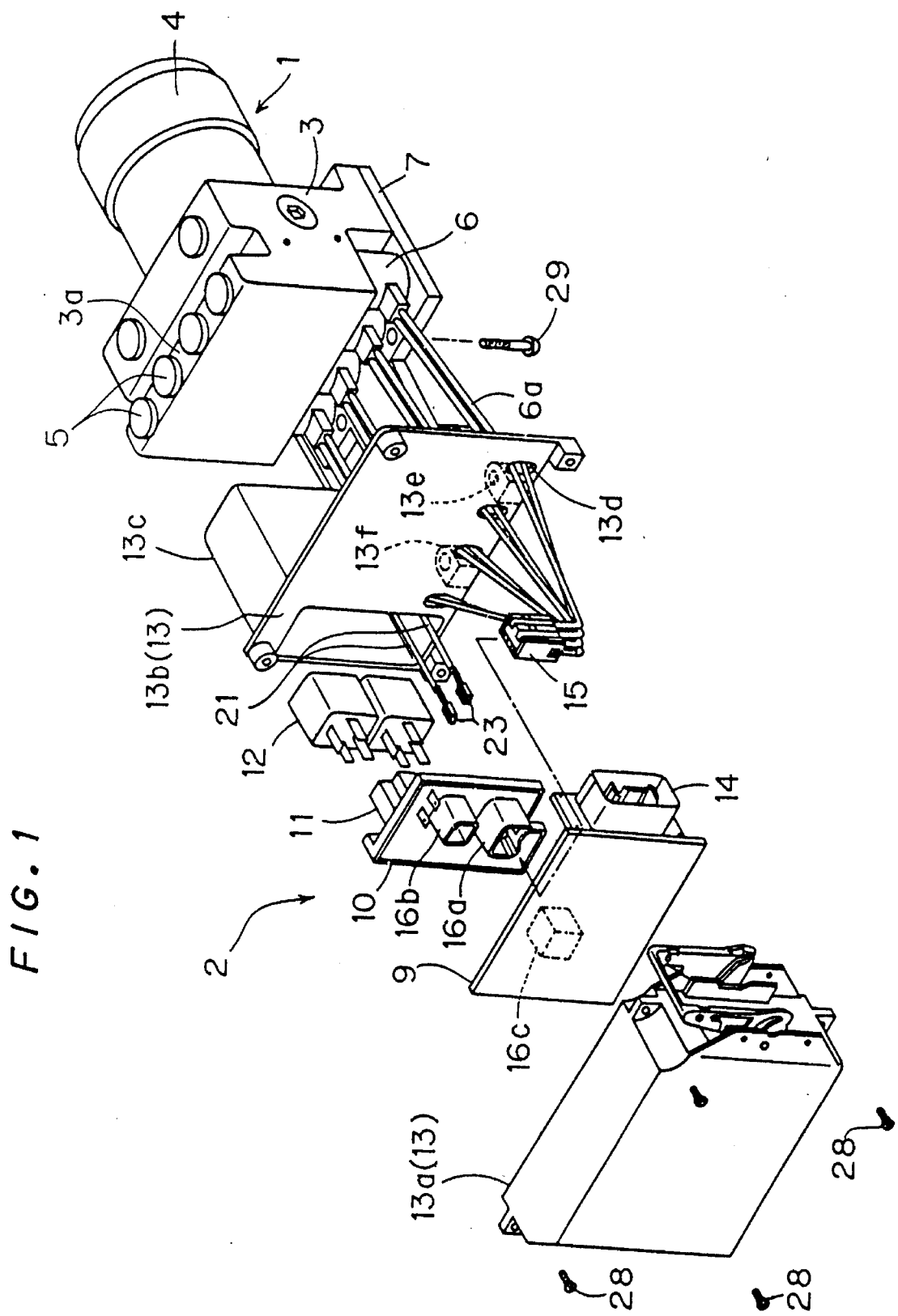
FIG. 1 is an exploded perspective view of a unit integrated system of a preferred embodiment according to the present invention.

A preferred embodiment according to the present invention will be described hereinafter with reference to the accompanying drawings. FIGS. 1 to 18 illustrate a hydraulic unit 1 and an electronic control unit 2 for an ABS of automotive vehicles. The hydraulic unit 1 comprises a housing 3 defining suitable oil passages, a motor 4 fixed on the housing 3 and serving as an actuator, a plurality of flow control valves 6b (see FIG. 10) and a plurality of solenoids 6 for opening and closing the oil passages, and a base plate 7 fixed on the bottom of the housing 3. The housing 3 has an upper surface 3a provided with a plurality of oil inlets (not shown) on which caps 5 are releasably mounted respectively.

The electronic control unit 2 comprises a printed board 9 on which electronic components and the like are mounted, a junction block 10, a plurality of relays 12 connected to connector portions 11 of the junction block 10, and a case 13 comprised of a pair of divided case elements 13a and 13b for housing the printed board 9, the junction block 10 and the relays 12.

Electrical connection of the respective components is made within the electronic control unit 2 in a manner described below. In the electronic control unit 2, the printed board 9, the junction bock 10, and the relays 12 are electrically connected to each other and housed in the divided case element 13a, with a connector connecting portion 14 provided on the printed board 9 projecting outwardly from an opening of the divided case element 13a. The divided case element 13b includes a relay receiving portion 13c for housing the relays 12, and through holes 13d through which wiring harnesses 6a extend from the solenoids 6. Bosses 13f having bolt through holes 13e are formed integrally with the divided case element 13b in predetermined positions on its outer surface.

The wiring harnesses 6a of the solenoids 6 are inserted into the case 13 through the corresponding through holes 13d, and the inserted ends of the wiring harnesses 6a are connected to a connecting connector 15. The connecting connector 15 is connected to a connector portion 16a of the junction block 10, and a connector portion 16b is connected to a connector portion 16c on the printed board 9. This provides connection of the wiring harnesses 6a of the solenoids 6 to a control circuit in the electronic control unit 2.

Figure 4:
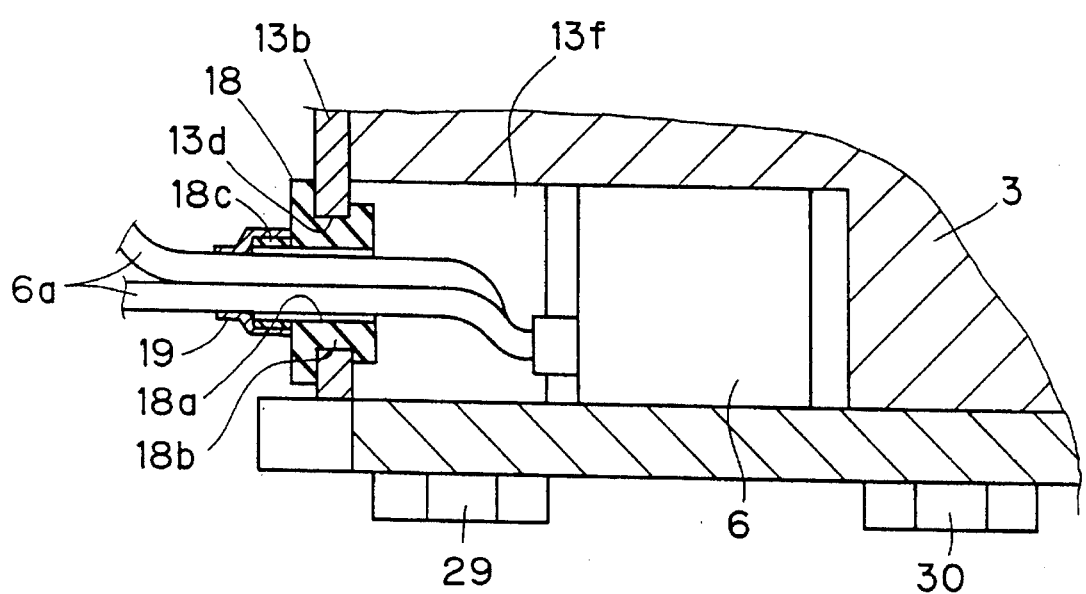
FIG. 4 is a fragmentary sectional view of a hydraulic unit of the unit integrated system.

Referring to FIG. 4, the wiring harnesses 6a extending from each of the solenoids 6 are inserted through a harness through hole 18a of an elastic bushing element 18 made of rubber or the like. The elastic bushing element 18 includes a fitting portion 18b having a circumferential groove, and the fitting portion 18b is fitted in each through hole 13d of the case 13 in liquid tight relation by the elastic deformation thereof. The opening width of the harness through hole 18a is slightly greater than the total width of the two wiring harnesses 6a so that the wiring harnesses 6a are easily inserted through the harness through hole 18a.

A heat-shrinkable tube 19 is fitted over an outer peripheral surface of a tubular portion 18c of the elastic bushing element 18 which projects in opposite direction from the solenoids 6 and an outer peripheral surface of the wiring harnesses 6a, and adheres thereto by heat shrinkage. It should be noted that the heat-shrinkable tube 19 is made to thermally shrink after the slack of the wiring harnesses 6a is pulled up. This provides a waterproof seal between the periphery of the through hole 13d and the wiring harnesses 6a.

Figure 5:
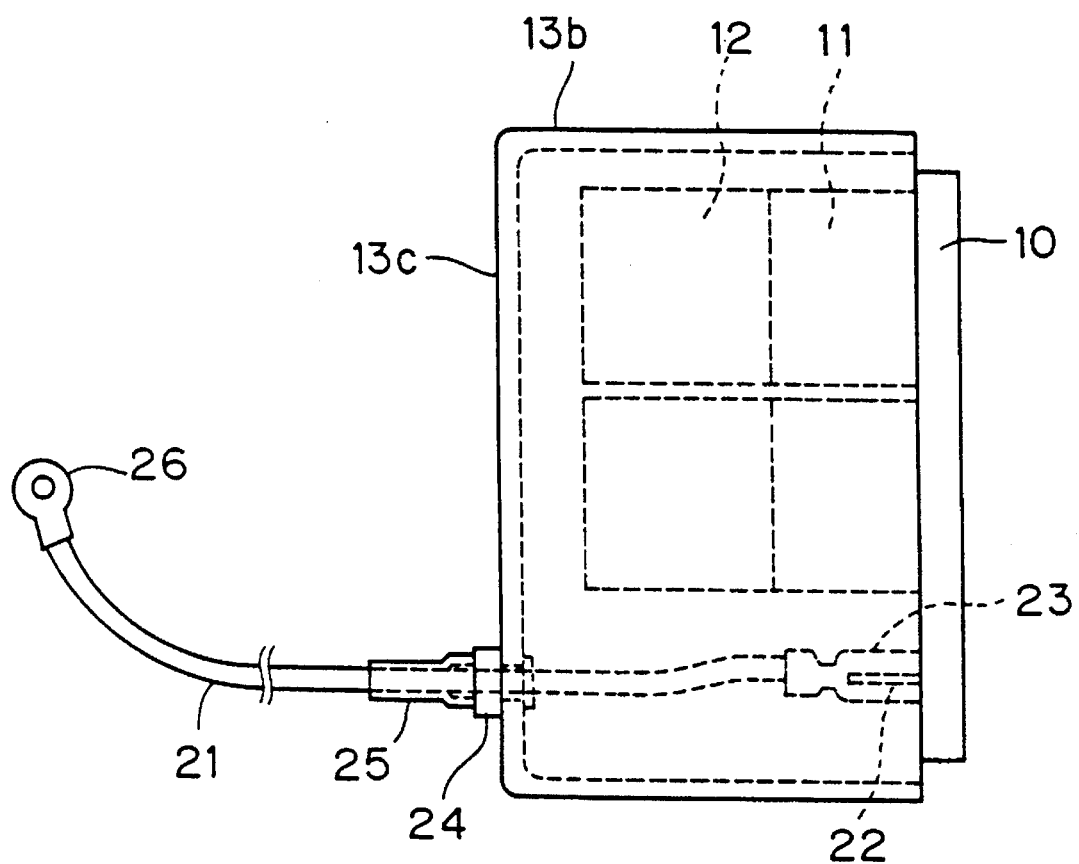
FIG. 5 is a fragmentary side view of the unit integrated system.
Figure 6:
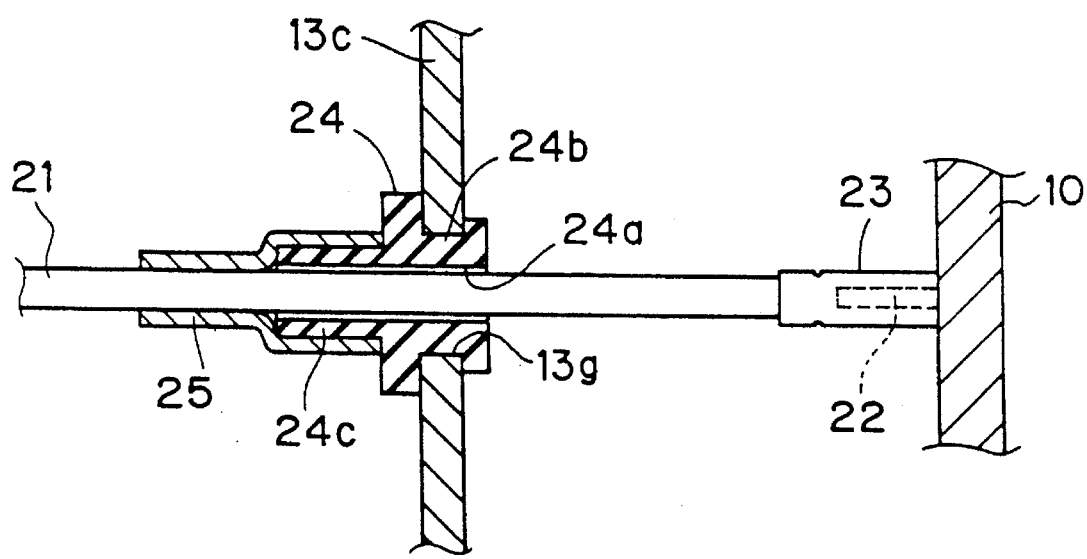
FIG. 6 is a fragmentary sectional view showing the details of FIG. 5.

Referring again to FIG. 1, wiring harnesses 21 electrically connect the control circuit of the electronic control unit 2 to the motor 4. As shown in FIGS. 1, 5 and 6, a pair of projecting bus bars 22 are provided below the connector portion 11 of the junction block 10, and connecting terminals 23 attached to respective one end of the wiring harnesses 21 are crimped to the bus bars 22, respectively.

Each of the wiring harnesses 21 is inserted through a harness through hole 24a of an elastic bushing element 24 made of rubber or the like. The elastic bushing element 24 includes a fitting portion 24b having a circumferential groove, and the fitting portion 24b is fitted in each through hole 13g of the relay receiving portion 13c of the case 13 in liquid tight relation by the elastic deformation thereof. The inner diameter of the harness through hole 24a is greater than the outer diameter of the wiring harness 21 so that the wiring harness 21 is easily inserted through the harness through hole 24a.

A heat-shrinkable tube 25 is fitted over an outer peripheral surface of an outwardly projecting tubular portion 24c of the elastic bushing element 24 and an outer peripheral surface of the wiring harness 21, and adheres thereto by heat shrinkage. It should be noted that the heat-shrinkable tube 25 is made to thermally shrink after the slack of the wiring harness 21 is pulled up. A connecting terminal 26 at one end of the wiring harness 21 extending outwardly of the relay receiving portion 13c of the case 13 is connected to the motor 4 in position. This provides a waterproof seal between the periphery of the through hole 13g and the wiring harness 21.

As above stated, the connecting connector 15 of the wiring harnesses 6a, the relays 12, and the connecting terminals 23 of the wiring harnesses 21 are connected to the junction block 10, and are then connected to the printed board 9 through the connector potions 16b, 16c.

Description will be given below on assembling the electronic control unit 2 and integrating the hydraulic unit 1 and the electronic control unit 2.

Figure 7:
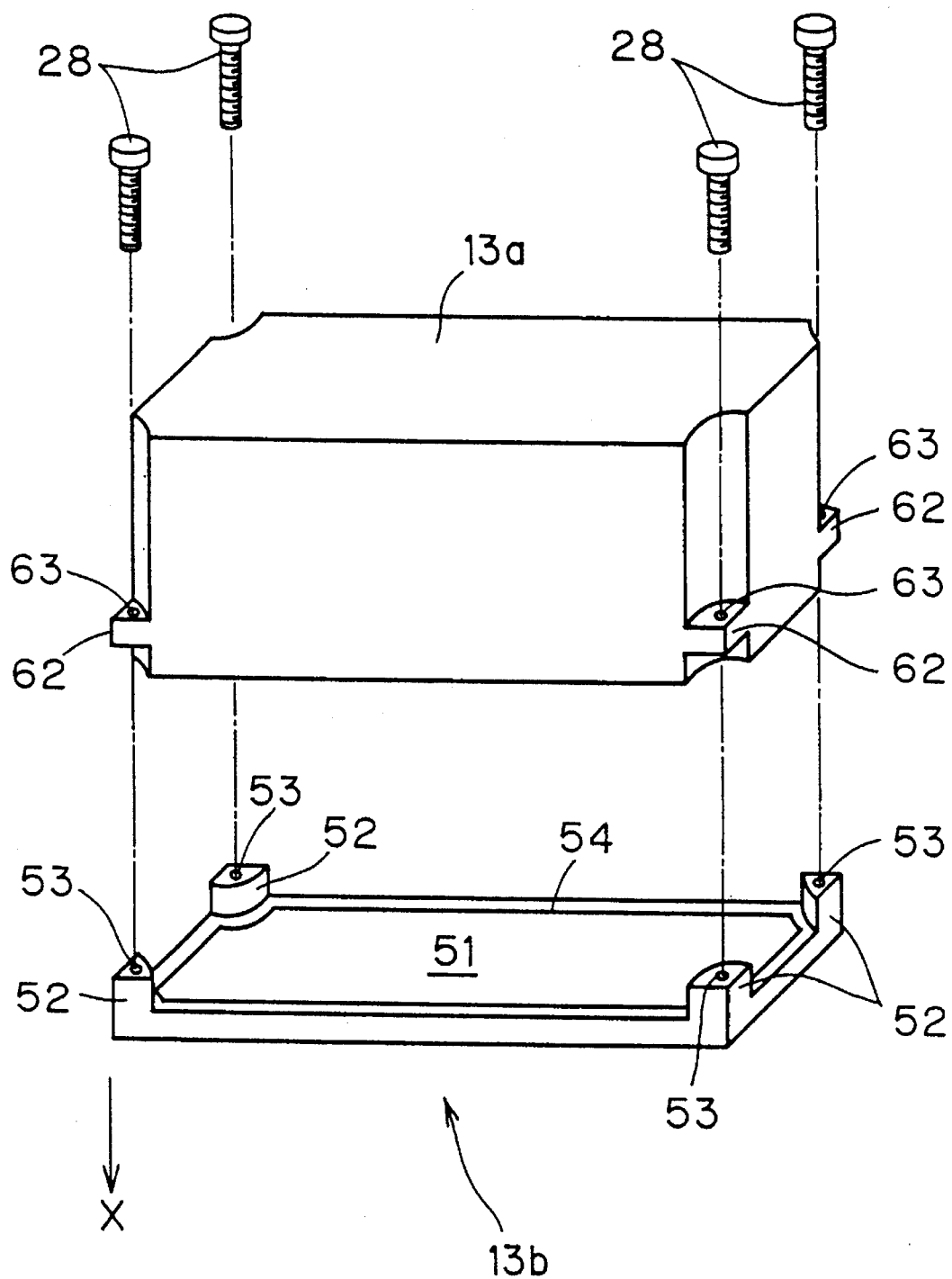
FIG. 7 is an exploded perspective view of a case of an electronic control unit of the unit integrated system.
Figure 8:
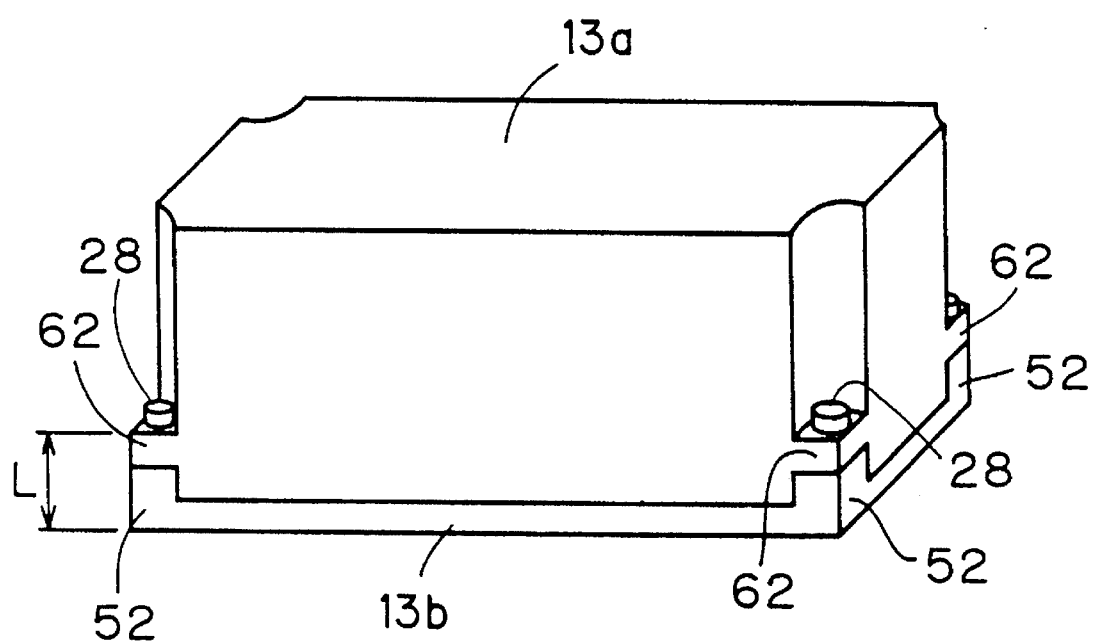
FIG. 8 is a perspective view of the case of the electronic control unit when divided case elements are joined together.

FIG. 7 is an exploded perspective view of the case 13. FIG. 8 is a perspective view of the assembled case 13. For the purpose of illustration, FIGS. 7 and 8 illustrate the case 13 as viewed from an angle different from the angle of FIGS. 1 and 2.

The divided case elements 13a and 13b forming the case 13 are finished into an integral configuration as shown in FIGS. 7 and 8. For distinct discrimination between the divided case elements 13a and 13b, the divided case element 13b is referred to as a "first divided case element" and the divided case element 13a as a "second divided case element" hereinafter.

The first divided case element 13b includes a thin plate 51 and fixing members 52 projecting from the four corners of the plate 51 toward the second divided case elements 13a. Each of the fixing members 52 has a recess in which a female threaded portion 53 is formed. A groove (not shown) extends along the outer periphery of the plate 51, and a sealing member 54 is fitted in the groove.

The second divided case element 13a includes screw support members 62 corresponding respectively to the fixing member 52 and projecting outwardly (in the direction orthogonal to the X direction of FIG. 7) from the outer peripheral surfaces thereof. Each of the screw support members 62 has a screw support hole 63 through which a screw to be described later passes. In this preferred embodiment, the screw support members 62 are provided adjacent the first divided case element 13*b*, and the fixing members 52 and the screw support members 62 abut against each other when the first and second divided case elements 13*b*, 13*a* engage. In the engaged condition, the total length L of each pair of the fixing members 52 and the screw support members 62 is less than the length of the joined first and second divided case elements 13*b* and 13*a* (or the case 13) in the longitudinal direction of the screws, or in the X direction. Thus, after the integration of the first and second divided case elements 13*b* and 13*a*, screws 28 are inserted into the screw support holes 63 of the screw support members 62 into threaded engagement of the forward ends thereof with the female threaded portions 53 of the fixing members 52, respectively, to join the first and second divided case elements 13*b* and 13*a* together. The electronic control unit 2 is assembled in this manner.

As above described, the first divided case element 13*b* of the case 13 has no projections but a flat surface. Although the screws 28 come into threaded engagement with the female threaded portions 53 of the fixing members 52 to couple the first and second divided case elements 13*b* and 13*a* together with a sufficient strength, the dimension of the whole case 13 is determined by the thickness of the plate 51 and the dimension of the second divided case element 13*a* in the X direction. For these reasons, size reduction of the electronic control unit 2 is achieved with a given or more strength ensured. Further, since the length L in the X direction is reduced, the short screws 28, or general-purpose screws 28, may be used to join the first and second divided case elements 13*b* and 13*a* together.

As the electronic control unit 2 is formed as above described, the assembled case 13 and the housing 3 are placed in predetermined positions on the base plate 7, with the flow control valves (not shown) and the solenoids 6 being set in predetermined positions in the housing 3, as shown in FIG. 1. After the bolt through holes (not shown) of the base plate 7 are aligned with the bolt through holes 13*e* of the mounting bosses 13*f*, fixing bolts 29 come into threaded engagement with the female threaded holes of the housing 3 and are tightened. The base plate 7 is fixed to the housing 3 by directly fastening the base plate 7 to the lower surface of the housing 3 with the fixing bolts.

Figure 2:
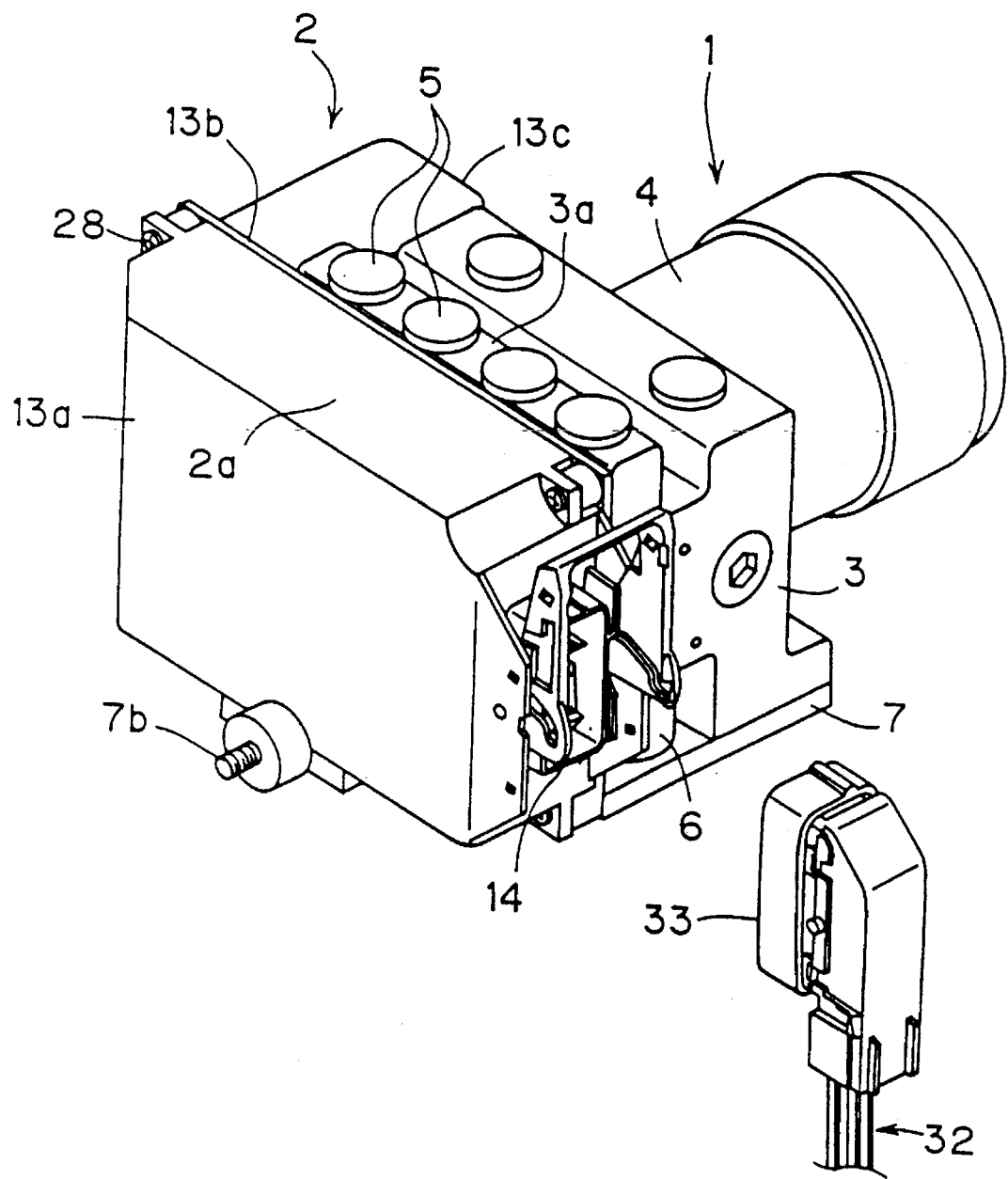
FIG. 2 is an entire perspective view of the unit integrated system which is assembled.

Since the fixing bolts 29 are inserted into threaded engagement with the bolt through holes 13*e* of the mounting bosses 13*f* formed integrally with the divided case element 13*b* and are tightened, the electronic control unit 2 is integrally fixed to the hydraulic unit 1. The base plate 7 includes a mounting screw 7*b* at its one end for mounting to the vehicular chassis as shown in FIG. 2.

Although the divided case elements 13*a* and 13*b* are fixed by the screws 28 in the four corners thereof as shown in FIGS. 7 and 8 in this preferred embodiment, the fixing position and the number of screws are not limited to those of the preferred embodiment. As above stated, the screws 28 should fix the divided case element 13*b* having the plurality of fixing members 52 projecting from the plate 51 toward the second divided case element 13*a* and the divided case element 13*a* having the plurality of screw support members 62 corresponding to the fixing members 52 and projecting outwardly from the outer peripheral surfaces of the second divided case element 13*a*.

Figure 9:
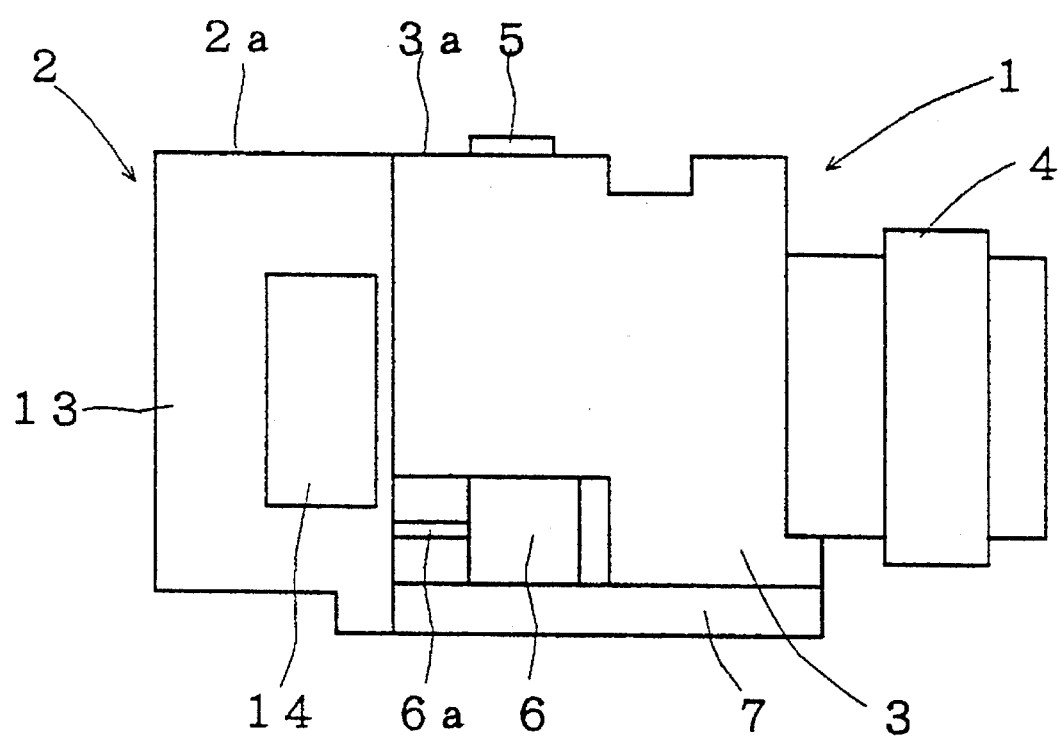
FIG. 9 is a side view of the entire unit integrated system.

The hydraulic unit 1 and the electronic control unit 2 for controlling the drive of the hydraulic unit 1 are integrated in juxtaposition in such a manner that the upper surface 3*a* of the casing 3 corresponding to the upper surface of the hydraulic unit 1 is levelled with an upper surface 2*a* of the electronic control unit 2 as shown in FIG. 9.

Figure 10:
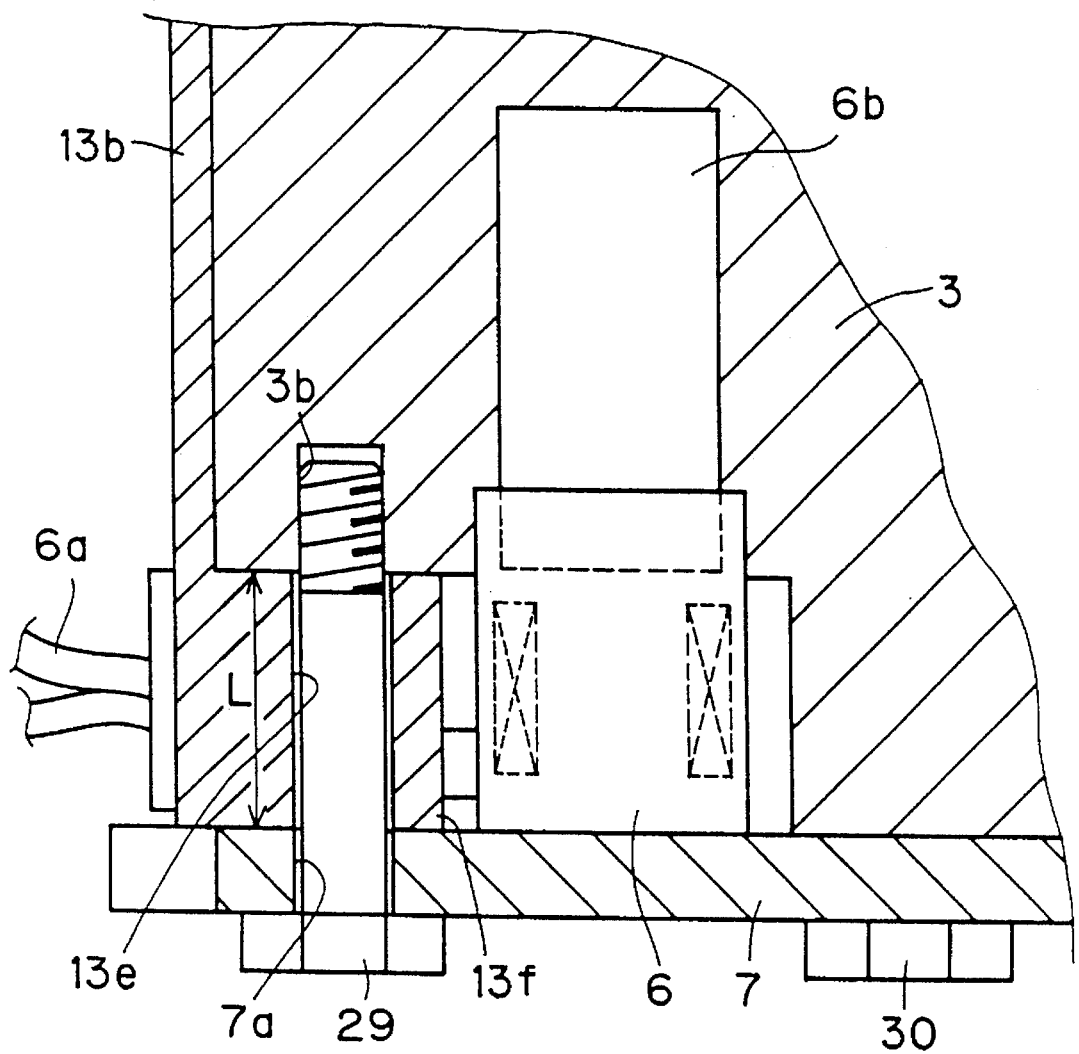
FIG. 10 is a fragmentary sectional view showing the integration of the hydraulic unit and the electronic control unit of the unit integrated system.
Figure 20:
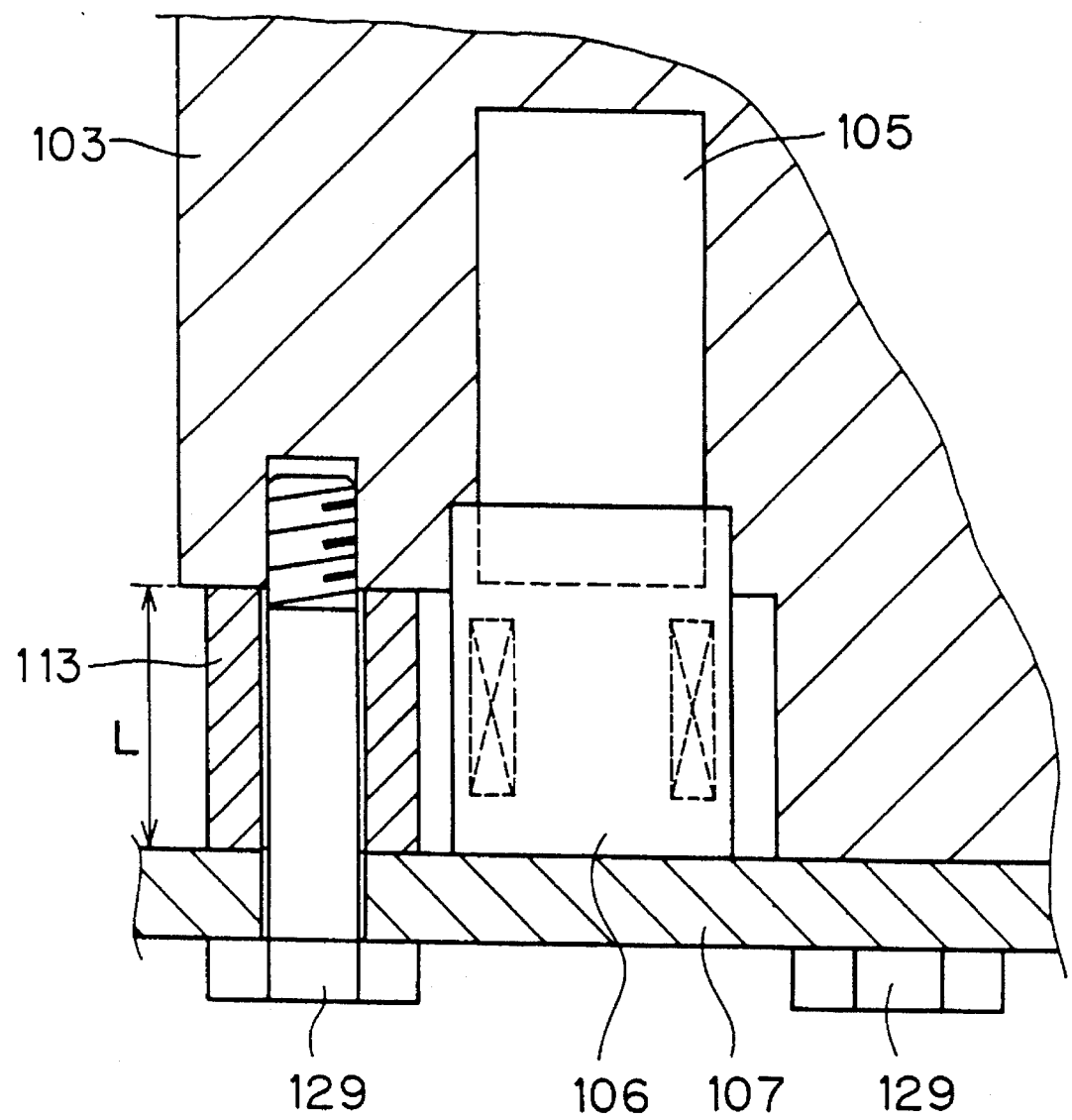
FIG. 20 is a fragmentary sectional view of a prior art hydraulic unit.

The mounting bosses 13*f* are equal in height L to the positioning sleeve 113 serving as the assembling element of the hydraulic unit 103 of FIG. 20. As shown in FIG. 10, the flow control valves 6*b* and the solenoids 6 are located and mounted in position, with the fixing bolts 29 being in threaded engagement with female threaded holes 3*b* of the housing 3 through the bolt through holes 7*a* of the base plate 7 and the bolt through holes 13*e* of the mounting boss 13*f* which are aligned with the female threaded holes 3*b*.

Figure 3:
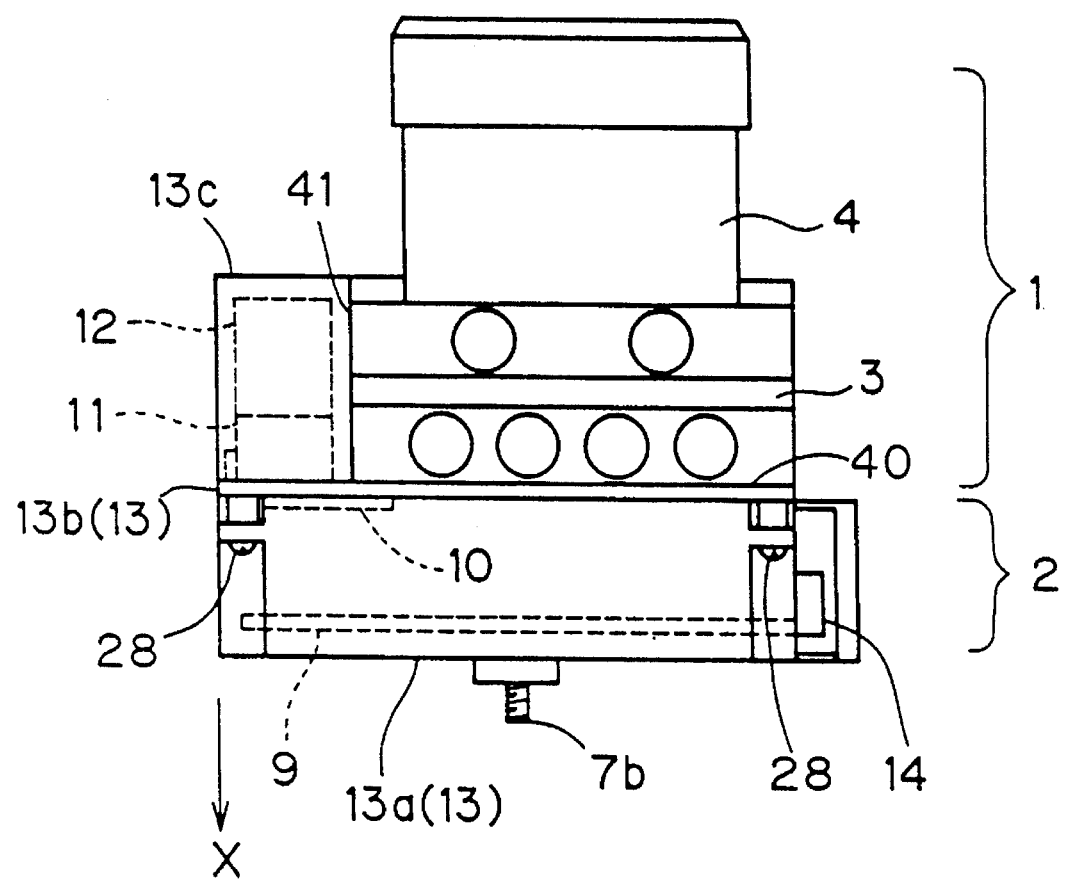
FIG. 3 is a plan view of the unit integrated system.
Figure 21:
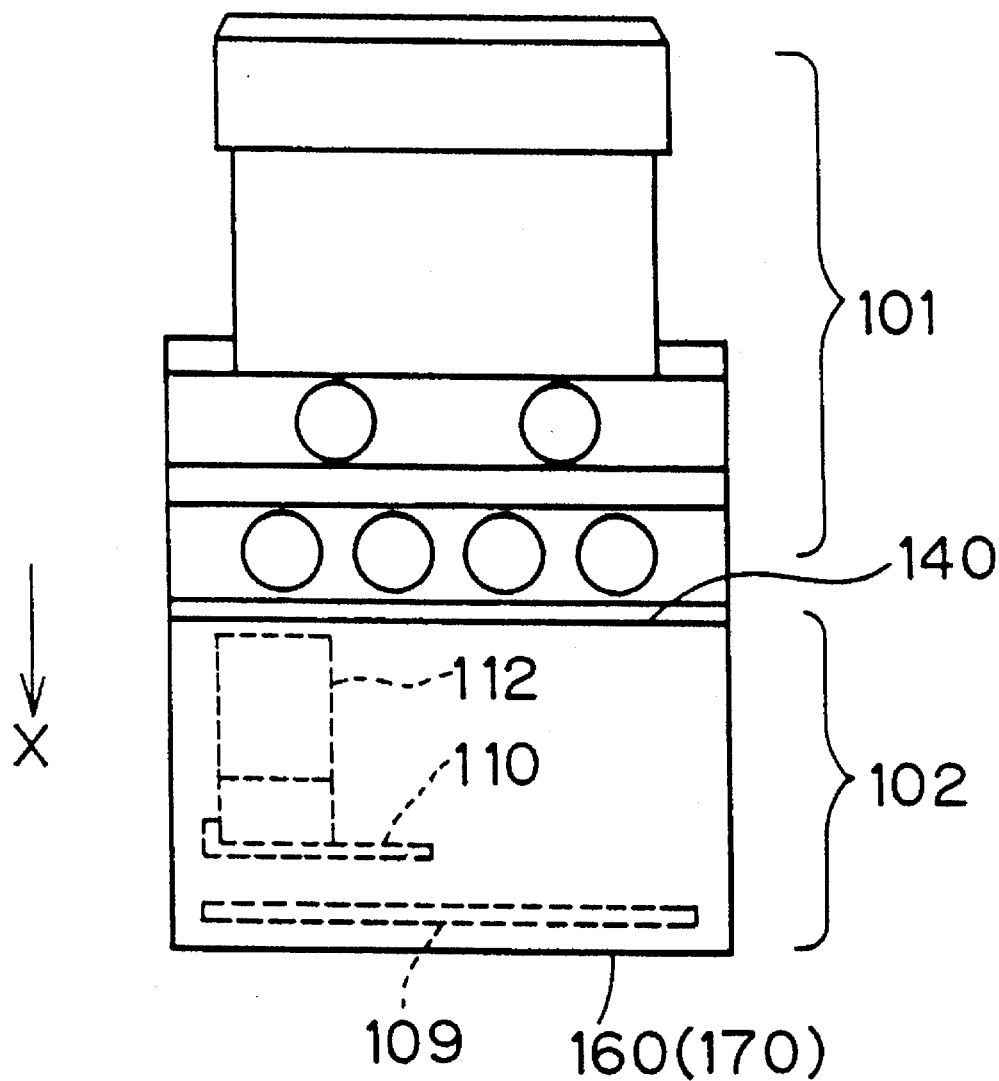
FIG. 21 is a plan view of the prior art.
Figure 22:
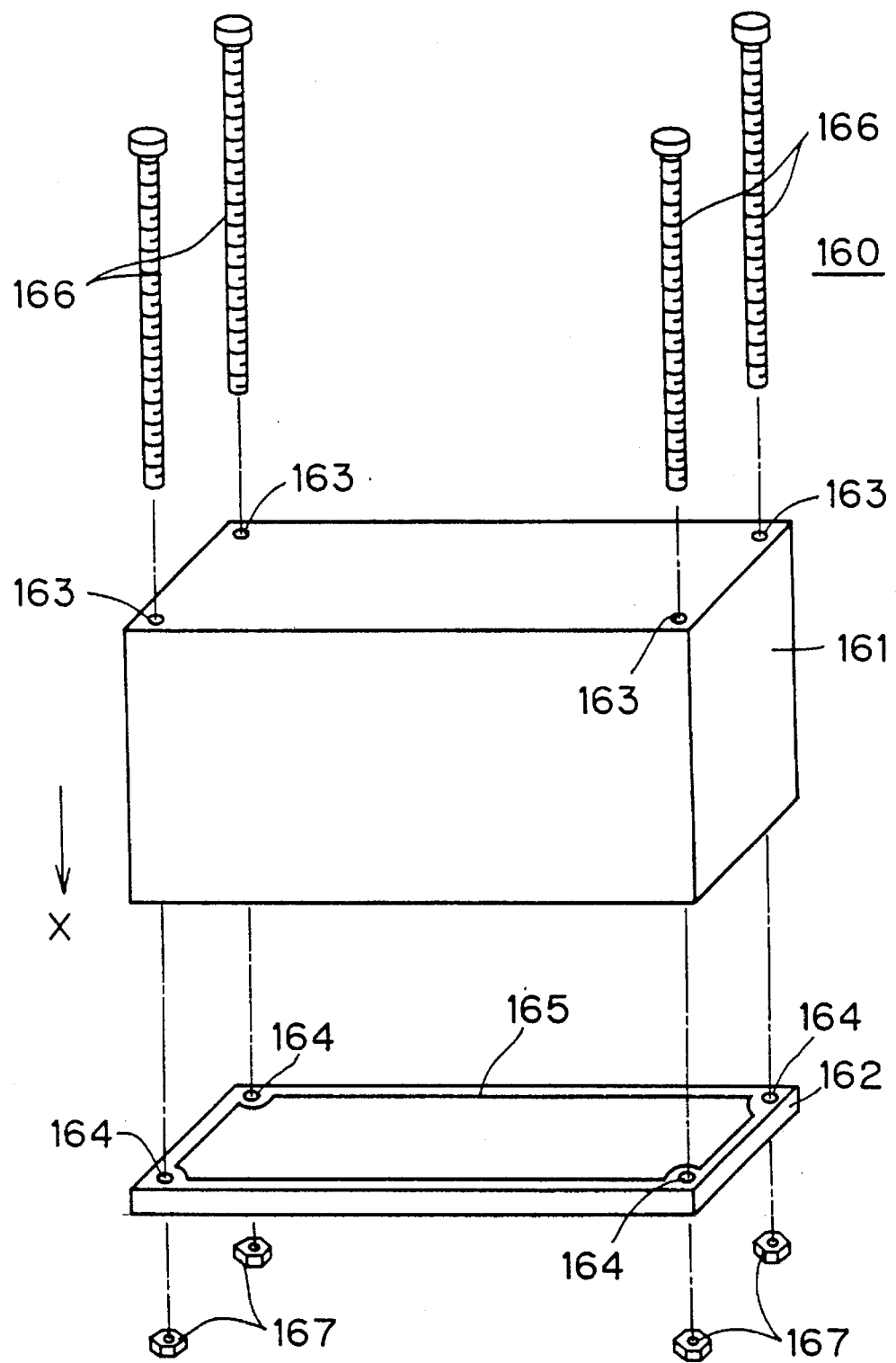
FIG. 22 is an exploded perspective view of a case of a prior art electronic control unit.
Figure 23:
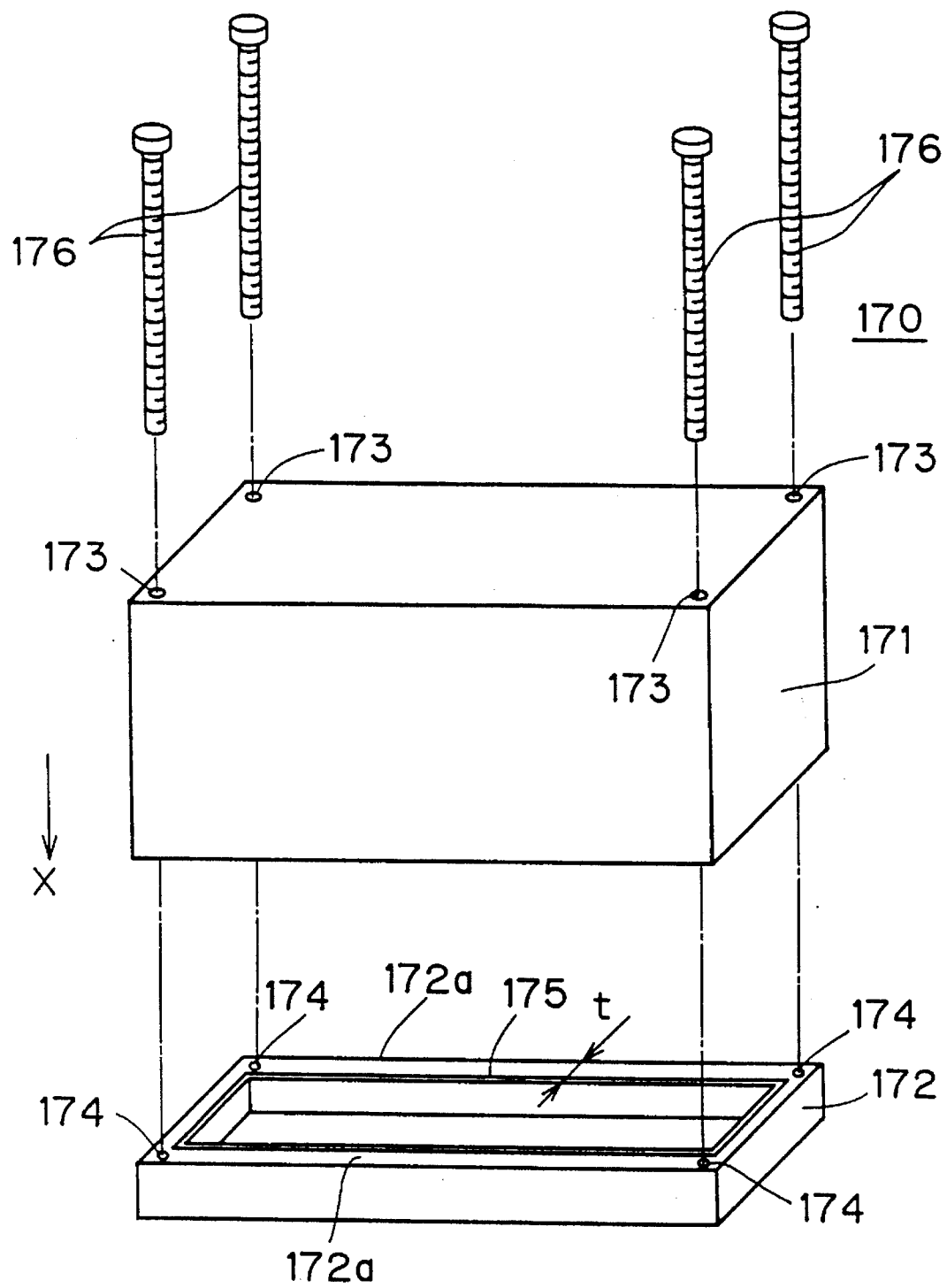
FIG. 23 is an exploded perspective view of the case of another prior art electronic control unit.
Figure 24:
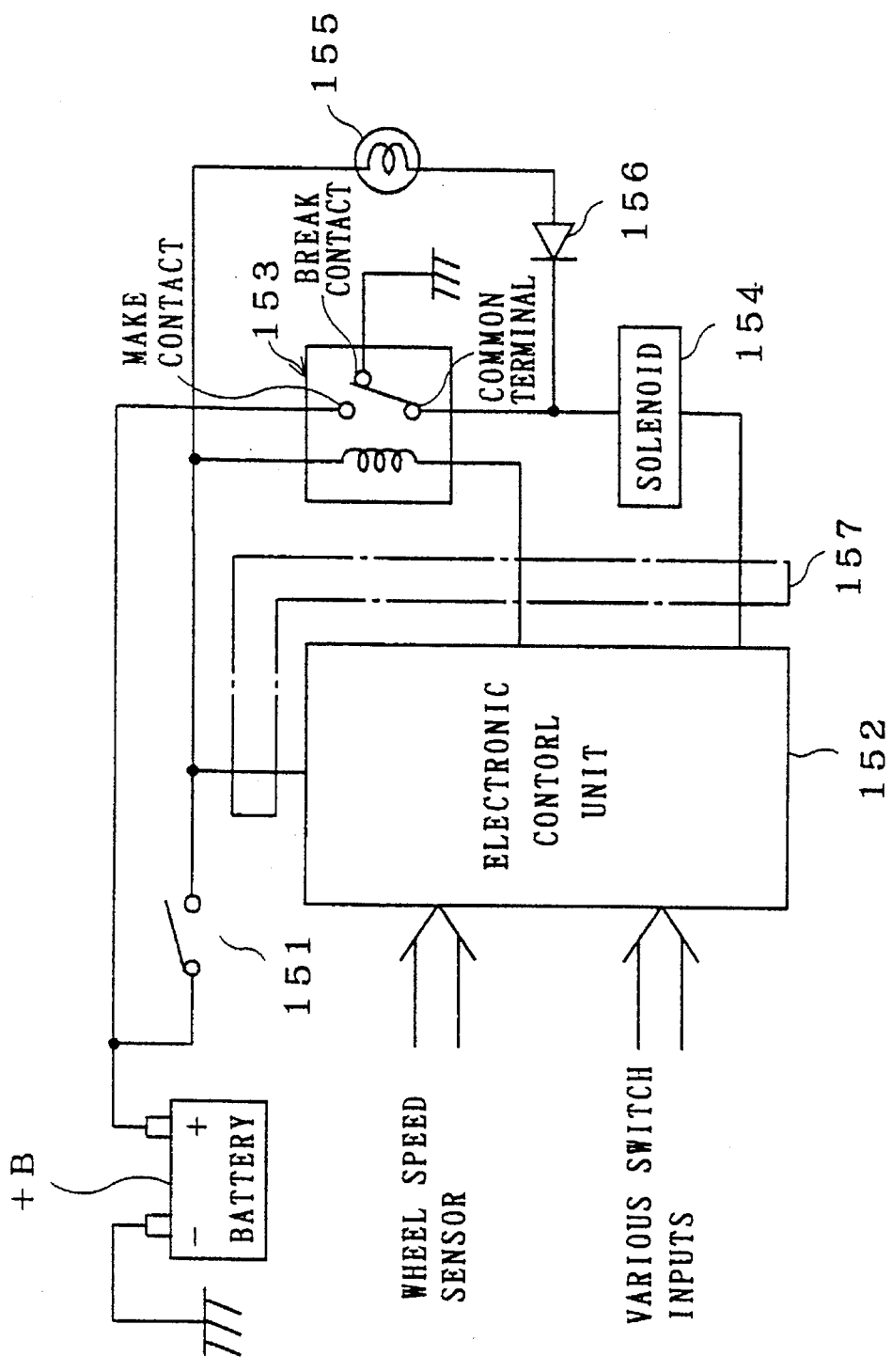
FIG. 24 is a circuit diagram of a prior art braking controller.
Figure 25:
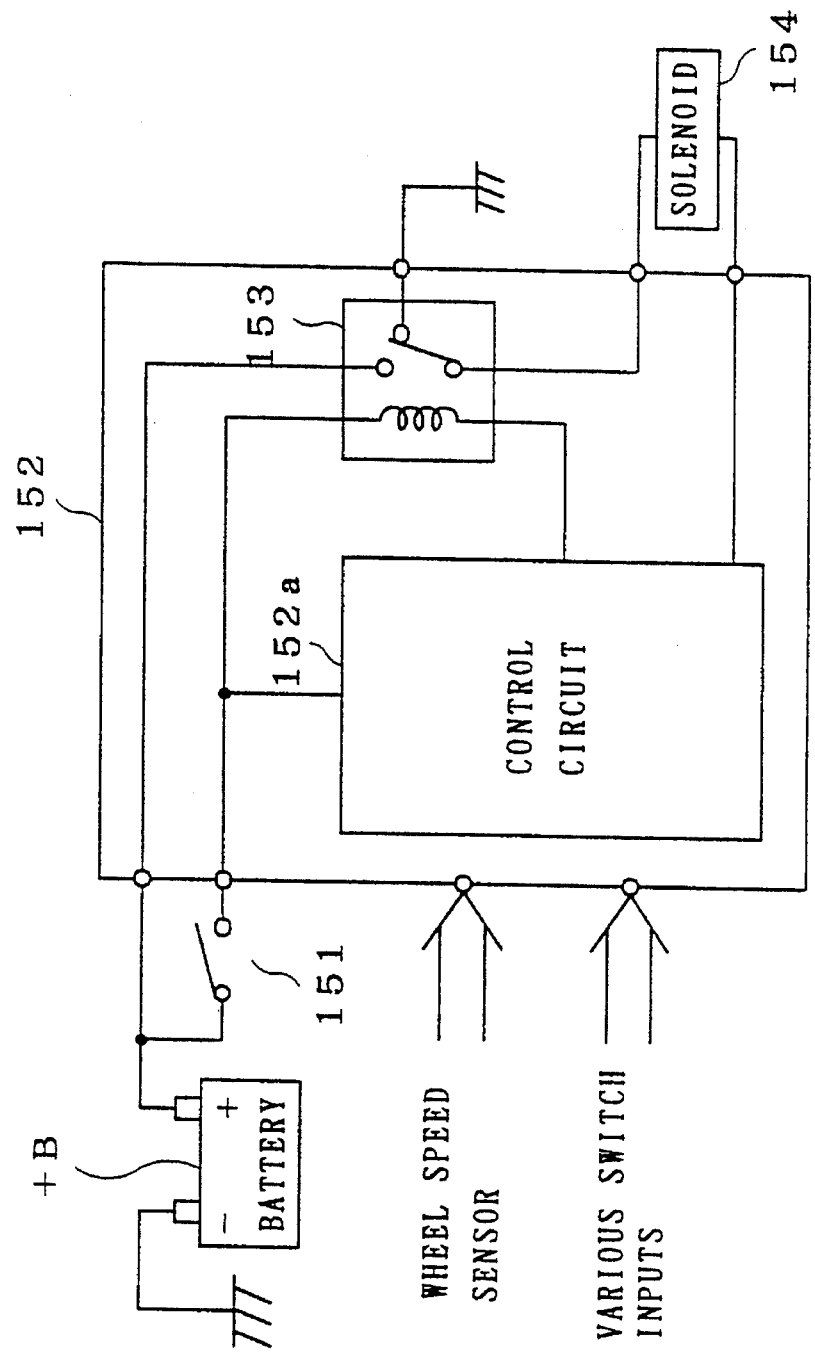
FIG. 25 is a circuit diagram of another prior art braking controller.

Referring to FIG. 3, the relays 12 are positioned adjacent a major surface 41 of the hydraulic unit 1 on a lateral side thereof. The printed board 9 on which the control circuit is formed is positioned adjacent a major surface 40 and in parallel with the junction block 10. The result is size reduction in the direction X of the arrangement of the hydraulic unit 1 and the electronic control unit 2, as will be appreciated from the comparison with the prior art of FIG. 21.

A connector 33 provided at one end of wiring harnesses 32 for receiving various sensor signals from the vehicle and electric from the battery is adapted to be releasably connected to the connector connecting portion 14 projecting from the opening of the divided case element 13*a*.

Figure 11:
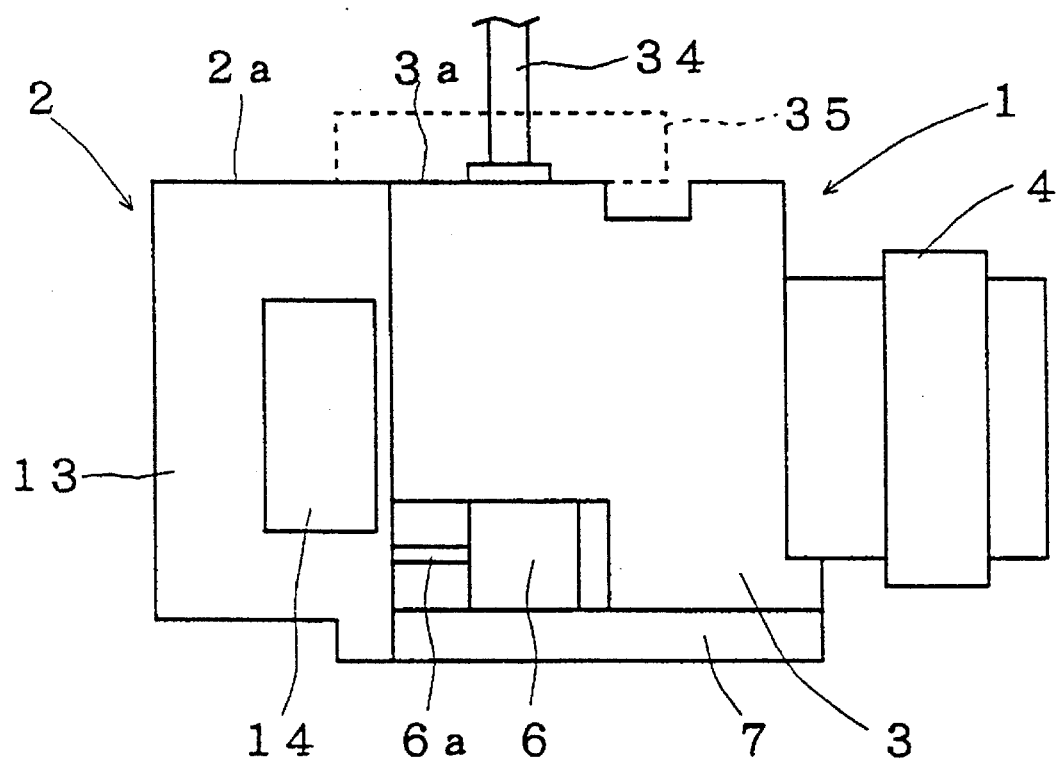
FIGS. 11 and 12 are side views of the hydraulic unit and a hydraulic pipe which are connected to each other of the unit integrated system.

In the unit integrated system, pouring oil into the hydraulic unit 1 is carried out by removing the cap 5 mounted on the upper surface 3*a* of the casing 3 of the hydraulic unit 1 from the oil inlet and then connecting a hydraulic pipe 34 to the oil inlet by using a piping tool (not shown) as shown in FIG. 11. Since the upper surface 3*a* of the casing 3 corresponding to the upper surface of the hydraulic unit 1 is levelled with the upper surface 2*a* of the electronic control unit 2, a space enclosed by broken lines 35 of FIG. 11 for operation of the existing spanner-shaped piping tool is insured above the electronic control unit 2. This enables the hydraulic pipe 34 to be securely connected to the oil inlet of the hydraulic unit 1 by using the existing spanner-shaped piping tool without interference with an upper portion of the electronic control unit 2.

Although the upper surface 2*a* of the electronic control unit 2 is levelled with the upper surface 3*a* of the hydraulic unit 1 in this preferred embodiment, the upper surface 2*a* of the electronic control unit 2 may be set at a level lower than the upper surface 3*a* of the hydraulic unit 1, thereby insuring the space for operation of the existing spanner-shaped piping tool above the electronic control unit 2. It is preferred in terms of size reduction of the whole integrated unit to level the upper surface 2*a* of the electronic control unit 2 with the upper surface 3*a* of the hydraulic unit 1 to ensure room for wiring on the printed board 9 within the electronic control unit 2.

Figure 12:
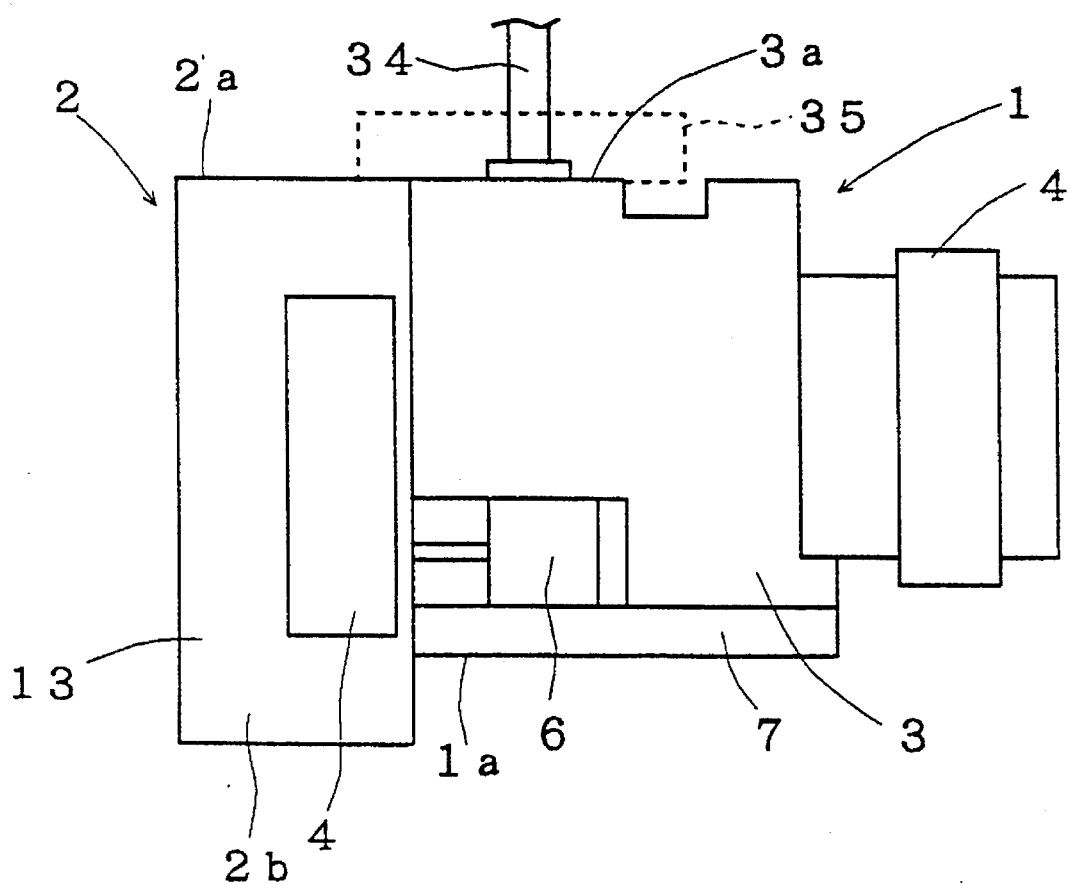

The height of the electronic control unit 2 equals the height of the hydraulic unit 1 in this preferred embodiment. Referring to FIG. 12, when the height of the electronic control unit 2 is greater than the height of the hydraulic unit 1, both of the units 1 and 2 should be assembled together in such a manner that a lower portion 2*b* of the electronic control unit 2 projects downwardly from a lower surface 1*a* of the hydraulic unit 1 so as not to locate the upper surface 2*a* of the electronic control unit 2 at a level higher than the upper surface 3*a* of the hydraulic unit 1.

In this preferred embodiment, the mounting bosses 13*f* formed integrally with the case 13 of the electronic control unit 2 are used both as a mounting portion for fixing the electronic control unit 2 and as a positioning sleeve which is an assembling element of the hydraulic unit 1. The combined use of the members permits reduction in the number of components and the whole size reduction. The combined use of the members also provides for reduction in the number of fixing bolts and processing costs, resulting in production cost reduction.

The wiring harnesses 6a extending from the solenoids 6 pass through the through holes 13d formed in the case 13 of the electronic control unit 2. The fitting portion 18b of the elastic bushing element 18 is fitted in the inner peripheral surface of each through hole 13d in liquid tight relation, and the heat-shrinkable tube 19 adheres to the outer peripheral surface of the tubular portion 18c of the elastic bushing element 18 and the outer peripheral surface of the wiring harnesses 6a. This effectively prevents water from permeating into the electronic control unit 2 from between the case 13 and the elastic bushing element 18 and between the elastic bushing element 18 and the wiring harnesses 6a.

The unit integrated system of the present invention is of an internal wiring structure wherein the wiring harnesses 6a of the solenoids 6 pass through the respective through holes 13d of the case 13 and are connected to the control circuit in the electronic control unit 2, and is constructed such that the waterproof seal is provided between the periphery of the through holes 13d and the wiring harnesses 6a. Thus there is no need to bundle the wiring harnesses and mount the protective sleeve as in the external wiring structure disclosed in Japanese Patent Application No. 3-177132. The bundle of wiring harnesses 6a are not drawn around the hydraulic unit 1 and the electronic control unit 2. In addition, it is unnecessary to use a costly, large-sized waterproof connector. This accomplishes size reduction and production cost reduction.

The wiring harnesses 21 for connecting the motor 4 of the hydraulic unit 1 to the bus bars 22 of the electronic control unit 2 are adapted to pass through the through holes 13g of the case 13. The fitting portion 24b of the elastic bushing element 24 is fitted in the inner peripheral surface of each through hole 13g in liquid tight relation, and the heat-shrinkable tube 25 adheres to the outer peripheral surface of the tubular portion 24c of the elastic bushing element 24 and the outer peripheral surface of the wiring harnesses 21. This effectively prevents water from permeating into the electronic control unit 2 from between the case 13 and the elastic bushing element 24 and between the elastic bushing element 24 and the wiring harnesses 21. This enables the wiring harnesses 21 to connect the bus bars 22 of the electronic control unit 2 to the motor 4 of the hydraulic unit 1 while ensuring the waterproofing property of the electronic control unit 2 without using a waterproof connector. Such a structure insures the waterproofing property by the elastic bushing element 24 and the heat-shrinkable tube 25 without using the waterproof connector, thereby accomplishing cost reduction and size reduction.

Figure 13:
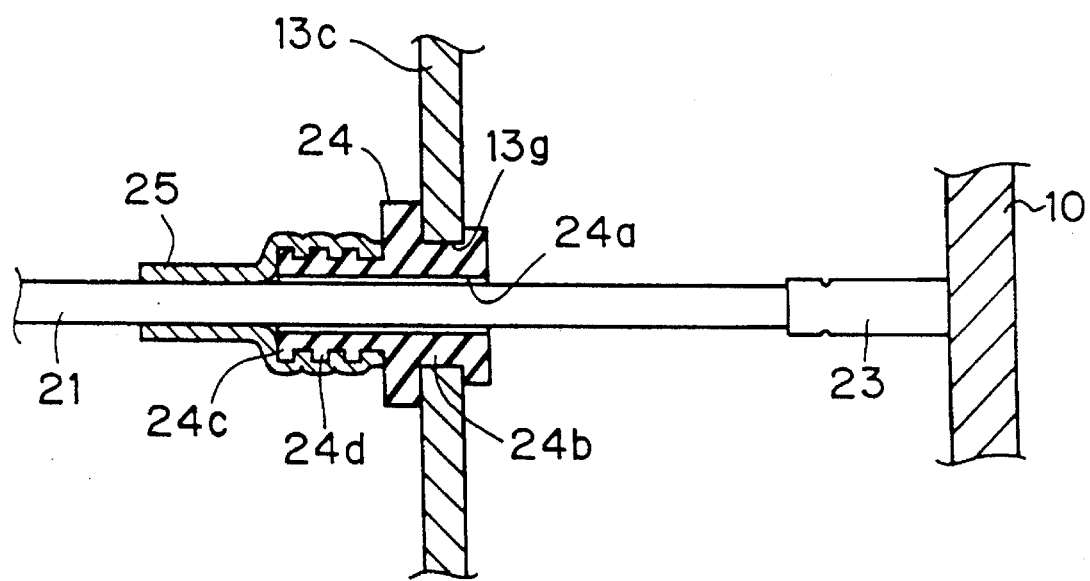
FIGS. 13 and 14 are fragmentary sectional views of a waterproofing structure of a case through portion for a wiring harness of the unit integrated system.

FIG. 13 illustrates another waterproof structure which includes a plurality of circumferential ledges 24d on the outer peripheral surface of the tubular portion 24c of the elastic bushing element 24. The structure of FIG. 13 provides a more effective adherence of the heat-shrinkable tube 25 to the elastic bushing element 24, enhancing the waterproofing property.

Figure 14:
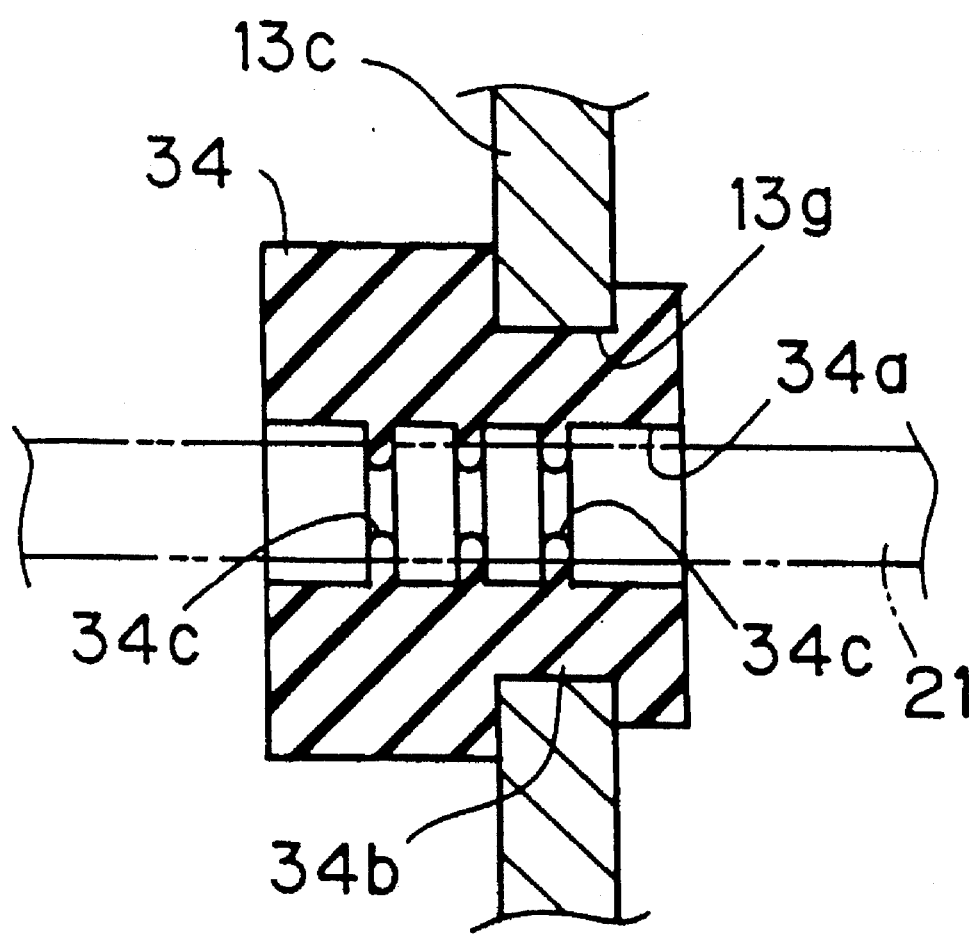

FIG. 14 is a sectional view of major portions of a modification of the structure adjacent the through holes 13g of the relay receiving portion 13c of the preferred embodiment. The wiring harness 21 is inserted through a harness through hole 34a of the elastic bushing element 34 made of rubber or the like, and a fitting portion 34b of the elastic bushing element 34 is fitted in the through hole 13g of the relay receiving portion 13c of the case 13 in liquid tight relation by the elastic deformation thereof.

A plurality of circumferentially annular sealing ledges 34c are formed integrally on the inner peripheral surface of the harness through hole 34a. The inner diameter of the sealing ledges 34c is smaller than the outer diameter of the wiring harness 21. When the wiring harness 21 is inserted through the harness through hole 34a, the respective sealing ledges 34c are elastically deformed to adhere to the outer peripheral surface of the wiring harness 21.

As above stated, the fitting portion 34b of the elastic busing element 34 is fitted in the inner peripheral surface of the through hole 13g in liquid tight relation, and the sealing ledges 34c adhere to the outer peripheral surface of the wiring harness 21. This effectively prevents water from permeating into the electronic control unit 2 from between the case 13 and the elastic bushing element 34 and between the elastic busing element 34 and the wiring harness 21. Similar to the foregoing preferred embodiment, the wiring harnesses 21 electrically connects the bus bars 22 of the electronic control unit 2 to the motor 5 of the hydraulic unit 1 while ensuring the waterproofing property of the electronic control unit 2 without using the waterproof connector. The structure of FIG. 14 insures the waterproofing property by the elastic bushing element 34 without using the waterproof connector, thereby accomplishing cost reduction and size reduction.

According to the preferred embodiment, the relays 12 forming the electronic control unit 2 are positioned adjacent the one major surface 41 of the hydraulic unit 1 whereas the printed board 9 on which the control circuit is formed is located adjacent the second major surface 40 of the hydraulic unit 1 as shown in FIG. 3, thereby allowing size reduction in the X direction of the arrangement of the hydraulic unit 1 and the electronic control unit 2.

Although the printed board 9 having the control circuit and the relays 12 are located adjacent the major surfaces 40 and 41 of the hydraulic unit 1, respectively, in the preferred embodiment, the arrangement is not so limited. Locating the printed board 9 and the relays 12 respectively adjacent two different ones of the plurality of major surfaces of the hydraulic unit 1 provides the same effect as that of the preferred embodiment, that is, size reduction in the direction of the arrangement of the hydraulic unit 1 and the electronic control unit 2.

Although the preferred embodiment illustrates the integrated structure of the hydraulic unit 1 and the electronic control unit 2, the present invention is not so limited but may be applied to a TCS and the like.

Figure 15:
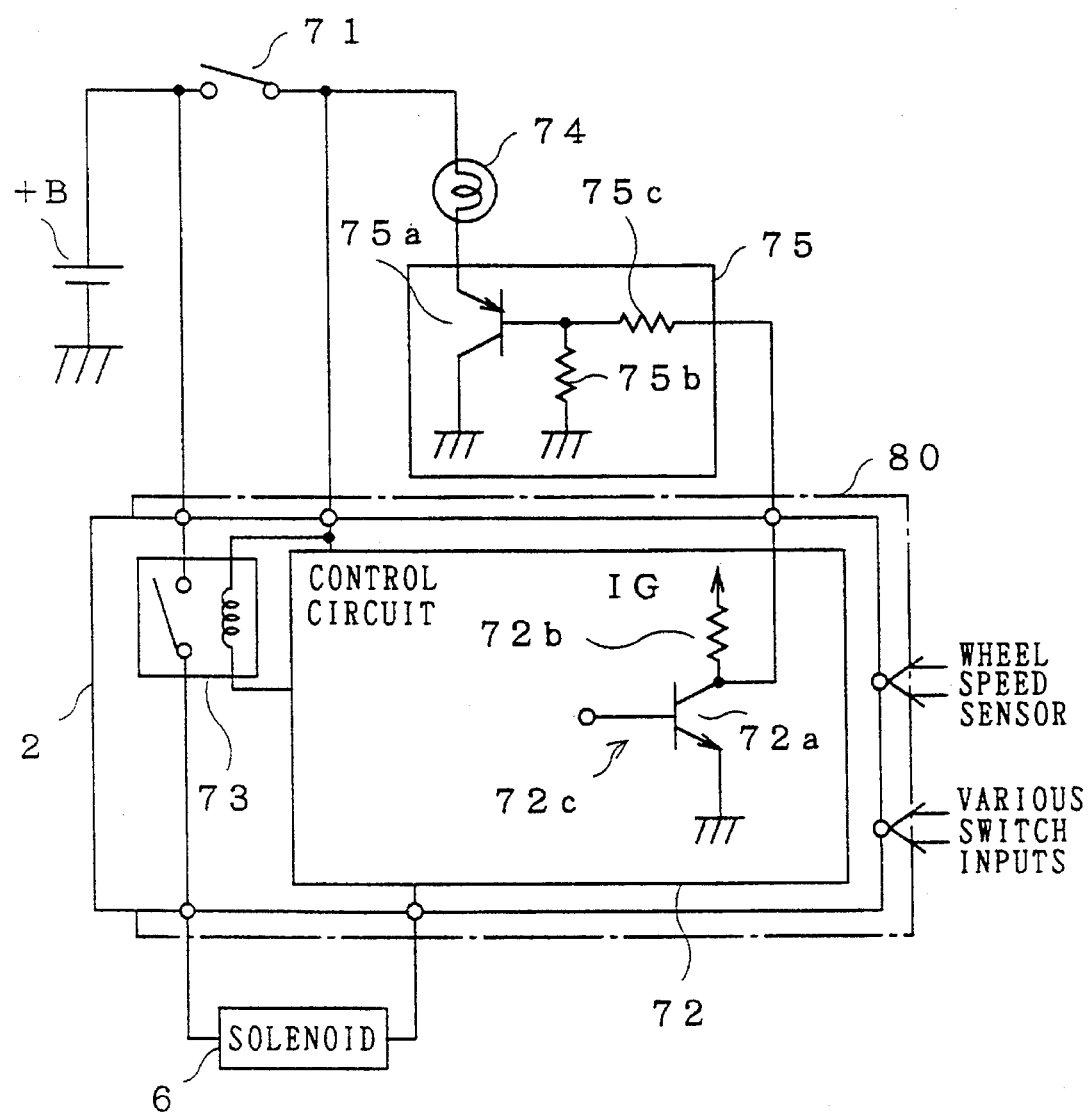
FIG. 15 is a circuit diagram of a preferred embodiment of a braking controller incorporated in the unit integrated system.

FIG. 15 is a circuit diagram of a preferred embodiment of a braking controller such as the ABS.

Referring to FIG. 15, a power supply terminal of a control circuit 72 of the electronic control unit 2 is connected to a positive terminal of a battery +B having a grounded negative terminal through an ignition switch 71. The electronic control unit 2 comprises a fail-safe make relay 73 including a relay coil having a first end connected to the positive terminal of the battery +B through the ignition switch 71 and a second end connected to a control output terminal of the control circuit 72 of the electronic control unit 2. A make contact of the fail-safe relay 73 has a first end directly connected to the positive terminal of the battery +B and a second end connected to a first end of the solenoid 6 serving as a braking load for controlling a brake fluid pressure. A second end of the solenoid 6 is connected to a load control output terminal of the control circuit 72. A warning lamp 74 serving as an alarm means has a first end connected to the positive terminal of the battery +B through the ignition switch 71 and a second end connected to a conduction means 75.

The conduction means 75 includes a PNP transistor 75a serving as a switching device having an emitter connected to the second end of the warning lamp 74 and a collector grounded, a base biasing resistor 75b connected between the base of the transistor 75a and ground, and a resistor 75c having a first end connected to the base of the transistor 75a and a second end connected to a control terminal of the control circuit 72 through a connector 80 to be described later.

The control circuit 72 comprises an abnormality drive circuit 72c including an NPN transistor 72a having a grounded emitter and a pull-up resistor 72b having two ends connected to the collector of the transistor 72a and the ignition switch 71. The collector of the transistor 72a serves as a control terminal and is connected to the resistor 75c. If an abnormality occurs within the control circuit 72, an ON control signal is applied to the base of the transistor 72a to turn on the transistor 72a, which results in the low level at the base of the transistor 75a to turn on the transistor 75a. Then the warning lump 74 lights up, signalling the abnormality within the control circuit 72.

When the control circuit 72 is normal, the transistor 72a is off. Then the base of the transistor 75a of the conduction means 75 is held at the high level, and the transistor 75a is held off. The warning lamp 74 does not light up but remains off.

Connection between components within the electronic control unit 2 which include the fail-safe relay 73 and the control circuit 72 and components outside the electronic control unit 2 which include the battery +B, the ignition switch 71, the solenoid 6 serving as a braking load, a wheel speed sensor, various switching inputs and the conduction means 75 are made by one connector 80 as indicated by open circles in FIG. 15. If the connector 80 is in an unconnected condition and is not electrically connected, the base of the transistor 75a of the conduction means 75 enters the low level, and the transistor 75a turns on. The current conduction path of the warning lamp 74 becomes conductive and the warning lamp 74 lights up, signalling the unconnectedness of the connector 80.

In this manner, the unconnectedness of the connector 80 is indicated by the lighting up of the warning lamp 74. If the connector 80 fails to be connected in the automotive vehicle assembly line, the warning lamp 74 lights up when the ignition switch 71 is turned on. The unconnectedness of the connector 80 or the abnormality within the control circuit 72 is sensed prior to delivery, and a countermeasure may be taken immediately to meet the situation.

The use of the make relay which is less expensive and smaller-sized than the costly, large-sized make-break relay as the fail-safe relay 73 and the formation of the fail-safe relay 73 and the control circuit 72 into a unit, accomplish reduction in wiring harnesses and provide an inexpensive, small-sized braking controller.

Since conduction of the current conduction path of the warning lamp 74 is made by the conduction means 75 when the connector 80 is not connected, the connection failure of the connector 80 is immediately detected.

Figure 16:
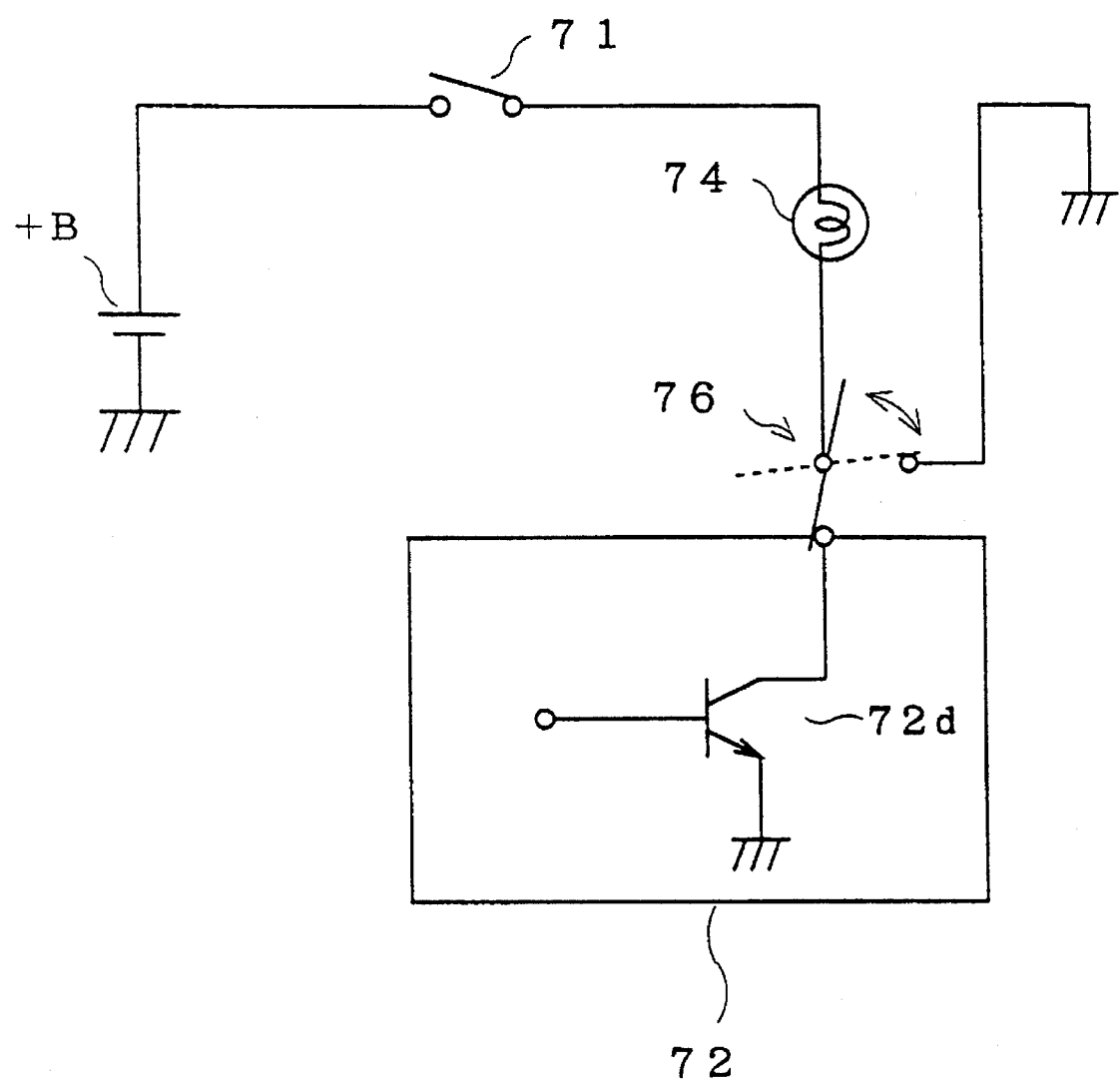
FIG. 16 is a circuit diagram of another preferred embodiment of the braking controller.
Figure 17:
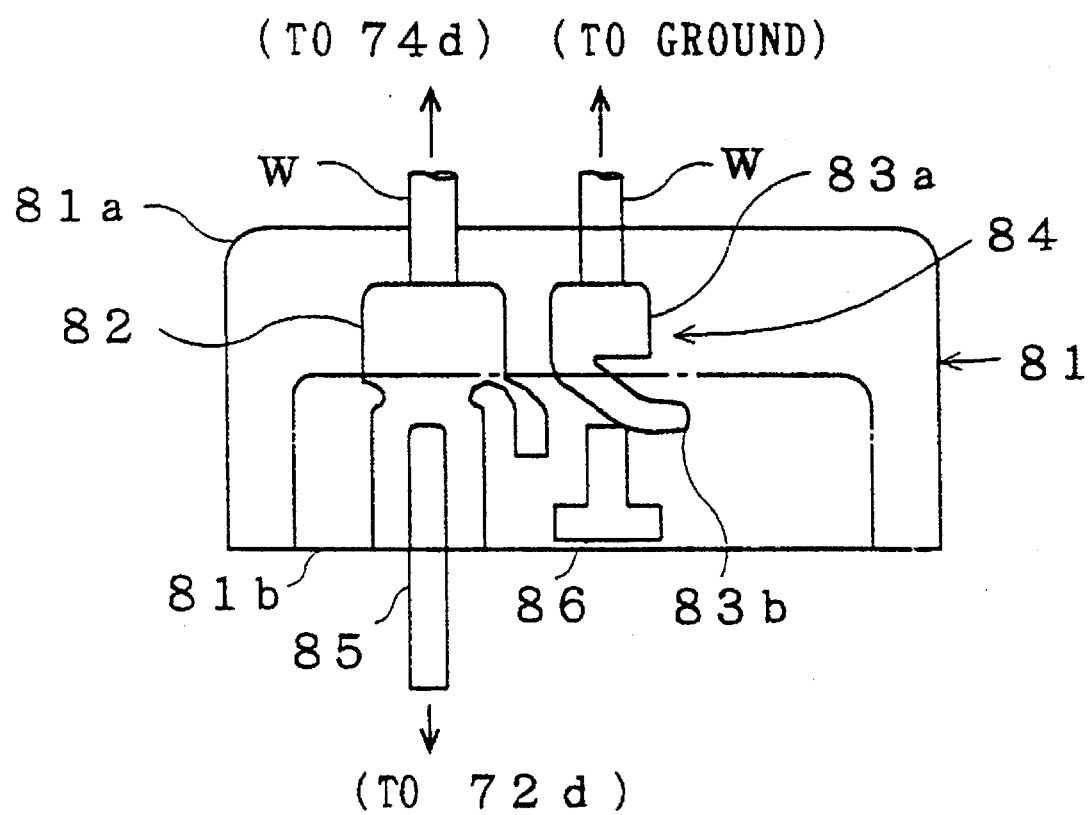
FIG. 17 is a schematic view of a connector in a connected condition for the braking controller.
Figure 18:
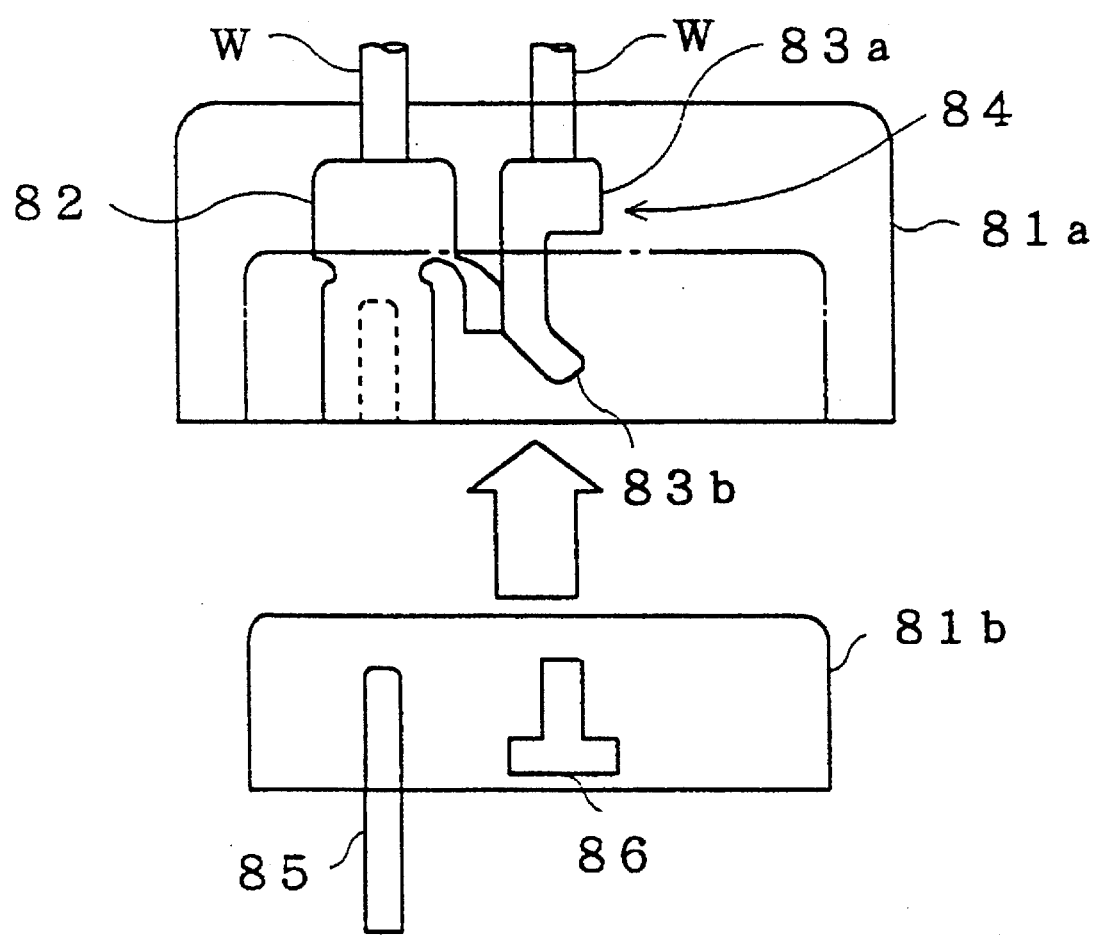
FIG. 18 is a schematic view of the connector in an unconnected condition for the braking controller.
Figure 19:
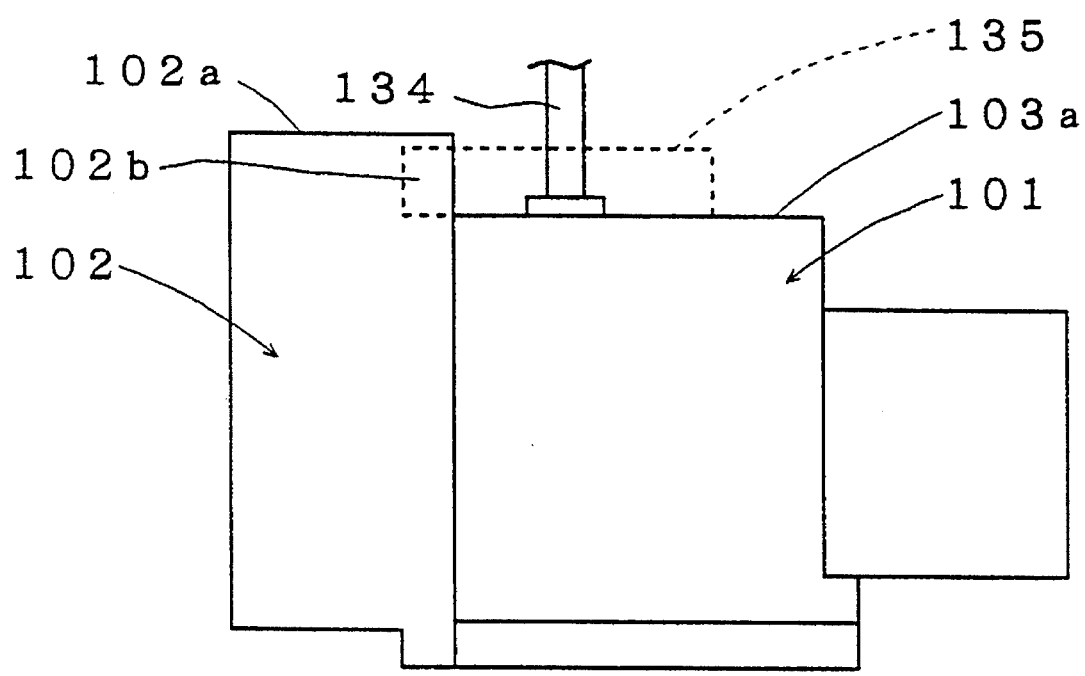
FIG. 19 is an entire side view of a hydraulic pipe of the prior art when connected.

FIGS. 16 to 18 illustrate another preferred embodiment of the braking controller. FIG. 16 is a partial circuit diagram, and FIGS. 17 and 18 are schematic views of the connector in different states.

The circuit of FIG. 16 is a part of the circuit of FIG. 15, and like reference numerals and characters are used to designate parts identical with or corresponding to those of FIG. 15. The circuit of FIG. 16 differs from the circuit of FIG. 15 in that a conduction means 76 having mechanical contacts is substituted for the conduction means 75 including the transistor 75a and the like of FIG. 15 and is disposed in the current conduction path of the warning lamp 74 between the battery +B and ground for connection and disconnection of the current conduction path, and in that the warning lamp 74 is connected to either the collector of an NPN transistor 72d having an emitter grounded in the control circuit 72 or ground by the conduction means 76.

Referring to FIGS. 17 and 18, the conduction means 76 includes a structure of the connector for connecting the fail-safe relay 73 and the control circuit 72 within the electronic control unit 2 to the battery +B, the ignition switch 71 and the like outside the unit 2. A female housing 81a of a connector 81 houses a normal female connecting terminal 82 connected to the warning lamp 74 by a wiring harness W, and a movable terminal 84 including a base portion 83a grounded through a wiring harness W and a movable piece 83b formed integrally with the base portion 83a and having a unidirectional restoring force such that the movable piece 83b moves toward and away from the female connecting terminal 82. A male housing 81b of the connector 81 houses a male connecting terminal 85 connected to the collector of the transistor 72d in the control circuit 72, and a projecting operating element 86 having a forward end for pressing the movable piece 83b of the movable terminal 84 to separate the movable piece 83b from the female connecting terminal 82 when the housings 81a and 81b are fitted together. The movable terminal 84 of the female housing 81a and the operating element 86 of the male housing 81b form the conduction means 76.

In the connected condition of the connector 81 as shown in FIG. 17, deformation of the movable piece 83b pressed by the operating element 86 disconnects the movable terminal 84 from the female connecting terminal 82, and the female and male connecting terminals 85 and 82 are connected to each other. Then the warning lamp 74 and the transistor 72d of the control circuit 72 are connected. The transistor 72d is not on and the warning lamp 74 is off during the normal operation of the control circuit 72. If an abnormality occurs within the control circuit 72, the transistor 72d is turned on and the warning lamp 74 lights up, signalling the abnormality within the control circuit 72.

In the unconnected condition of the connector 81 as shown in FIG. 18, the restoring force of the movable piece 83b brings the movable terminal 84 into contact with the female connecting terminal 82. Then the second end of the warning lamp 74 connected at its first end to the battery +B is grounded, which renders the current conduction path of the warning lamp 74 conductive. The warning lamp 74 lights up to indicate the unconnected condition of the connector 81.

This preferred embodiment provides effects similar to those of the foregoing preferred embodiment.

The conduction means is not limited to that of the preferred embodiments but may be any conduction means for rendering the current conduction path of the warning lamp 74 conductive when the connector is in the unconnected condition.

The alarm means is not limited to the warning lamp described above.

Figure 26:
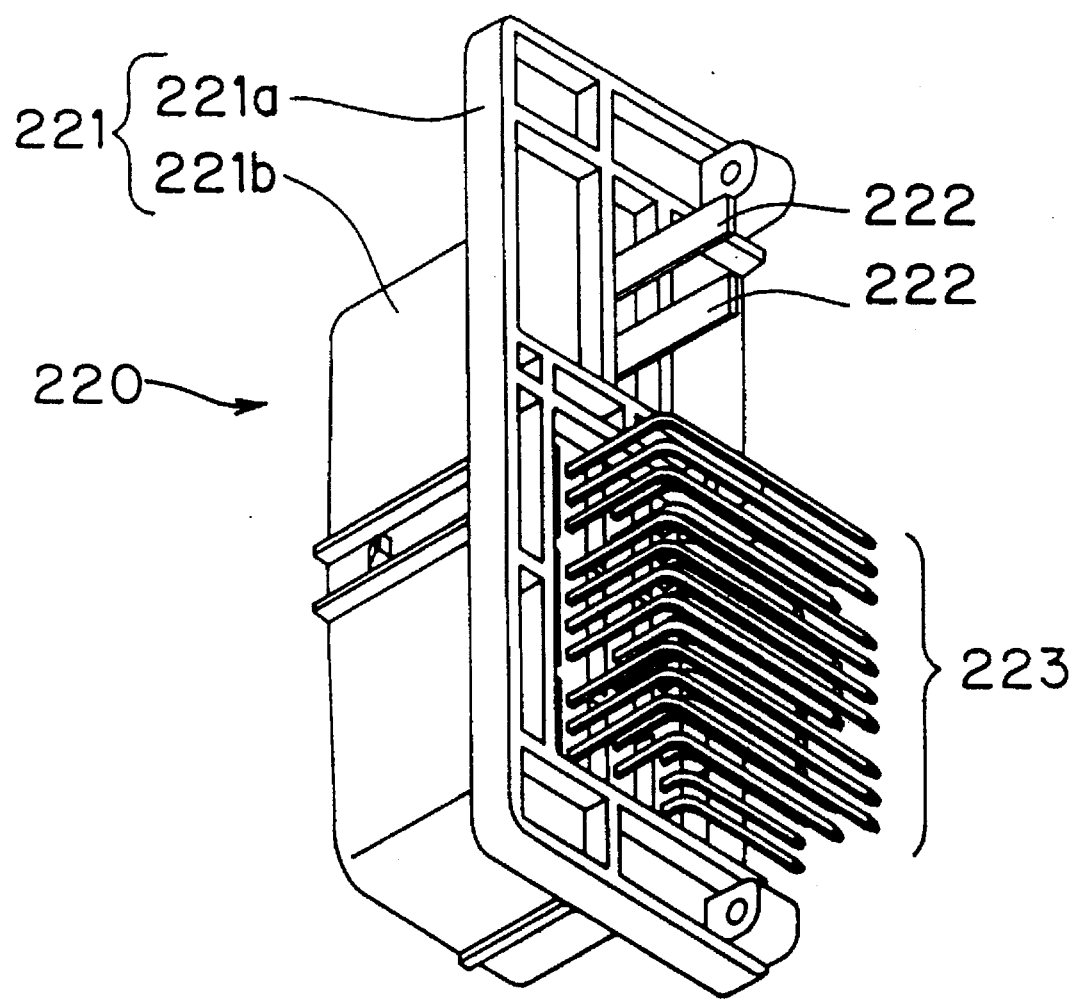
FIG. 26 is a perspective view of a connector of a first preferred embodiment according to the present invention.
Figure 27:
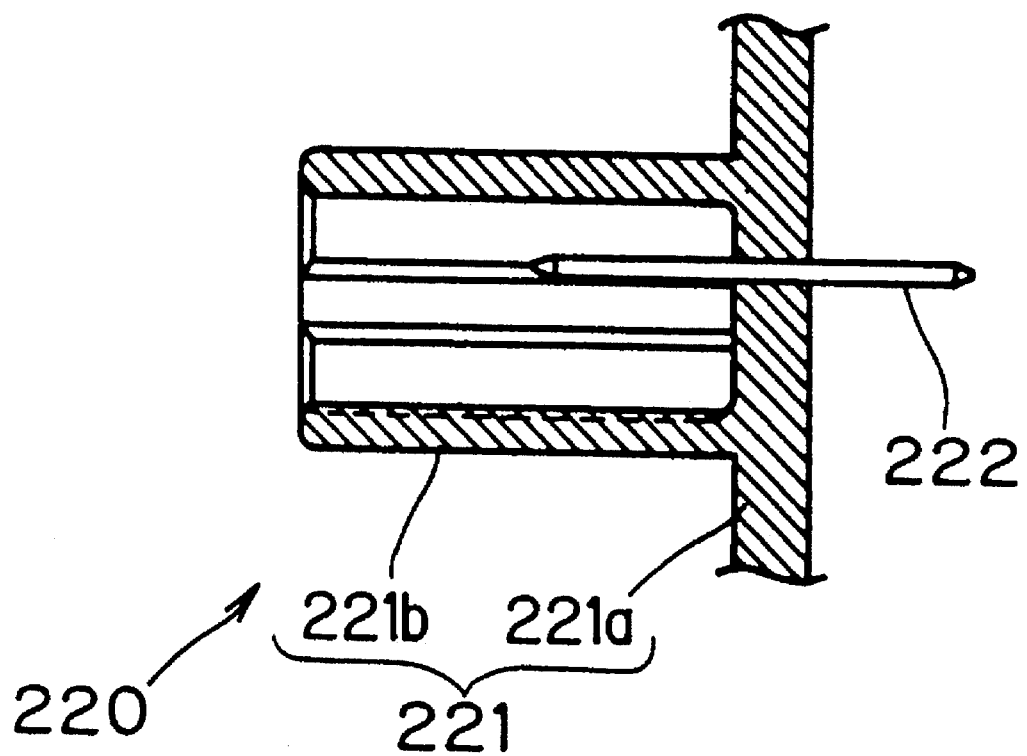
FIG. 27 is a sectional view of the connector of FIG. 26.
Figure 28:
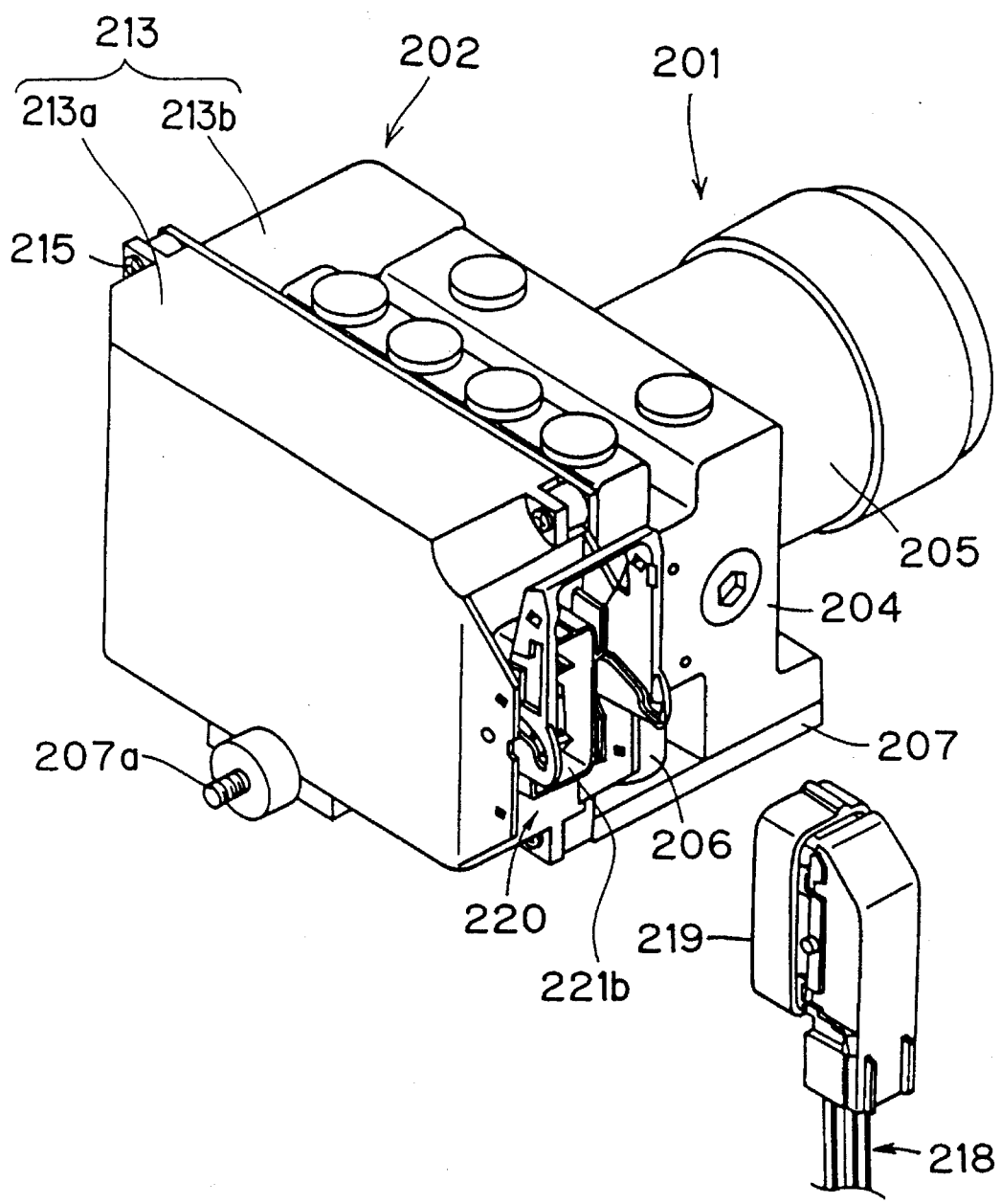
FIG. 28 is a perspective view of the unit integrated system employing the connector of FIG. 26.
Figure 29:
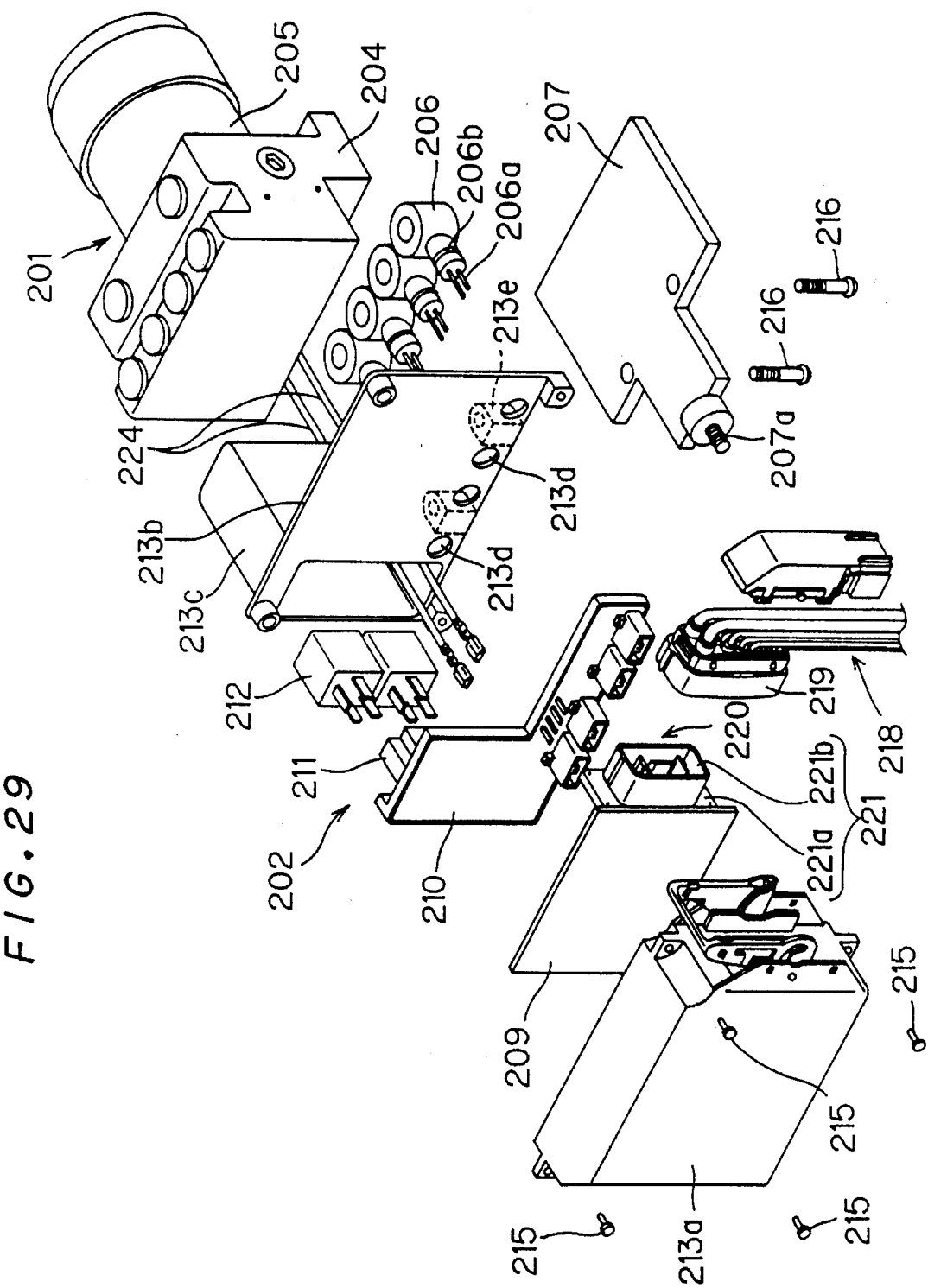
FIG. 29 is an exploded perspective view of the unit integrated system of FIG. 28.

The connector shown in FIGS. 26 and 27 is a connector for use in a unit integrated system into which a hydraulic unit 201 and an electronic control unit 202 are integrated for the automotive antilock brake system (ABS) as shown in FIGS. 28 and 29.

Description will be given below on general construction of the unit integrated system for ABS employing the connector of the present invention.

As shown in FIGS. 28 and 29, the unit integrated system for ABS comprises the hydraulic unit 201 and the electronic control unit 202.

Referring to FIG. 29, the hydraulic unit 201 comprises a housing 204 defining suitable oil passages, a motor 205 fixed on the housing 204 and serving as an actuator, a plurality of solenoids 206 for operating a plurality of flow control valves for opening and closing the oil passages, respectively, and a base plate 207 fixed on the bottom of the housing 204.

The electronic control unit 202 comprises a printed board 209 on which electronic components are mounted, a junction block 210, a plurality of relays 212 connected to connector portions 211 of the junction block 210, a connector 220 fixed on the printed board 209, and a case 213 comprised of a pair of divided case elements 213a, 213b for housing the printed board 209, the junction block 210, and the connector 220.

The printed board 209, the junction block 210, and the connector 220 are electrically connected to each other, and the connector 220 is housed in the divided case element 213a in such a manner that a housing body 221b of the connector 220 on the printed board 209 projects outwardly from a side opening of the divided case element 213a.

The divided case element 213b includes a relay receiving portion 213c for housing the relays 212, and through holes 213 through which connecting portions 206a of the solenoids 206 are inserted. Mounting bosses 213e having screw through holes are formed on the outer surface of the divided case element 213b.

The connecting portions 206a of the solenoids 206 are directly coupled to the printed board 209 and junction block 210 in predetermined positions through the through holes 213d. O-rings 206b fitted over the connecting portions 206a provide a waterproof seal between the connecting portions 206a inserted through the connector through holes 213d and the divided case element 213b.

The divided case elements 213a and 213b are fastened by screws 215, with a rubber plate sealing element not shown being disposed along the outer periphery of the contact surfaces of the divided case elements 213a and 213b. The case 213 and the housing 204 are located in predetermined positions on the base plate 207, and fixing screws 216 are threaded into the screw through holes of the mounting bosses 213e, thereby fixing the housing 204 on the base plate 207. This achieves the integration of the hydraulic unit 201 and the electronic control unit 202.

The base plate 207 includes at its one end a screw portion 207a for mounting to the vehicular chassis.

To the connector 220 projecting from the opening of the divided case element 213a is removably connected a harness-side connector 219 provided at one end of wiring harnesses 218 for receiving various sensor signals from the vehicle and electric from the battery.

Referring to FIGS. 26 and 27, the connector 220 comprises a connector housing 221 fixed on the printed board 209 serving as a fixing member and including a base plate 221a and a rectangularly tubular housing body 221b to be fitted in the harness-side connector 219; two flat terminals 222 housed in an upper portion of the connector housing 221 in juxtaposition with each other and forming a first terminal group for large current; and a plurality of pin terminals 223 housed in a lower portion of the connector housing 221 and forming a second terminal group for small current. Portions of the pin terminals 223 which are directed outwardly of the connector housing 221 are bent about 90 degrees toward the printed board 209 so that electrical connection is permitted between the pin terminals 223 and the components mounted on the printed board 209 when the connector housing 221 is fixed on the printed board 209.

The pin terminals 223 at their first end inside the connector housing 221 are connected to various sensors through the harness-side connector 219 and the wiring harnesses 218, and the pin terminals 223 at their second end outside the connector housing 221 are connected to electronic components mounted on the printed board 209 corresponding to a second component by soldering or the like.

The flat terminals 222 at their first end inside the connector housing 221 are connected to a battery and the like through the harness-side connector 219 and the wiring harnesses 218, and the flat terminals 222 at their second end outside the connector housing 221 are connected to the motor 205 corresponding to a first component through wiring harnesses 224 (FIG. 29).

Since the flat terminals 222 forming the first terminal group and the pin terminals 223 forming the second terminal group are housed in the single connector housing 221, the plurality of connectors of the prior art are not required for connection between the battery and the motor 205 corresponding to a large-current circuit portion and between the sensor for generating a small-current signal and the electronic components receiving the signal. This provides reduction in the number of components and the number of assembling steps for connection of the connector.

Although the flat terminals 222 form the first terminal group and the pin terminals 223 form the second terminal group in this preferred embodiment, the present invention is not so limited.

The arrangement of the respective terminal groups for large current and small current within the connector housing is not limited to that of FIG. 26.

The present invention is not limited to the unit integrated system for the ABS described above but is applicable to general various systems such as the traction control system (TCS).

FIGS. 30, 31, 32A and 32B illustrate a second preferred embodiment of the connector.

Figure 35:
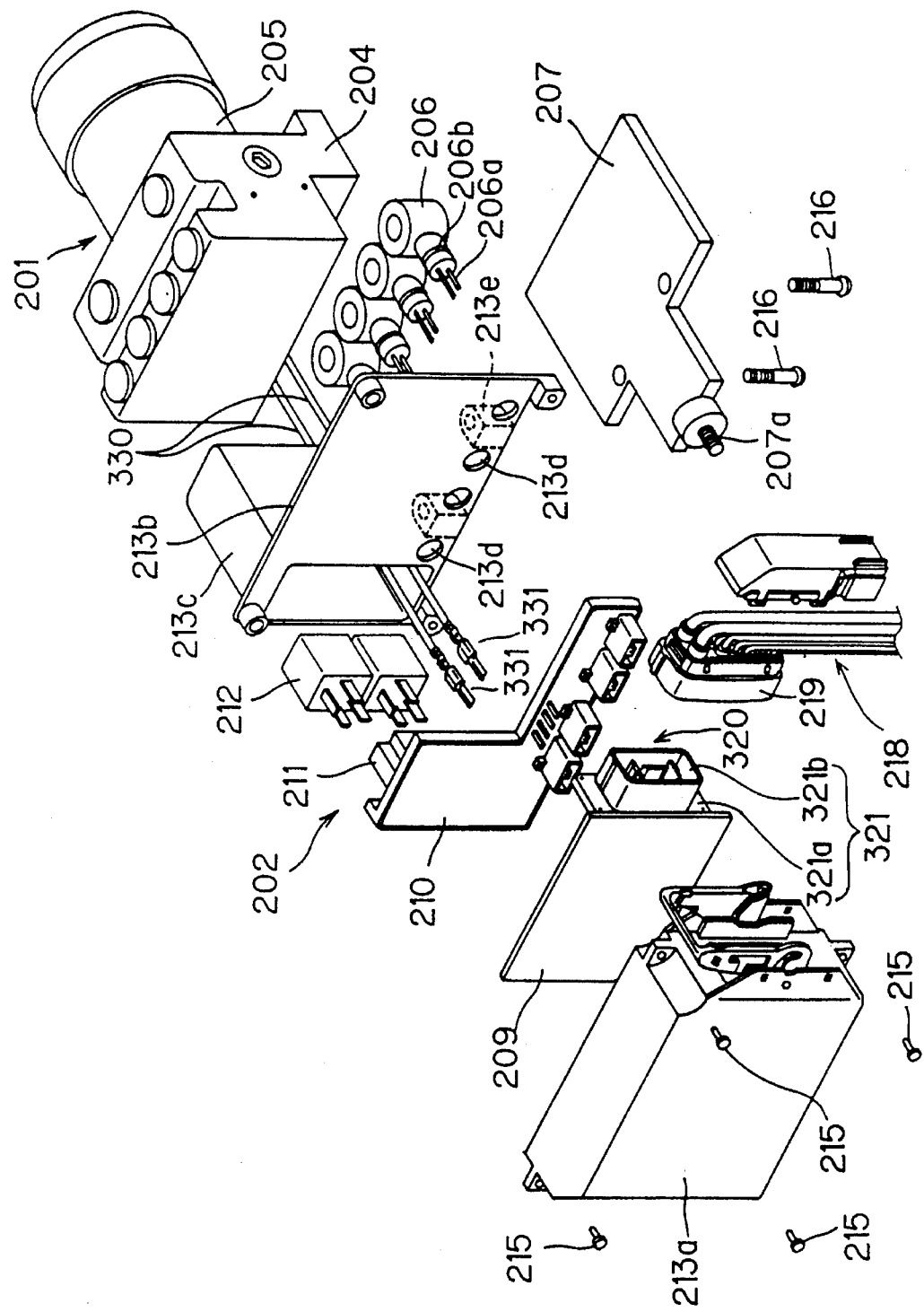
FIG. 35 is a perspective view of the unit integrated system employing the connector of FIGS. 30 and 33.

A connector 320 shown in FIGS. 30 to 32B is used for the unit integrated system shown in FIG. 35 which is similar in construction to the unit integrated system of FIG. 29. Like reference numerals and characters are used to designate parts identical with those of FIG. 29 and the description thereof will be omitted herein.

Referring to FIGS. 30, 31, 32A, 32B, the connector 320 comprises a connector housing 321 fixed on the printed board 209 and including a base plate 321a and a rectangularly tubular housing body 321b formed integrally with the front surface of the base plate 321a and to be fitted in the harness-side connector 219; a terminal receiving chamber 322 formed on an upper part of the rear surface of the housing 321; a first terminal group 333 for large current formed by the ends of wiring harnesses to be described later; and a plurality of pin terminals 322 forming a second terminal group for small current housed in a lower portion of the housing 321 and having a rear half directed outwardly of the housing 321. The portions of the pin terminals 323 which are directed outwardly of the housing 321 are bent about 90 degrees toward the printed board 209 so that electrical connection is permitted between the pin terminals 323 and the components mounted on the printed board 209 when the housing 321 is fixed on the printed board 209.

Figure 30:
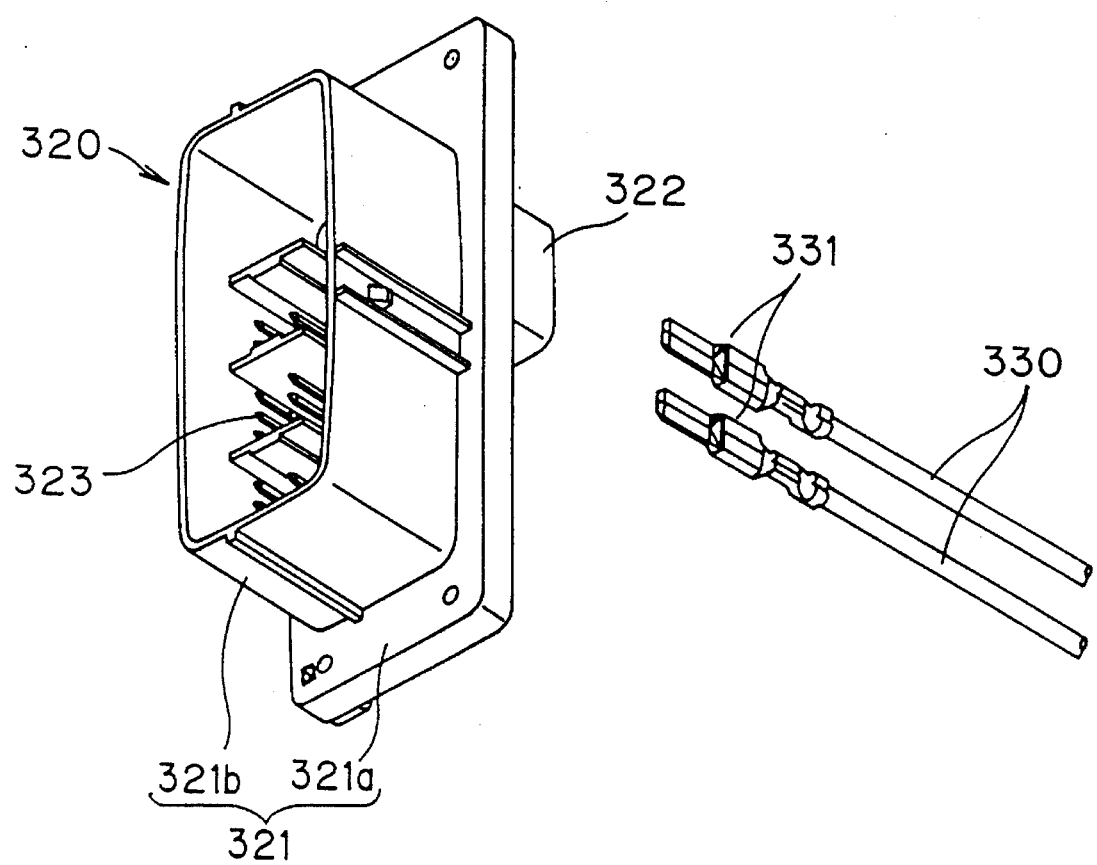
FIG. 30 is a perspective view of the connector of a second preferred embodiment according to the present invention.
Figure 32A:
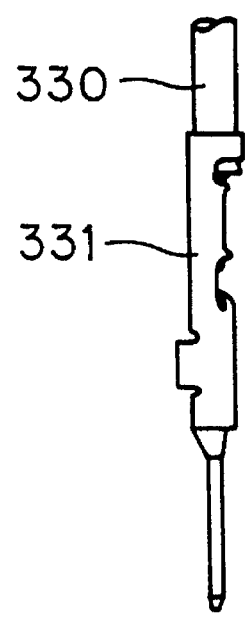
FIGS. 32A and 32B are sectional views of the connector of the second preferred embodiment.
Figure 32A:
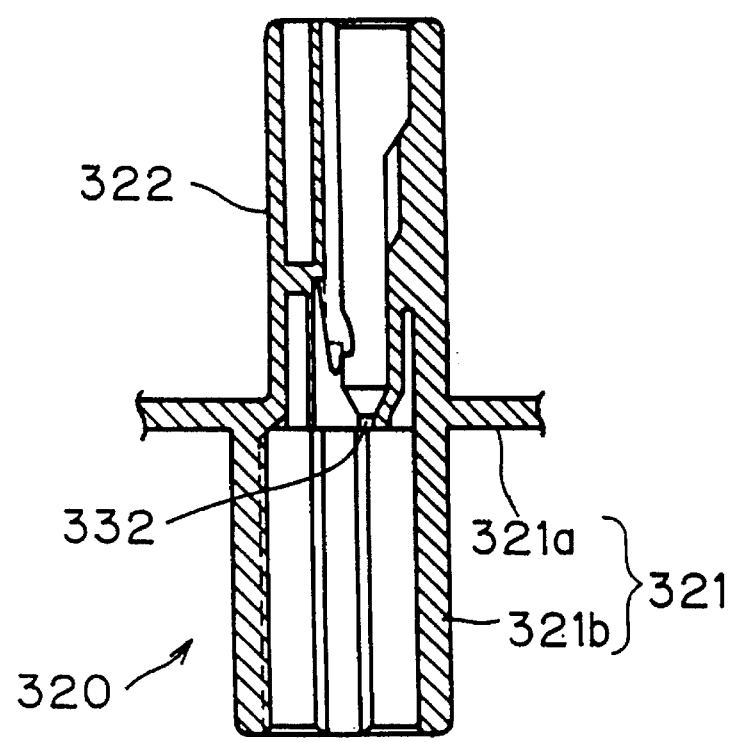
Figure 32B:
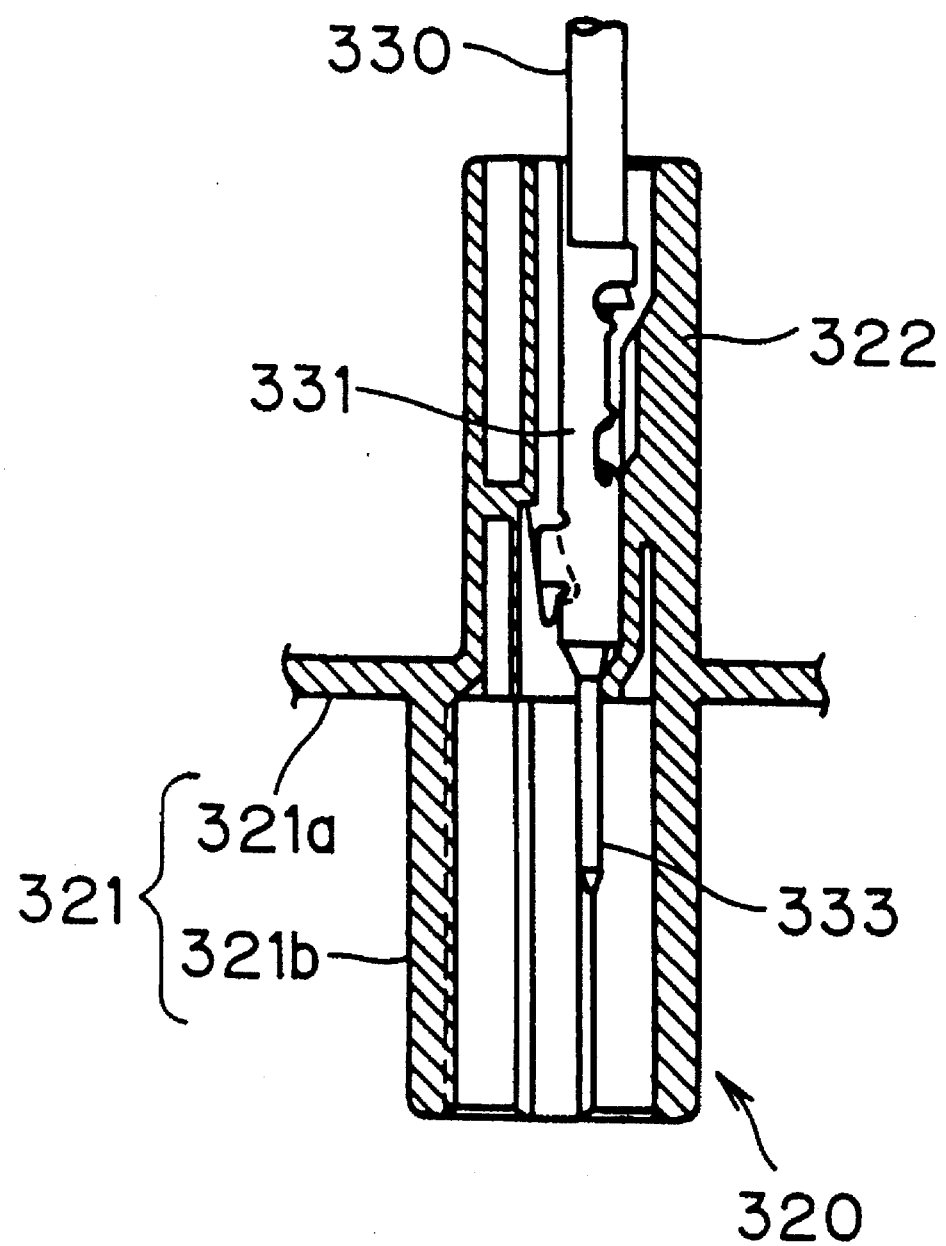

Referring to FIGS. 30 and 32A, terminals 331 are connected to the forward ends of two wiring harnesses 330 (FIG. 35) connected to the motor 205 corresponding to the first component. The two terminals 331 are housed in the terminal receiving chamber 322 as shown in FIG. 32B, and the tips of the terminals 331 are inserted through two through holes 332 formed in the base plate 321a within the terminal receiving chamber 322 into the interior of the housing body 321b, thereby to form the first terminal group 333 for large current. The first terminal group 333 is connected to the battery through the harness-side connector 219 and the wiring harnesses 218.

The wiring harnesses 330 pass through the rear wall of the relay receiving portion 213a in liquid tight relation by a sealing material or the like and into the case 213.

The pin terminals 323 at their first end inside the housing 321 are connected to various sensors through the harness-side connector 219 and the wiring harnesses 218, and the pin terminals 323 at their second end outside the housing 321 are connected to the electronic components mounted on the printed board 209 corresponding to the second component by soldering or the like.

Since the first terminal group 333 formed by the terminals at the end of the wiring harnesses 330 and the pin terminals 323 serving as the second terminal group are housed in the single connector housing 321, the connector housing of the prior art for housing the terminal connected to the wiring harness end is not required for connection between the battery and the motor 205 corresponding to the large-current circuit portion and between the sensor for generating the small-current signal and the electronic components receiving the signal. This provides reduction in the number of components and the number of assembling steps for connection of the connector.

Figure 31:
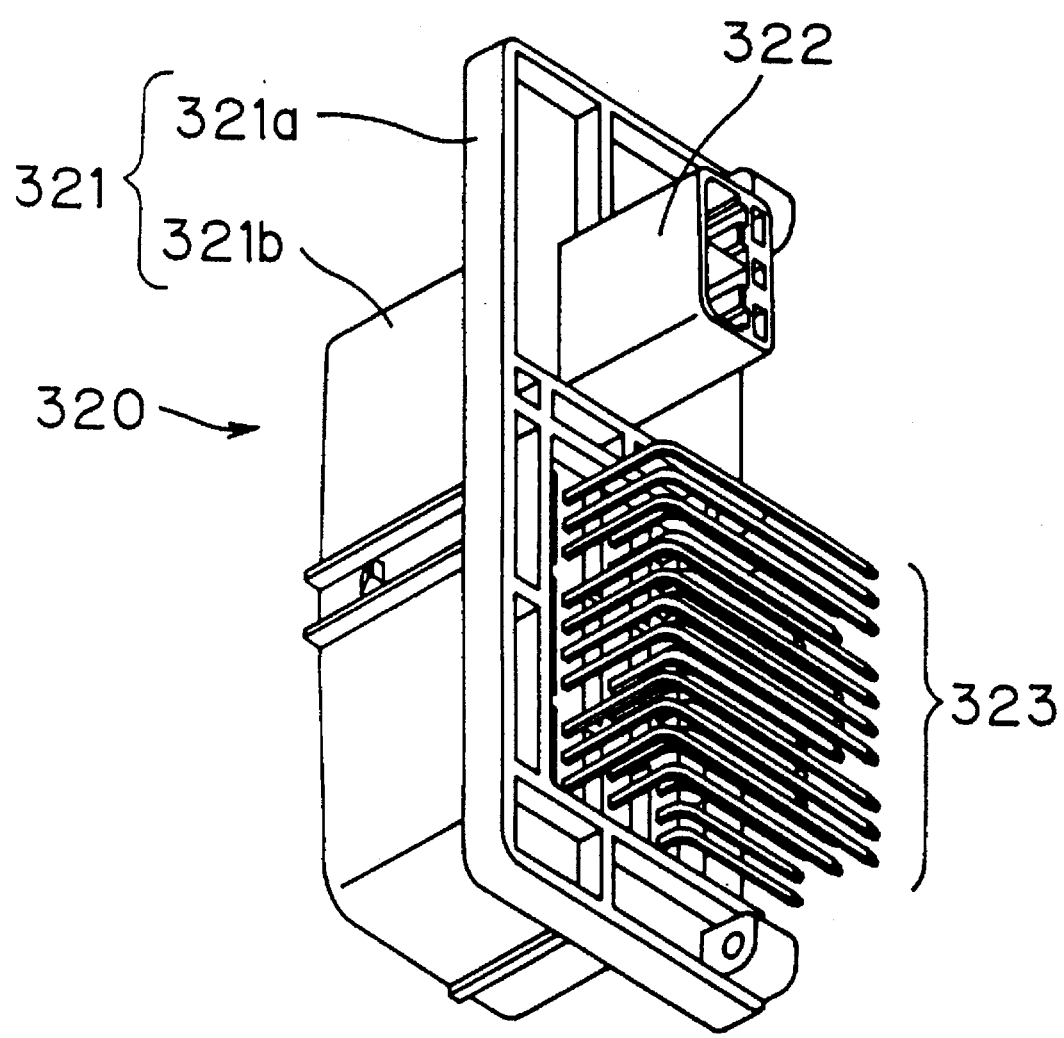
FIG. 31 is a perspective view of the connector of FIG. 30 as viewed from an angle different from that of FIG. 30.
Figure 33:
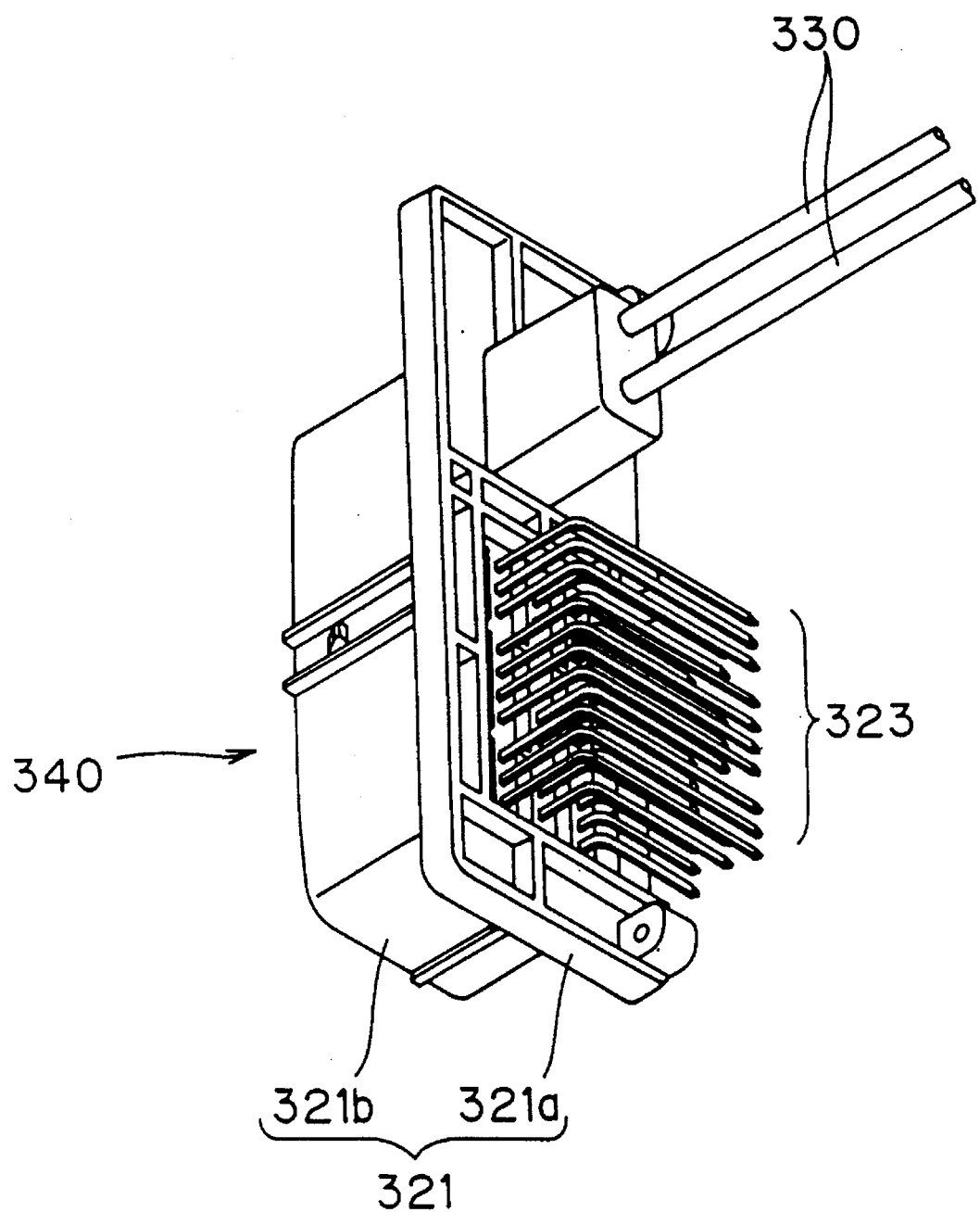
FIG. 33 is a perspective view of a modification of the connector of the second preferred embodiment.
Figure 34:
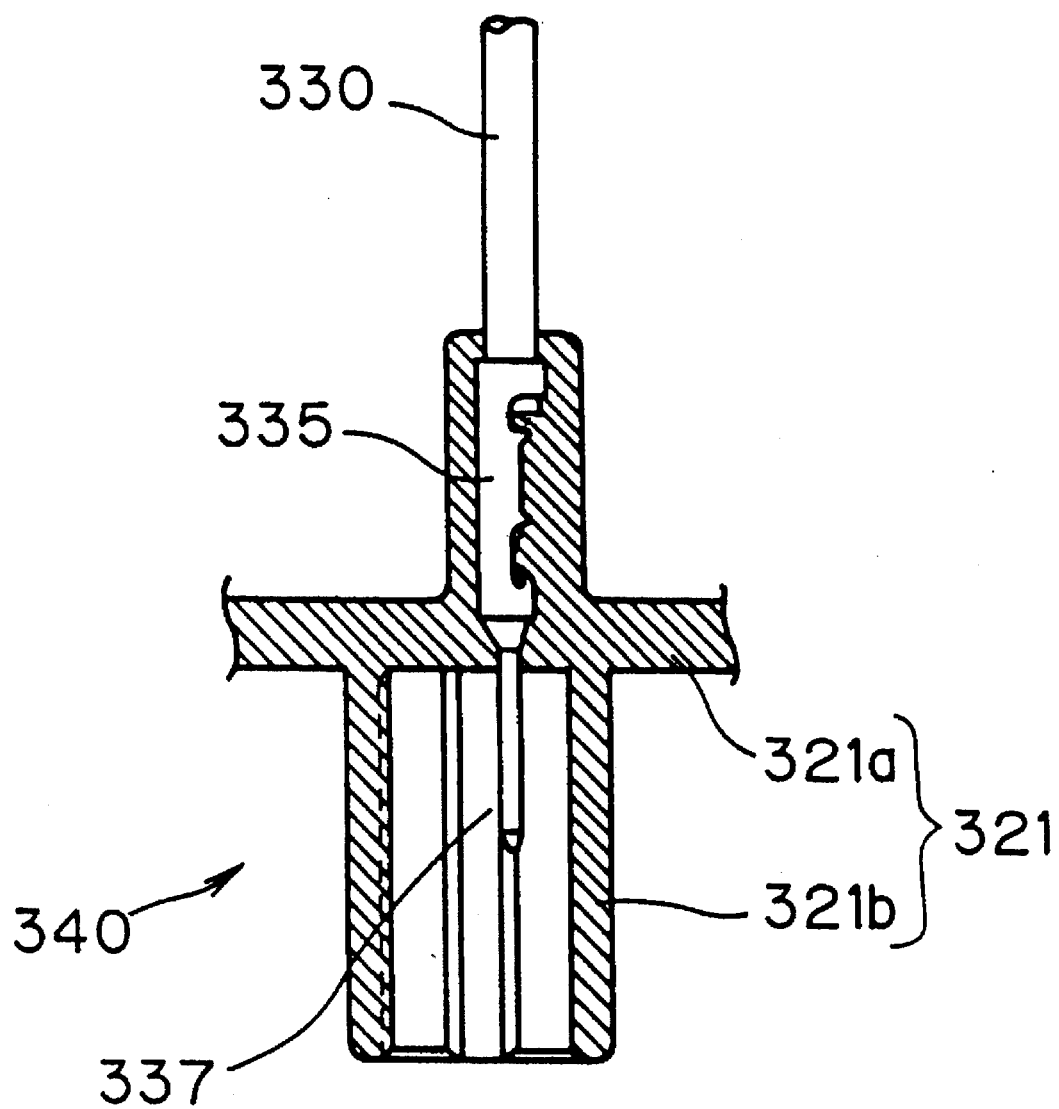
FIG. 34 is a sectional view of the connector of FIG. 33.

FIGS. 33 and 34 illustrate a modification of the connector 320 of FIG. 31. FIG. 33 is a perspective view of the connector as viewed from the obliquely lower rear thereof, and FIG. 34 is a plan view in cross section of the connector.

Like reference numerals and characters are used in FIGS. 33 and 34 to designate parts identical with or corresponding to those of FIGS. 30 to 32B. The connector of FIGS. 33 and 34 differs from the connector of FIGS. 30 to 32B in that the terminal receiving chamber 322 is eliminated, that terminals 335 connected to the respective forward ends of the two wiring harnesses 330 are formed by insert molding, that the tips of the terminals 335 are introduced into the housing body 321b to form a first terminal group 337 for large current, and that the first terminal group 337 and the pin terminals 323 forming the second terminal group are housed in the single connector housing 321 to form a connector 340.

Thus the modification provides effects similar to those of the second preferred embodiment.

Although the terminals in the second terminal group are the pin terminals in the second preferred embodiment, the present invention is not so limited.

The arrangement of the respective terminal groups for large current and small current within the housing is not limited to that of the second preferred embodiment.

The present invention is not limited to the unit integrated system for the above-mentioned ABS but is applicable to general various systems such as the traction control system (TCS).

Although all of the terminals in the first terminal group for large current are the terminals connected to the ends of the wiring harnesses in the second preferred embodiment, some of the terminals in the first terminal group may be these terminals.

Figure 38:
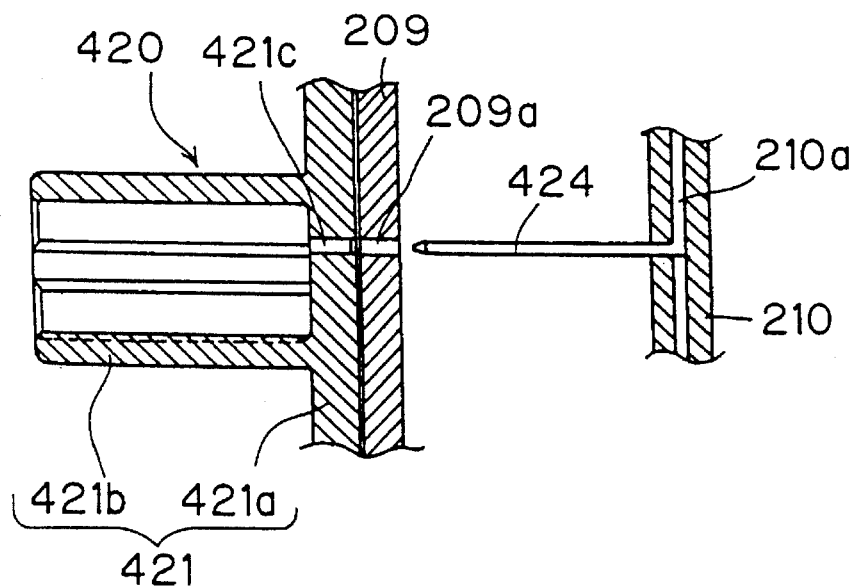
FIGS. 38 and 39 are sectional views of the connector of the third preferred embodiment.
Figure 39:
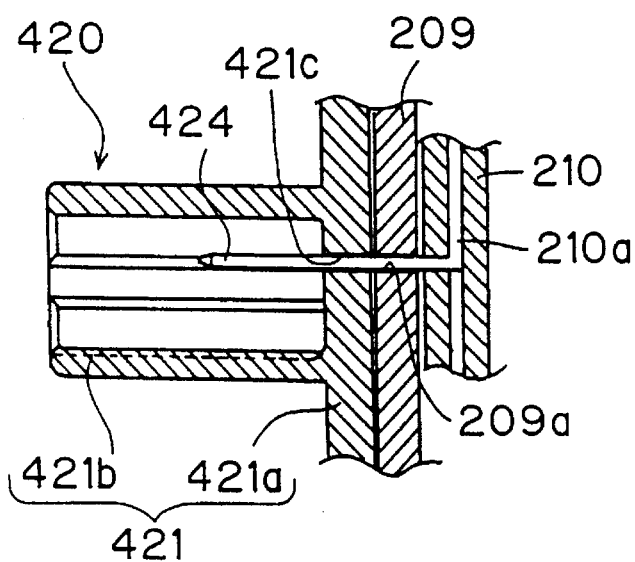
Figure 40:
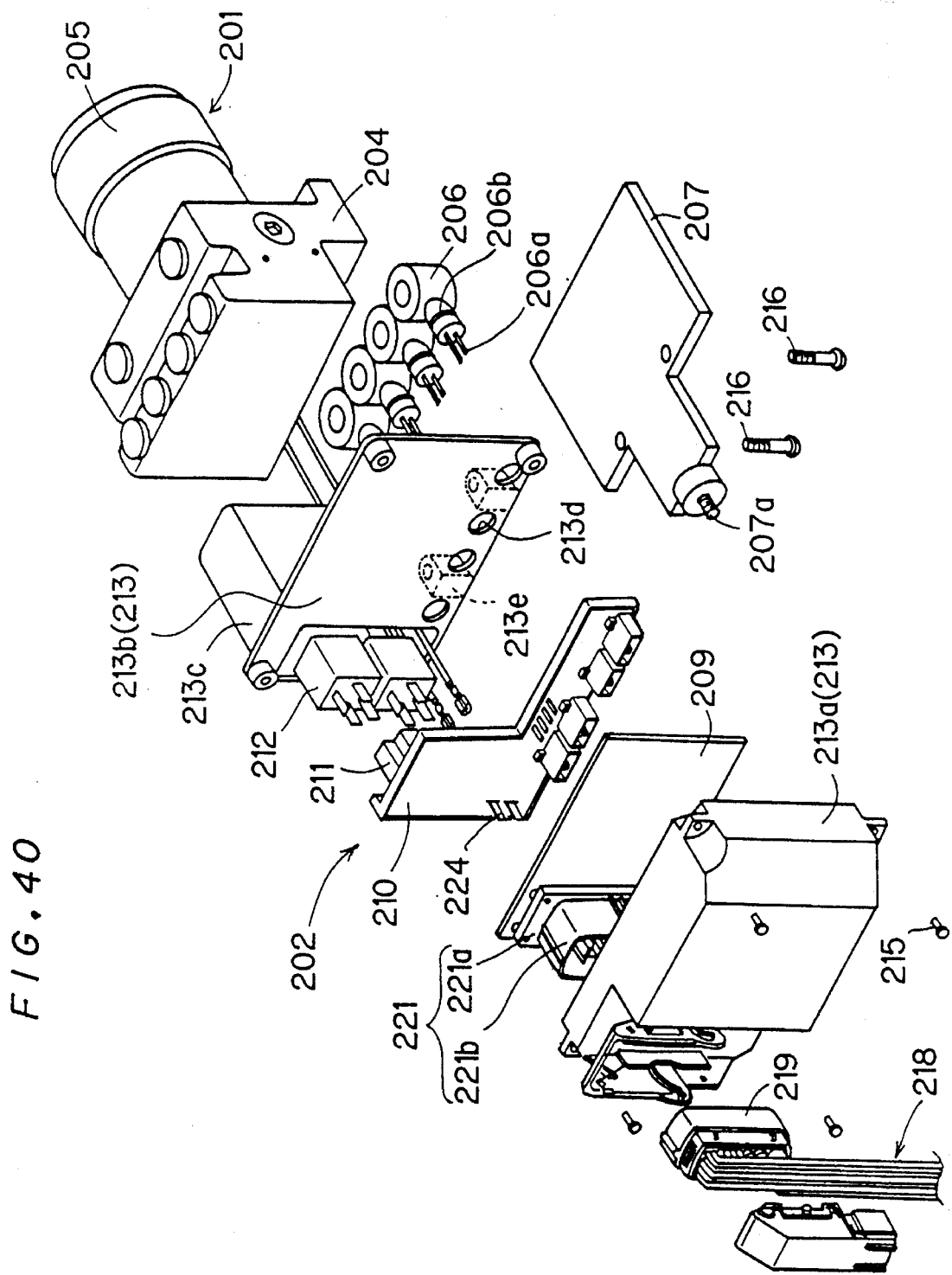
FIG. 40 is a perspective view of the unit integrated system employing the connector of FIG. 36.

FIGS. 36 to 39 illustrate a third preferred embodiment of the connector for use in the unit integrated system for the automotive antilock brake system (ABS) in which the hydraulic unit 201 and the electronic control unit 202 formed integrally as shown in FIG. 40.

The unit integrated system of FIG. 40 is substantially identical in construction with the unit integrated system of FIG. 29 except the mounting position of the connector 20. Thus, like reference numerals and characters are used to designate identical parts, and the description thereof will be omitted herein.

Figure 36:
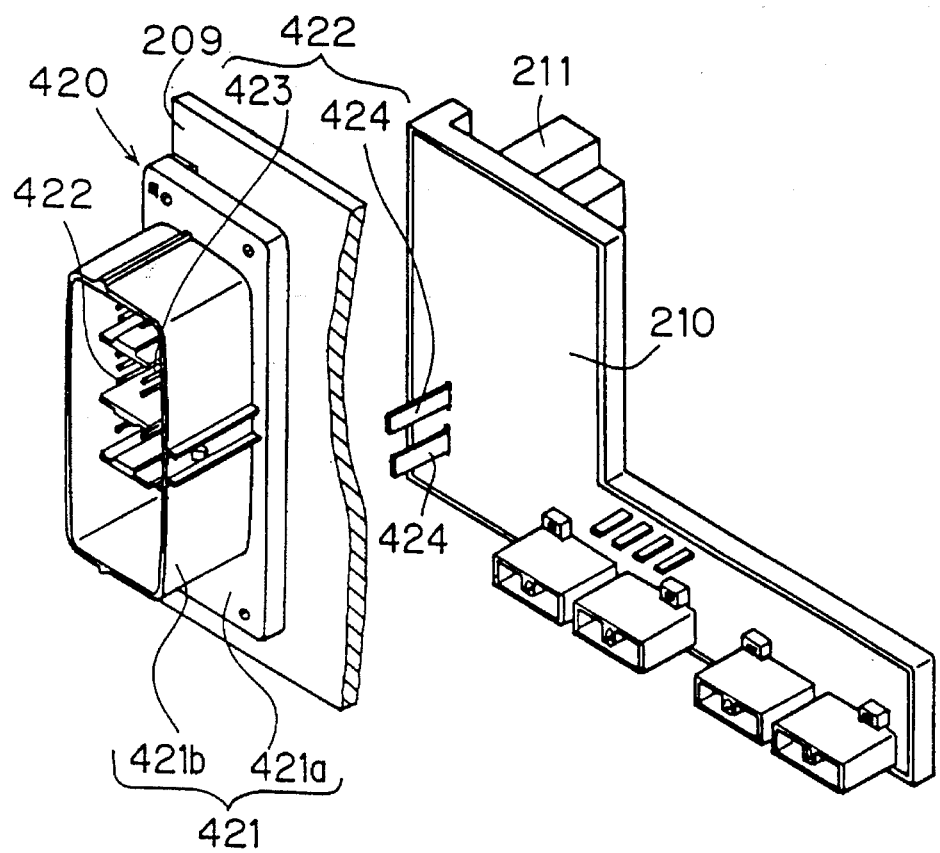
FIG. 36 is a perspective view of the connector of a third preferred embodiment according to the present invention.
Figure 37:
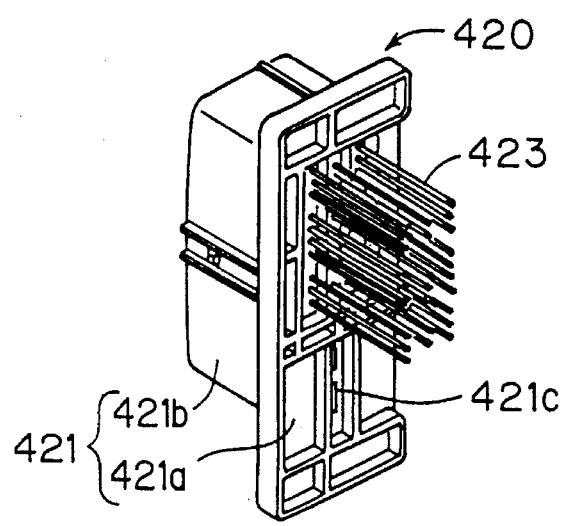
FIG. 37 is a perspective view of the connector of FIG. 36 as viewed from an angle different from that of FIG. 36.

Referring to FIGS. 36 and 37, a connector 420 comprises a connector housing 421 including a base plate 421a and a rectangularly tubular housing body 421b to be fitted in the harness-side connector 219, and a connecting terminal 422. The base plate 421a is fixed to the printed board 209.

The connecting terminal 422 includes a multiplicity of pin terminals 423 connected to the printed board 209, and flat terminals 424 for connection to the junction block 210.

As shown in FIG. 37, the pin terminals 423 are fixed to the base plate 421a while passing therethrough. The pin terminals 423 are adapted to pass through the printed board 209 to be connected to the circuit on the rear surface (the opposite side from the surface on which the connector 420 is fixed) of the printed board 209.

Each of the flat terminals 424 is a partial projection of a bus bar 210a of the junction block 210 as shown in FIG. 38. The projection is inserted through through holes 209a and 421c of the printed board 209 and base plate 421a and into the housing body 421b, thereby being used as a terminal as shown in FIG. 39.

The junction block 210 and the printed board 209 are not fixed relative to each other, but are fixed to the case 213 respectively in predetermined positions, to permit the flat terminals 424 to be held in the housing body 421b.

Although the bus bars 210a of the junction block 210 are used as the connecting terminal 422 of the connector 420 in the third preferred embodiment, some of the various electric components disposed adjacent the connector may be used as the connecting terminal.

Figure 42:
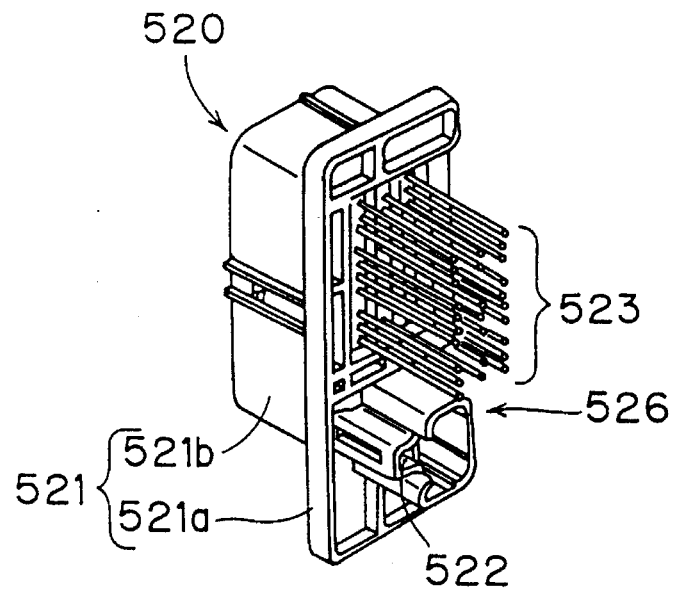
FIG. 42 is a perspective view of the connector of FIG. 41 as viewed from an angle different from that of FIG. 41.
Figure 43A:
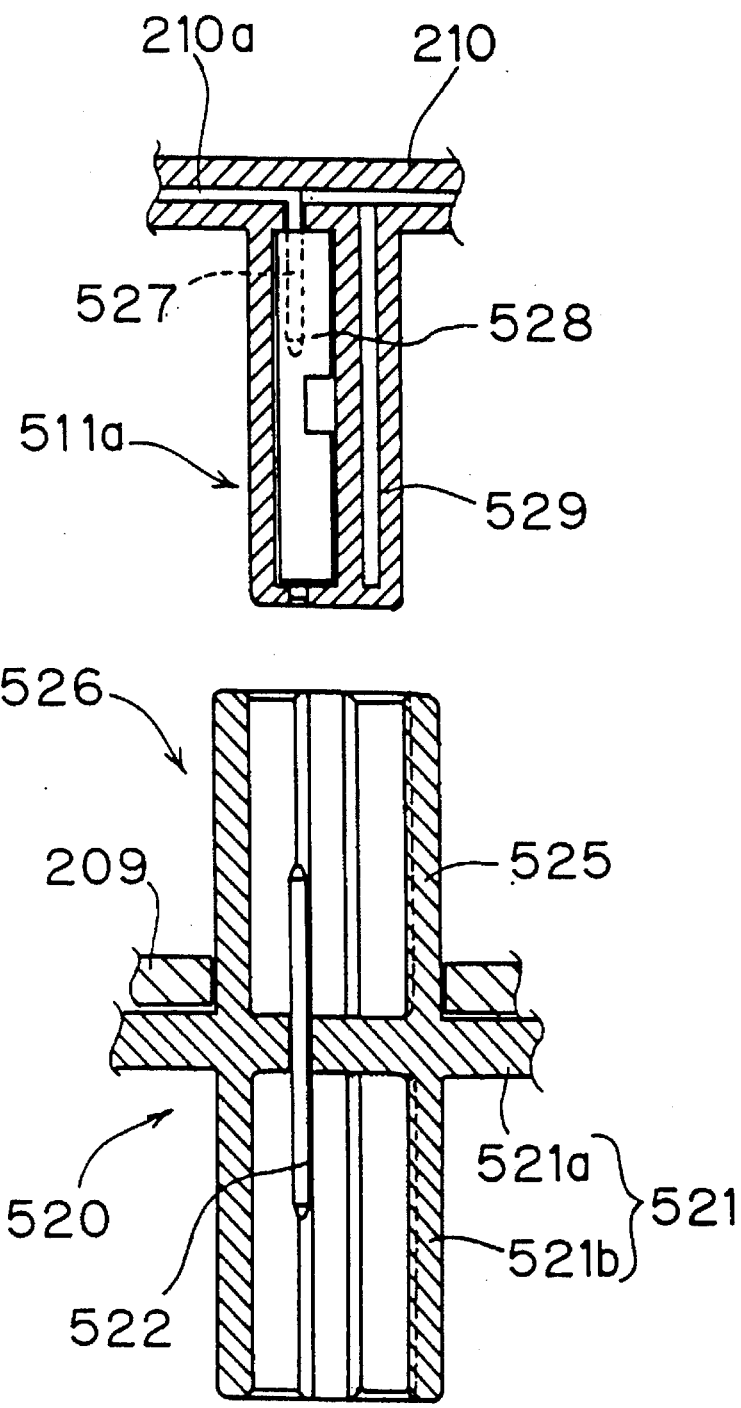
FIGS. 43A and 43B are sectional views of the connector of the fourth preferred embodiment.
Figure 43B:
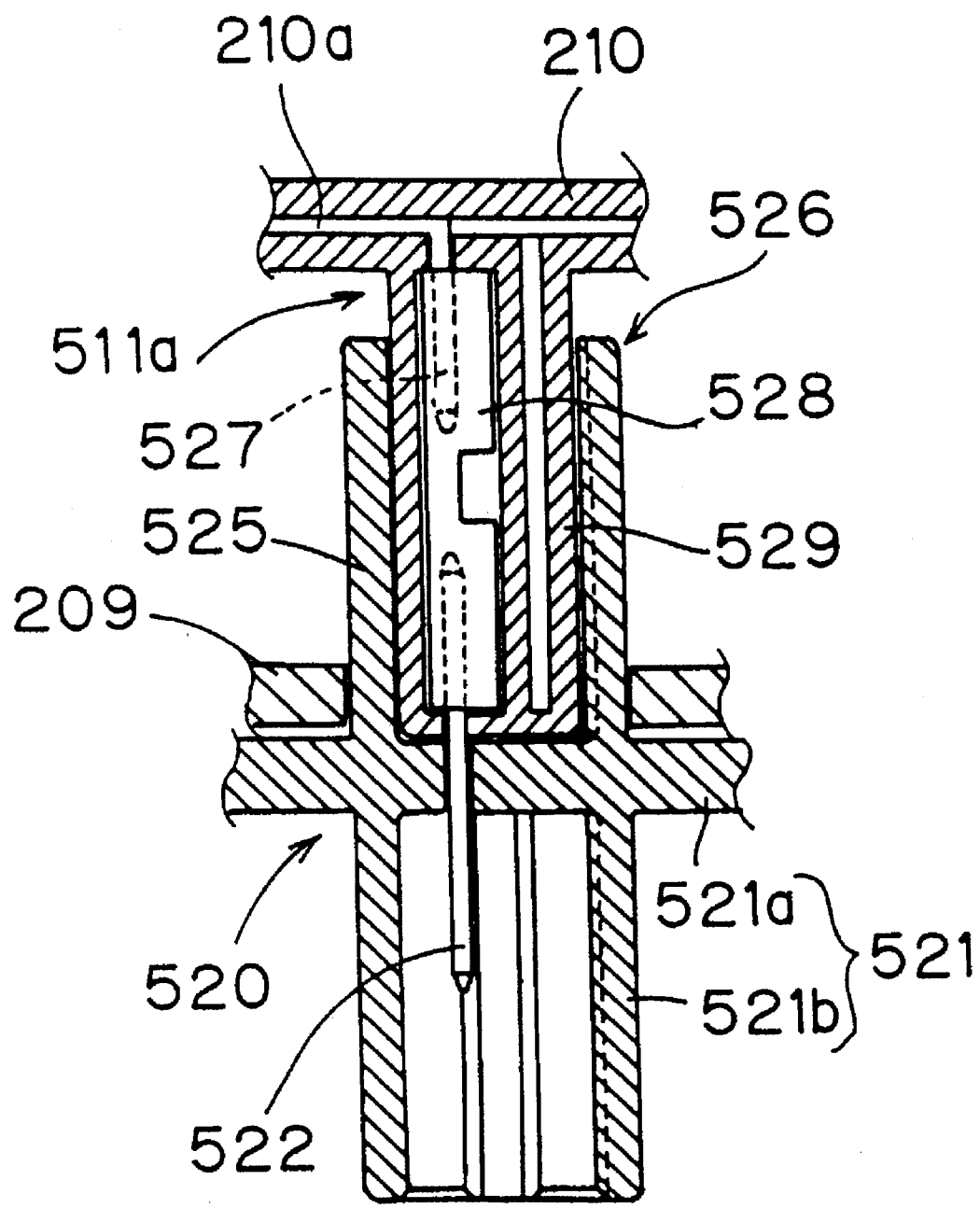
Figure 44:
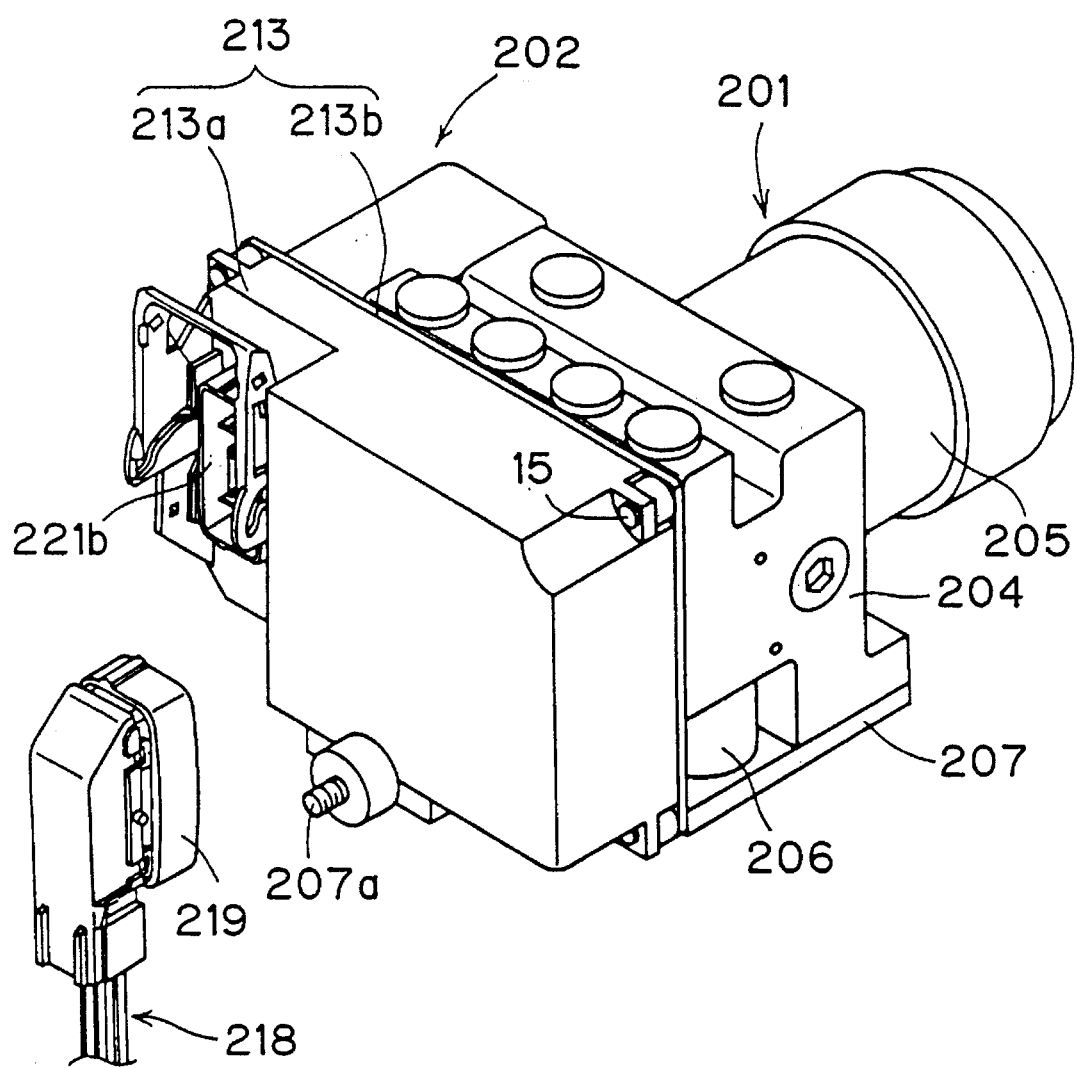
FIG. 44 is a perspective view of the unit integrated system employing the connector of FIG. 41.
Figure 45:
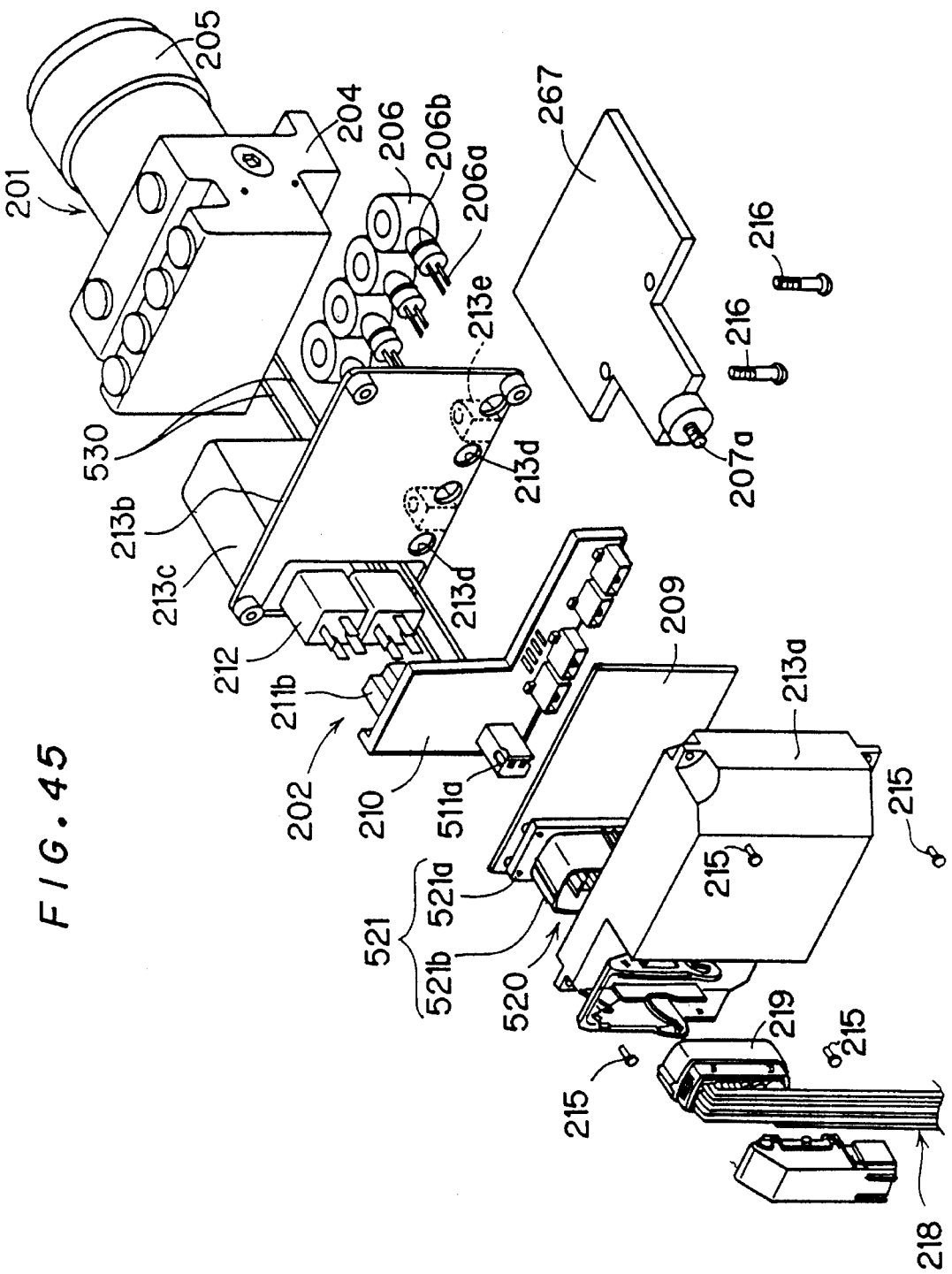
FIG. 45 is an exploded perspective view of the unit integrated system of FIG. 44.

FIGS. 41, 42, 43A, 43B illustrate a fourth preferred embodiment of the connector for use in the unit integrated system shown in FIGS. 44 and 45. The unit integrated system of FIGS. 44 and 45 is substantially similar in construction to the unit integrated system of FIG. 40. Accordingly, like reference numerals and characters are used to designate the identical parts, and the description thereof will be omitted herein.

Figure 41:
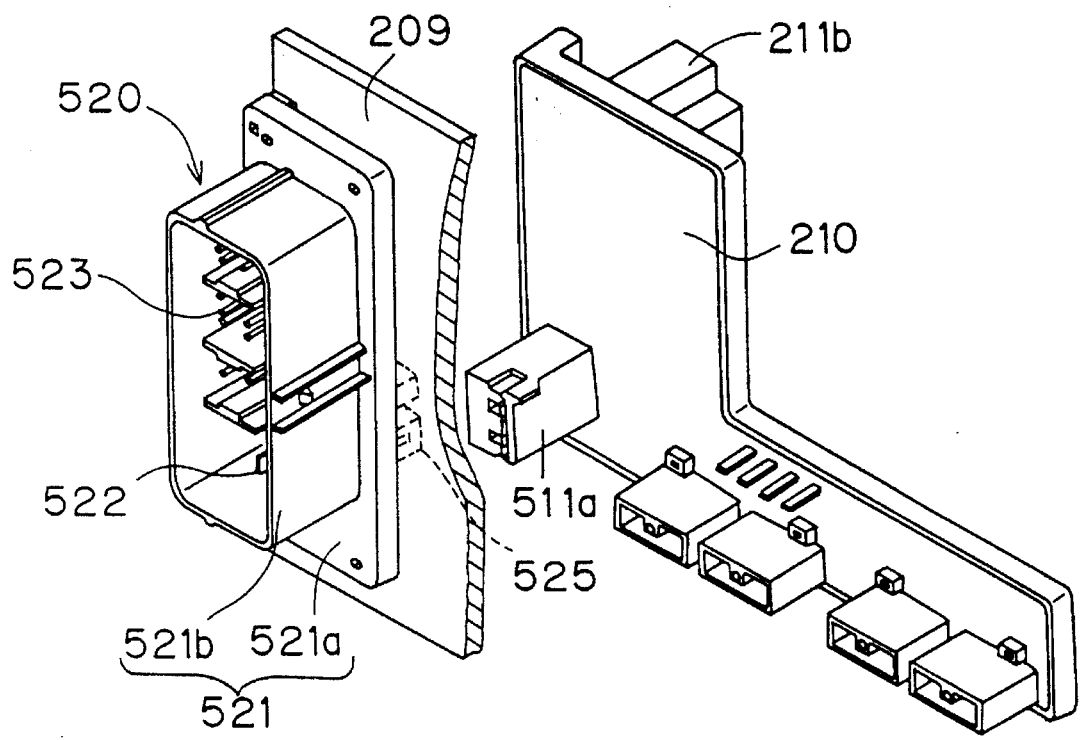
FIG. 41 is a perspective view of the connector of a fourth preferred embodiment according to the present invention.

Referring to FIGS. 41 and 42, a connector 520 comprises a connector housing 521 fixed on the printed board 209 and including a base plate 521a and a rectangularly tubular housing body 521b formed integrally with the front surface of the base plate 521a and to be fitted in the harness-side connector 219; two flat terminals 522 forming the first terminal group for large current housed in a lower portion of the connector housing 521 in juxtaposition with each other and having a rear half directed outwardly of the connector housing 521; and a plurality of pin terminals 523 forming the second terminal group for small current housed in an upper portion of the connector housing 521 and having a rear half directed outwardly of the connector housing 521. The portions of the pin terminals 523 which are directed outwardly of the connector housing 521 are electrically connected to the components mounted on the printed board 209 when the connector housing 521 is fixed on the printed board 209.

As shown in FIG. 42, a connector portion 526 having a terminal portion which is the rear half of the flat terminals 522 which is directed outwardly of the connector housing 521 is formed on a lower portion of the rear surface of the base plate 521a of the connector housing 521. The connector portion 526 is adapted to be fitted on a connector portion 511a of the junction block 210.

The connector portion 511a of the junction block 210 includes a connecting terminal 527, a female relay terminal 528, and a housing 529, as shown in FIG. 43A. The connecting terminal 527 is formed by forwardly bending a part of each bus bar 210a of the junction block 210 which is an electric circuit element. A rear portion of the female relay terminal 528 is mounted on the connecting terminal 527. The housing 529 is formed integrally with a lower left portion of the front surface of the junction block 210 in such a manner as to enclose and houses the female relay terminal 528.

As shown in FIG. 43B, when the connector portion 511a is fitted into the connector portion 526, the rear portion of the flat terminal 522 is inserted into a front portion of the relay terminal 528 of the connector portion 511a within the connector terminal 526, thereby connecting the flat terminal 522 to the bus bar 210a. The flat terminals 522 connected to the bus bars 210a are further connected to the motor 205 through wiring harnesses 530 (FIG. 45). In the connector housing 521, the flat terminals 522 are connected to the battery through the harness-side connector 219 and the wiring harnesses 218.

The wiring harnesses 530 pass through the rear wall of the relay receiving portion 213c in liquid tight relation by a sealing material or the like and into the case 213.

The pin terminals 523 at their first end outside the connector housing 521 are connected to the electronic components mounted on the printed board 209 by soldering or the like, and the pin terminals 523 at their second end inside the connector housing 521 are connected to various sensors through the harness-side connector 219 and the wiring harnesses 218.

The flat terminals 522 forming the first terminal group and the pin terminals 523 forming the second terminal group are housed in the single connector housing 521, and the connector portion 526 is formed in at least a part of the outwardly directed portions of the flat terminals 522 which are directed outwardly of the connector housing 521. Thus, only by fitting the connector portion 526 over the connector portion 511a using a part of the bus bar 510a of the junction block 210 as a terminal, connection is easily made between the components within the unit integrated system and the connector 520 without the prior art soldering step.

Figure 46A:
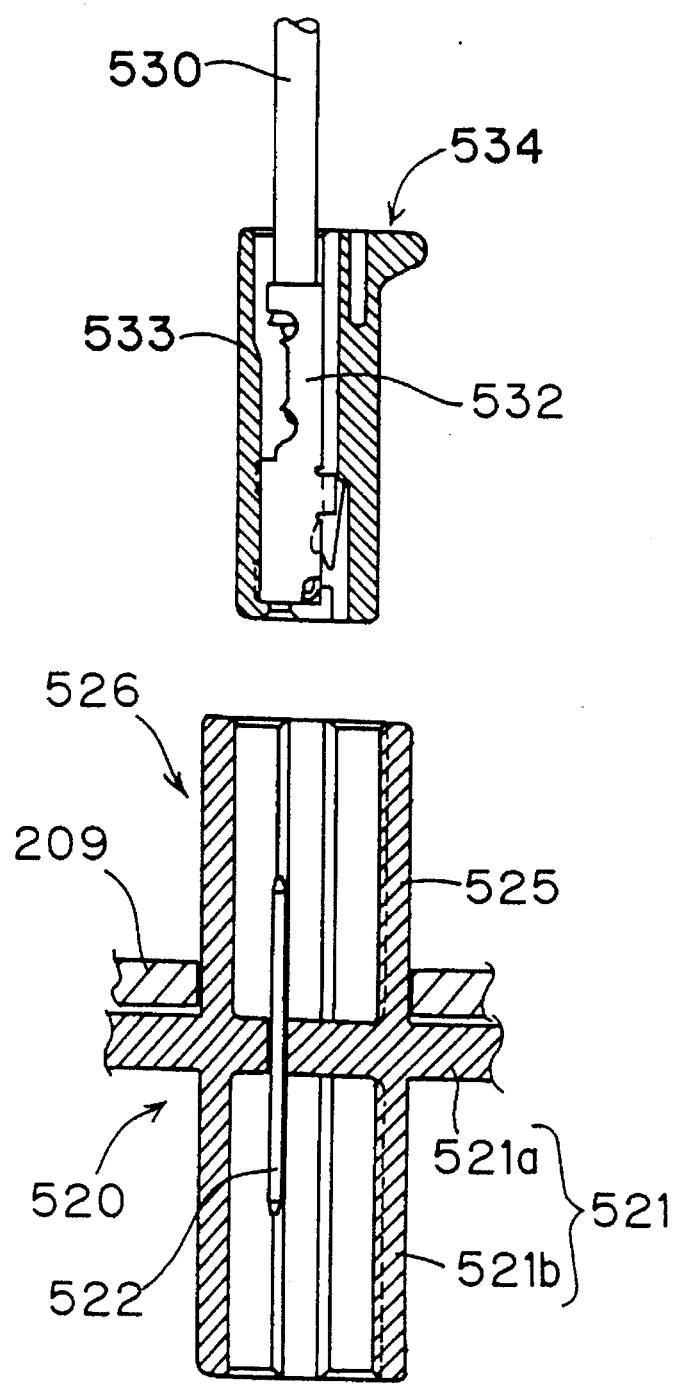
FIGS. 46A and 46B are sectional views of a modification of the connector of the fourth preferred embodiment.
Figure 46B:
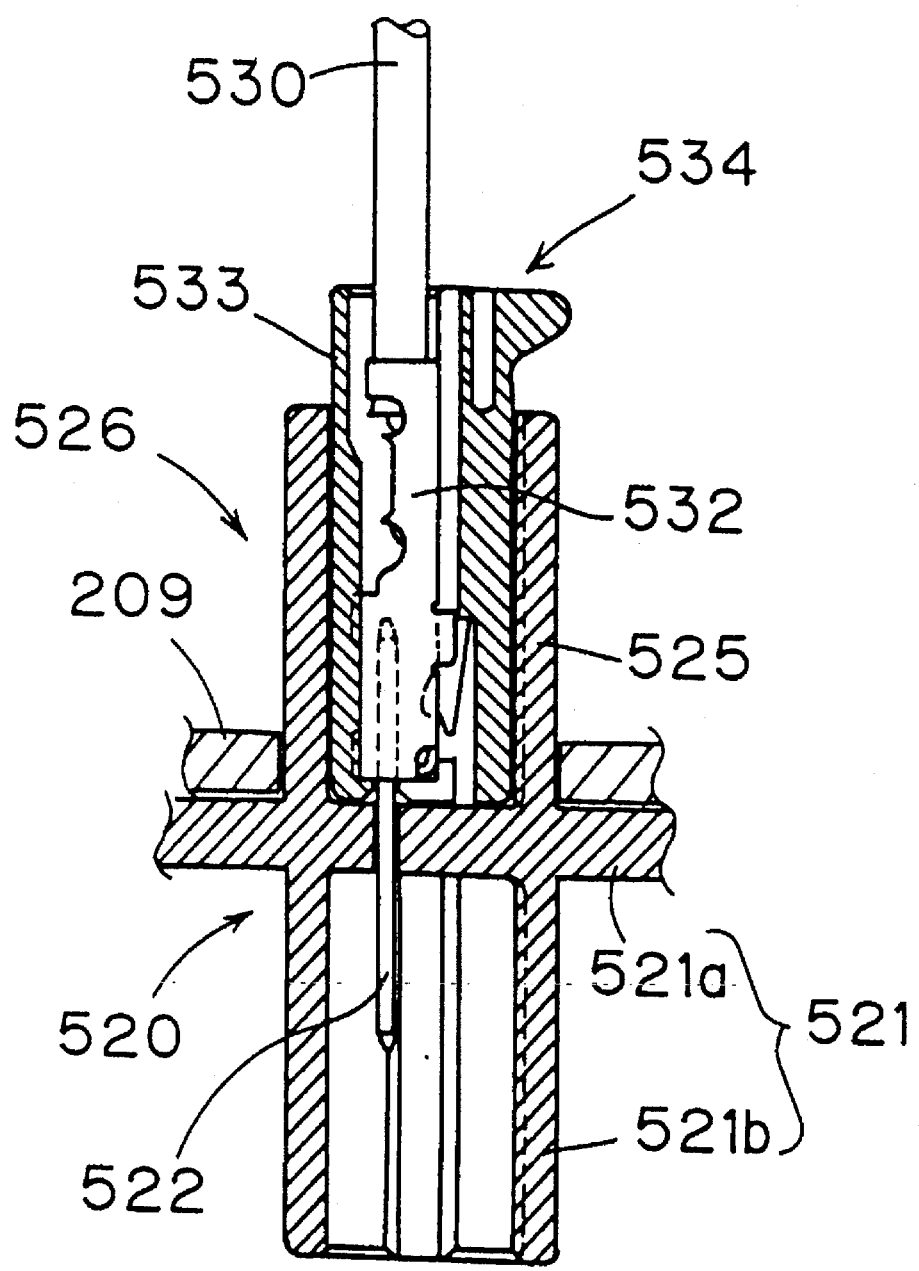

FIGS. 46A and 46B illustrate a modification of the connector 520 of FIGS. 43A and 43B.

In FIG. 46A, like reference numerals and characters are used to designate parts identical with or corresponding to those of FIG. 43A. The connector of FIG. 46A differs from the connector of FIG. 43A in that the connector portion 511a of the junction block 210 is replaced with a connector portion 534 including a connecting terminal 532 connected to the front end of the wiring harness 530 connected to the motor 205 and a housing 533 mounted to house the connecting terminal 532 and in that the flat terminal 522 and the wiring harness 530 are connected to each other by fitting the connector portion 534 into the connector portion 526 as shown in FIG. 46B.

Thus, the modification provides effects similar to those of the fourth preferred embodiment.

Figure 48:
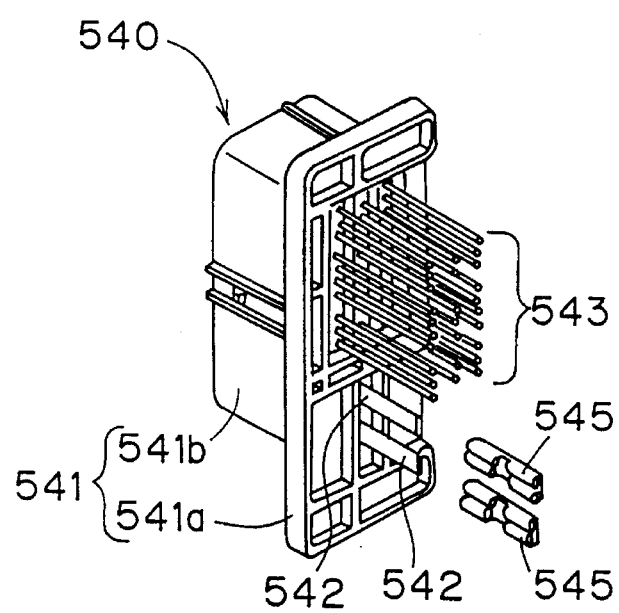
FIG. 48 is a perspective view of the connector of FIG. 47 as viewed from an angle different from that of FIG. 47.
Figure 49A:
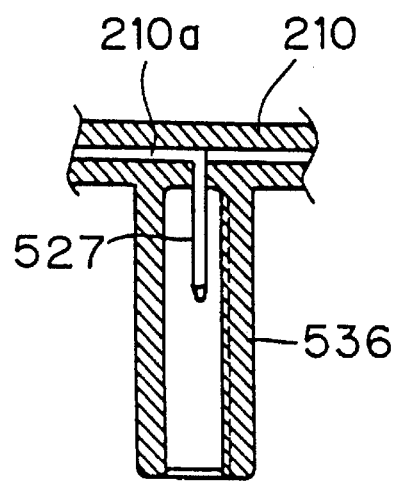
FIGS. 49A and 49B are sectional views of the connector of FIG. 47.
Figure 49A:
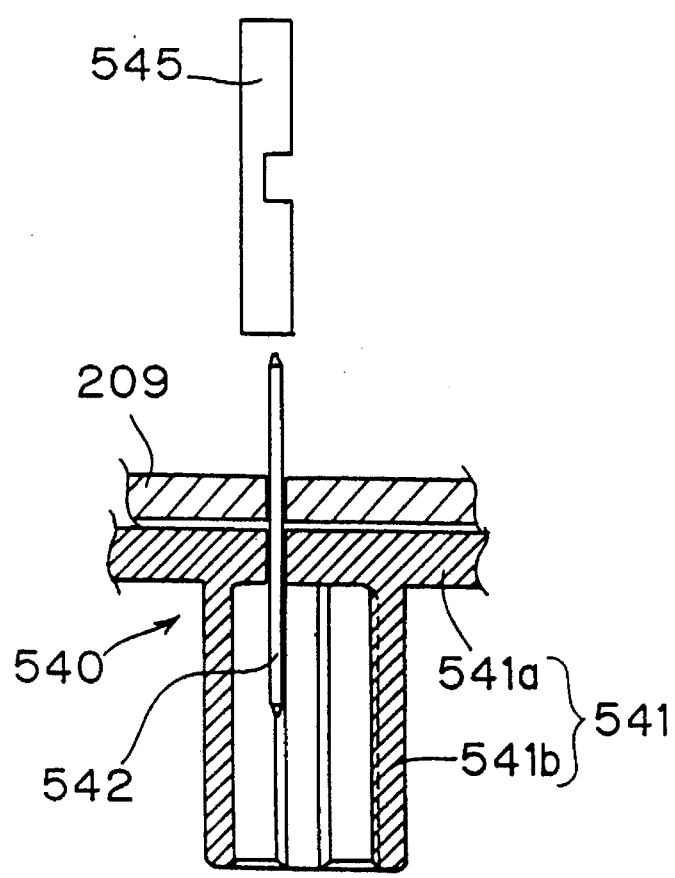
Figure 49B:
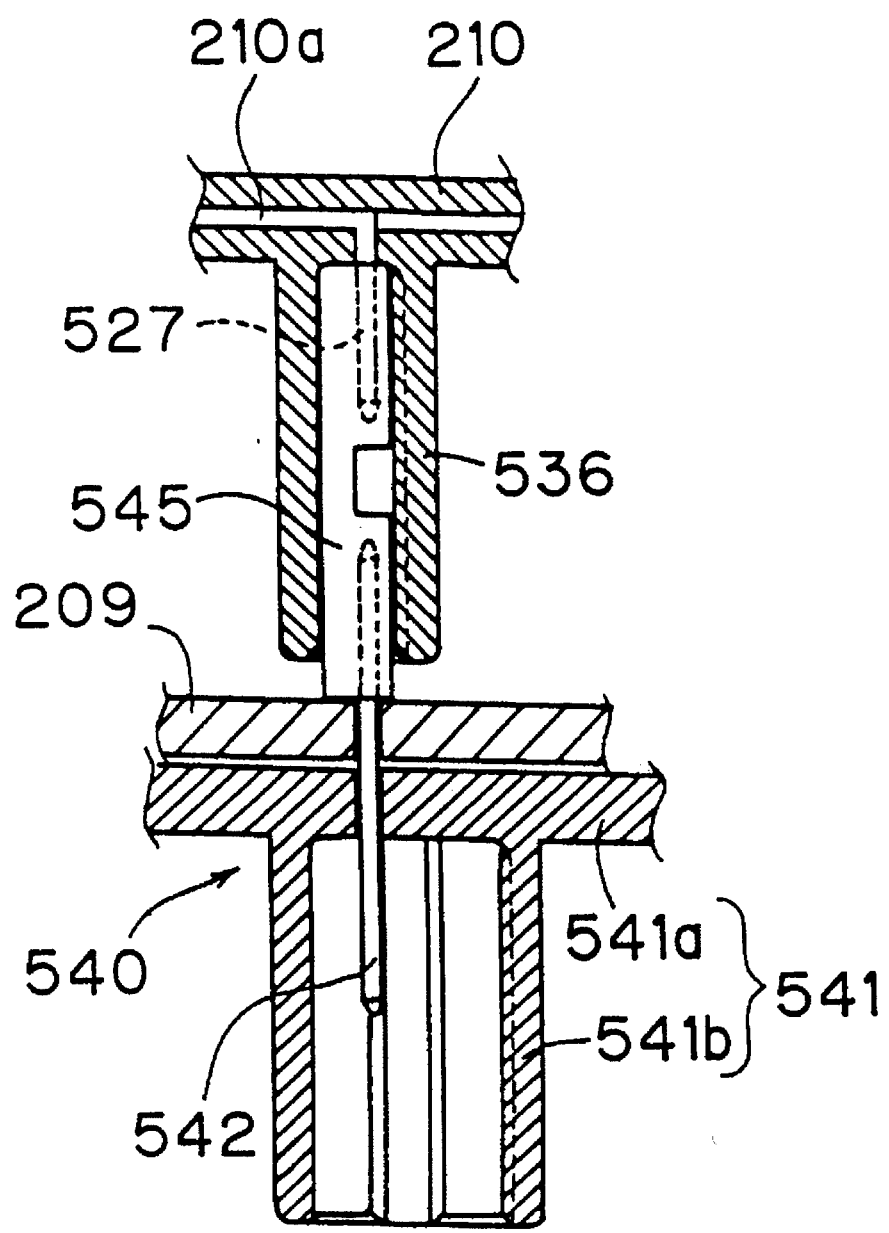
Figure 50:
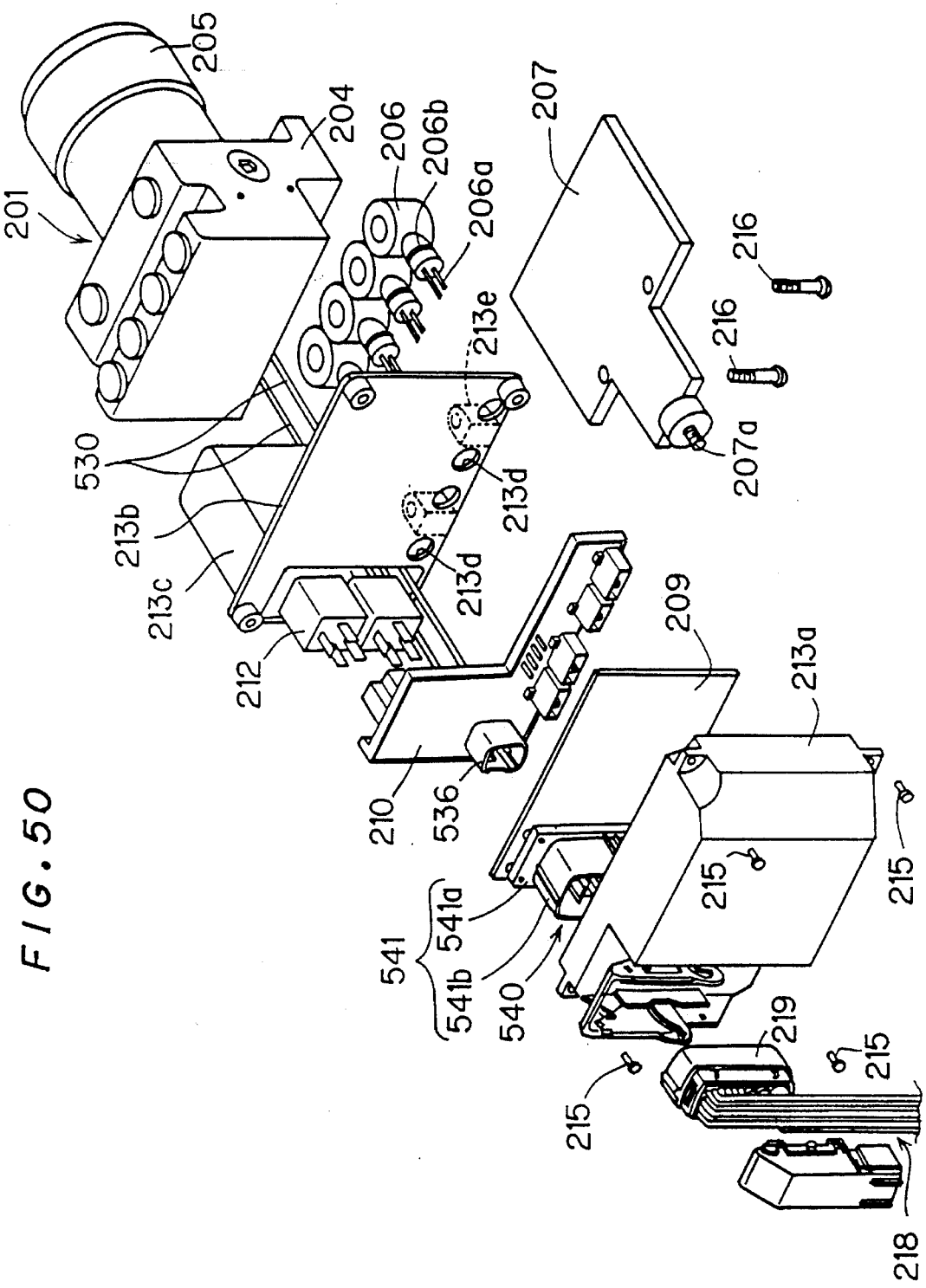
FIG. 50 is a perspective view of the unit integrated system employing the connector of FIG. 47.

FIGS. 47, 48, 49A, 49B illustrate another modification of the connector of the fourth preferred embodiment for use in the unit integrated system of FIG. 50.

The unit integrated system for the ABS employing this connector is substantially identical in construction with that of FIG. 45 except that the connector portion 511a of the junction block 210 of FIG. 45 is replaced with a rectangularly tubular housing 536 formed integrally with a lower left end portion of the front surface of the junction block 210 and housing the connecting terminal 527 formed by partially bending the bus bar 210a in the same manner as that of FIG. 43A and that a connector 540 different in construction from the connector 520 of FIG. 45 is fixed on the printed board 209 in place of the connector 520, as shown in FIGS. 50 and 49A.

Figure 47:
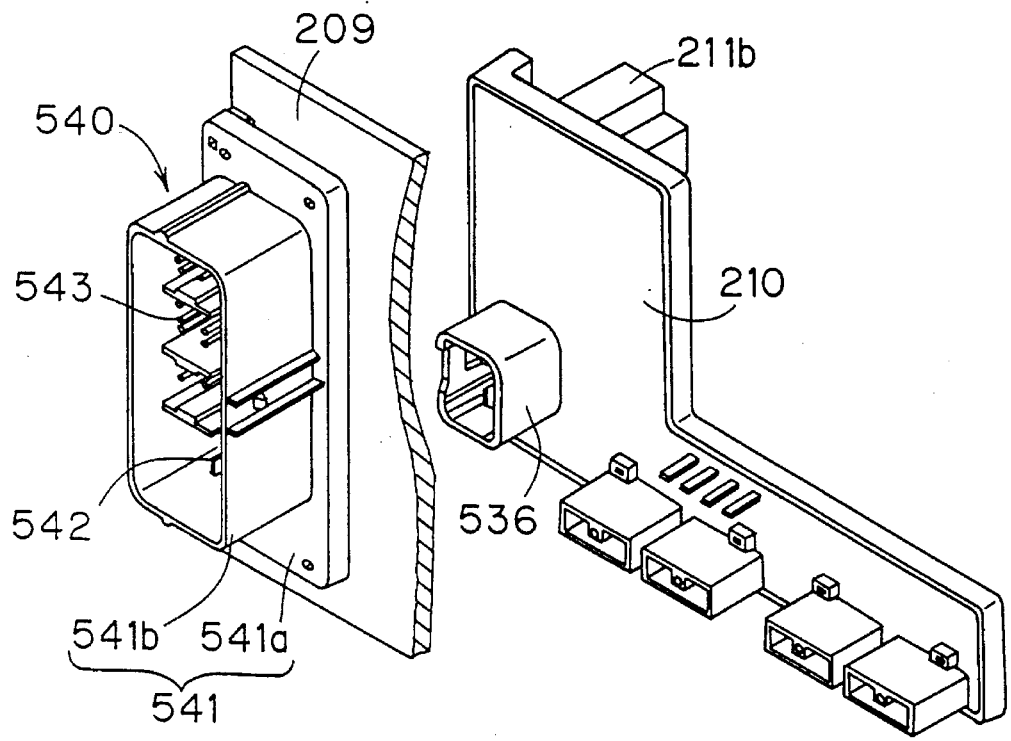
FIG. 47 is a perspective view of another modification of the connector of the fourth preferred embodiment.

Referring to FIGS. 47 and 48, the connector 540 comprises a connector housing 541 fixed on the printed board 209 and including a base plate 541a and a rectangularly tubular housing body 541b formed integrally with the front surface of the base plates 541a and to be fitted in the harness-side connector 219; two flat terminals 542 serving as a large-current connecting terminal housed in a lower portion of the connector housing 541 in juxtaposition and having a rear half directed outwardly of the connector housing 541; and a plurality of pin terminals 543 serving as a small-current connecting terminal housed in an upper portion of the connector housing 541 and having a rear half directed outwardly of the connector housing 541. The portions of the pin terminals 543 which are directed outwardly of the connector housing 541 are electrically connected to the components mounted on the printed board 209 when the connector housing 541 is fixed on the printed board 209.

Referring to FIG. 49A, the front portion of a relay terminal 545 having the configuration shown in FIG. 48 is fitted on each portion of the flat terminals 542 which is directed outwardly of the connector housing 541. In the housing 536, as shown in FIG. 49B, the rear portion of the relay terminal 545 and the connecting terminal 527 are electrically connected to each other and, accordingly, the bus bar 210a and the flat terminal 542 are connected to each other through the relay terminal 545. The flat terminals 542 connected to the bus bars 210a are further connected to the motor and the like through the wiring harnesses 530 (FIG. 50).

Similar to the above stated connector 520, the pin terminals 543 are connected to various sensors through the harness-side connector 219, and the flat terminals 542 at its first end inside the connector housing 541 are connected to the battery through the harness-side connector 219.

Therefore, the connector 540 provides effects similar to those of the connector 520.

The relay terminals 545 of the connector 540 may connect the wiring harnesses and the flat terminals 542.

Although the flat terminals form the first terminal group and the pin terminals form the second terminal in the fourth preferred embodiment, the present invention is not so limited.

The arrangement of the terminal groups for large current and small current within the housing is not limited to that of the fourth preferred embodiment.

The present invention is not limited to the unit integrated system for the ABS but is applicable to general various systems such as the traction control system (TCS).

Figure 55:
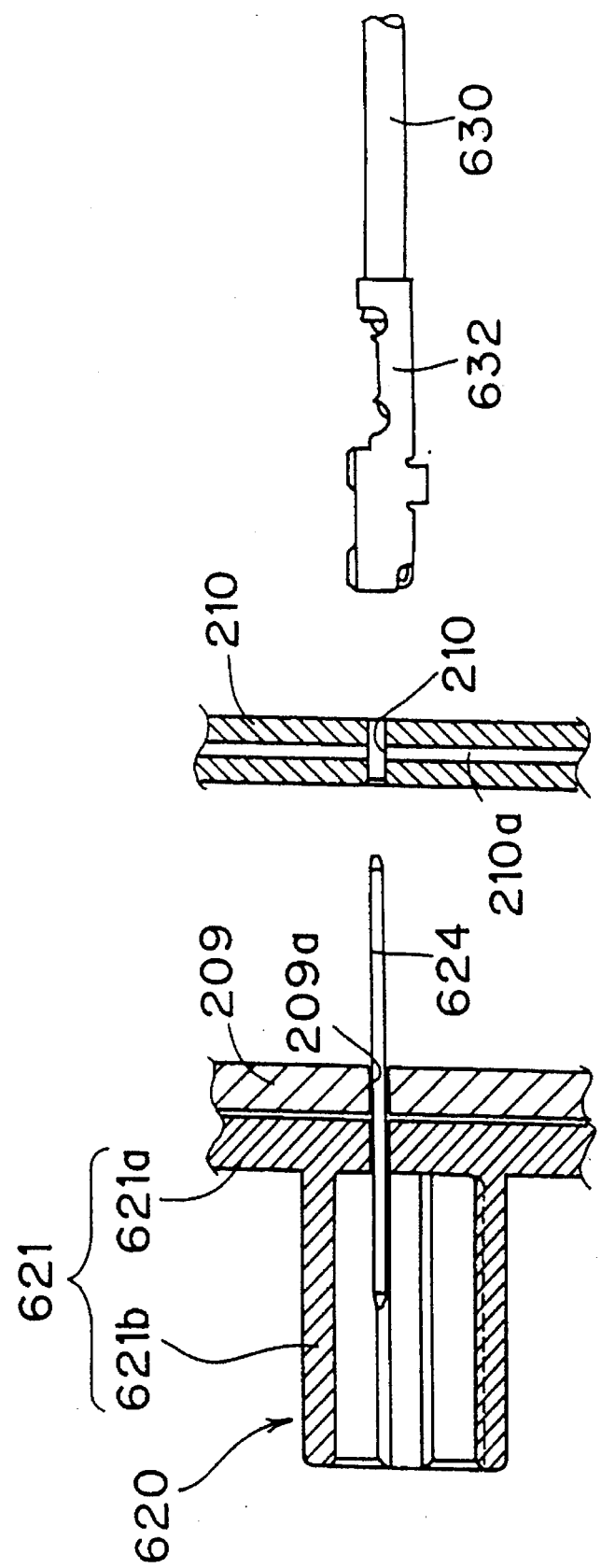
FIG. 55 is a sectional view of a modification of the connector of the fifth preferred embodiment.
Figure 56:
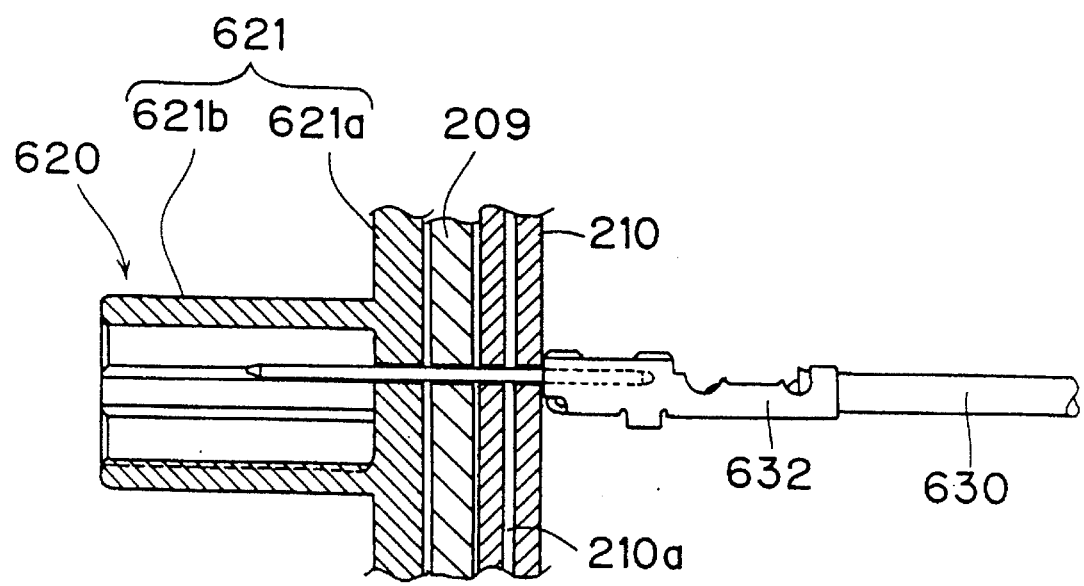
FIG. 56 is a sectional view of the connector of FIG. 55.
Figure 57:
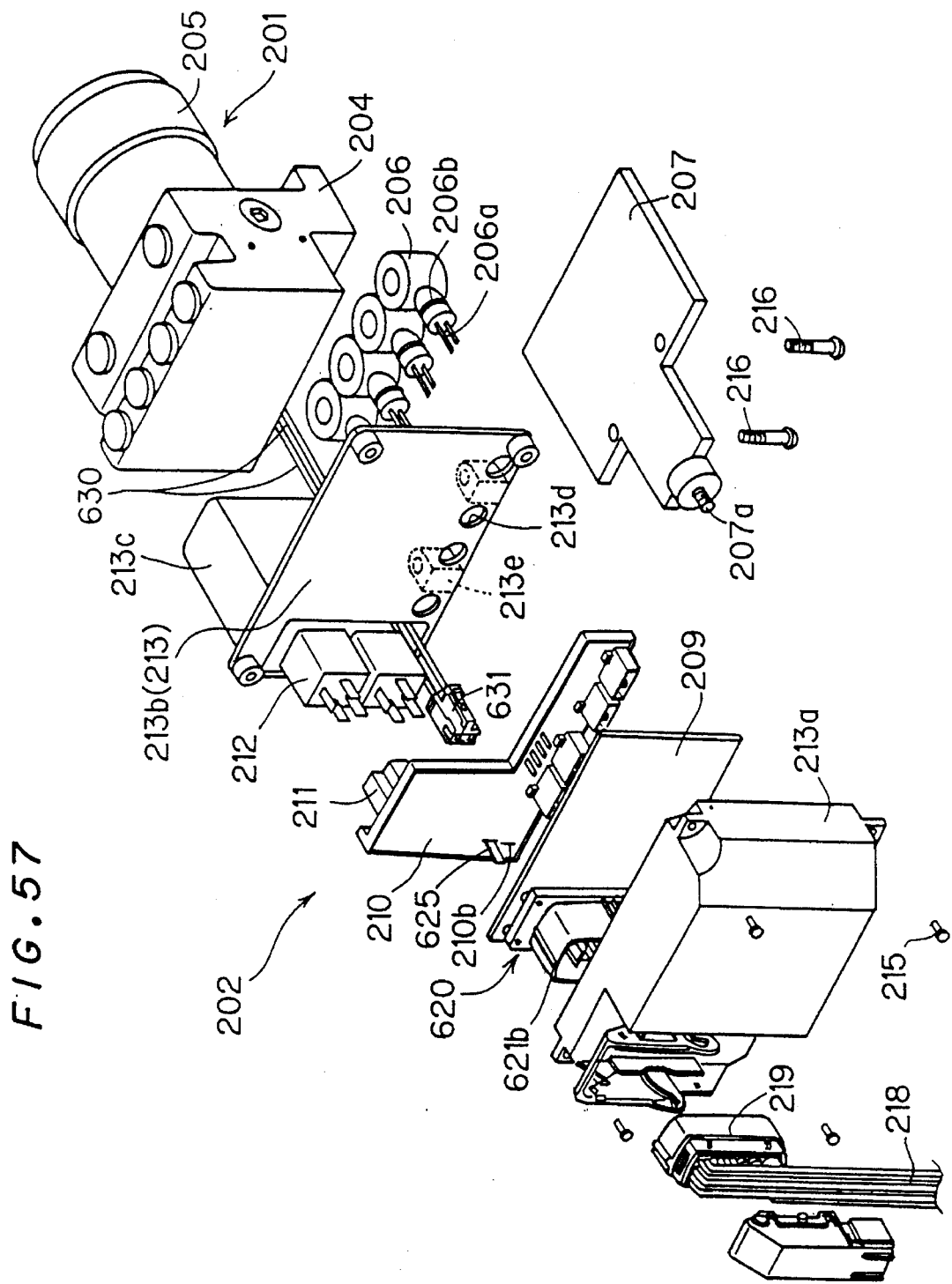
FIG. 57 is a perspective view of the unit integrated system employing the connector of FIG. 51.
Figure 58:
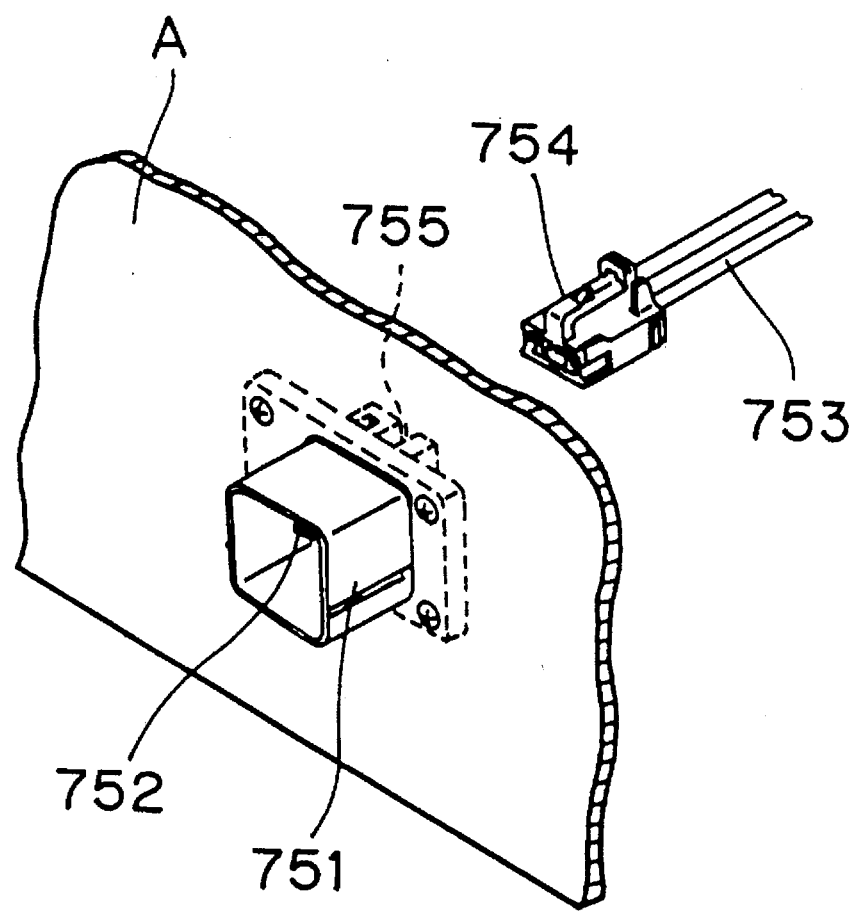
FIG. 58 is a perspective view of a prior art connector.

FIGS. 51 to 56 illustrate a fifth preferred embodiment of the connector for use in the unit integrated system of FIG. 57. The unit integrated system of FIG. 57 is substantially identical in construction with the unit integrated system of FIG. 29. Like reference numerals and characters are used to designate identical parts, and the description thereof will be omitted herein.

Figure 51:
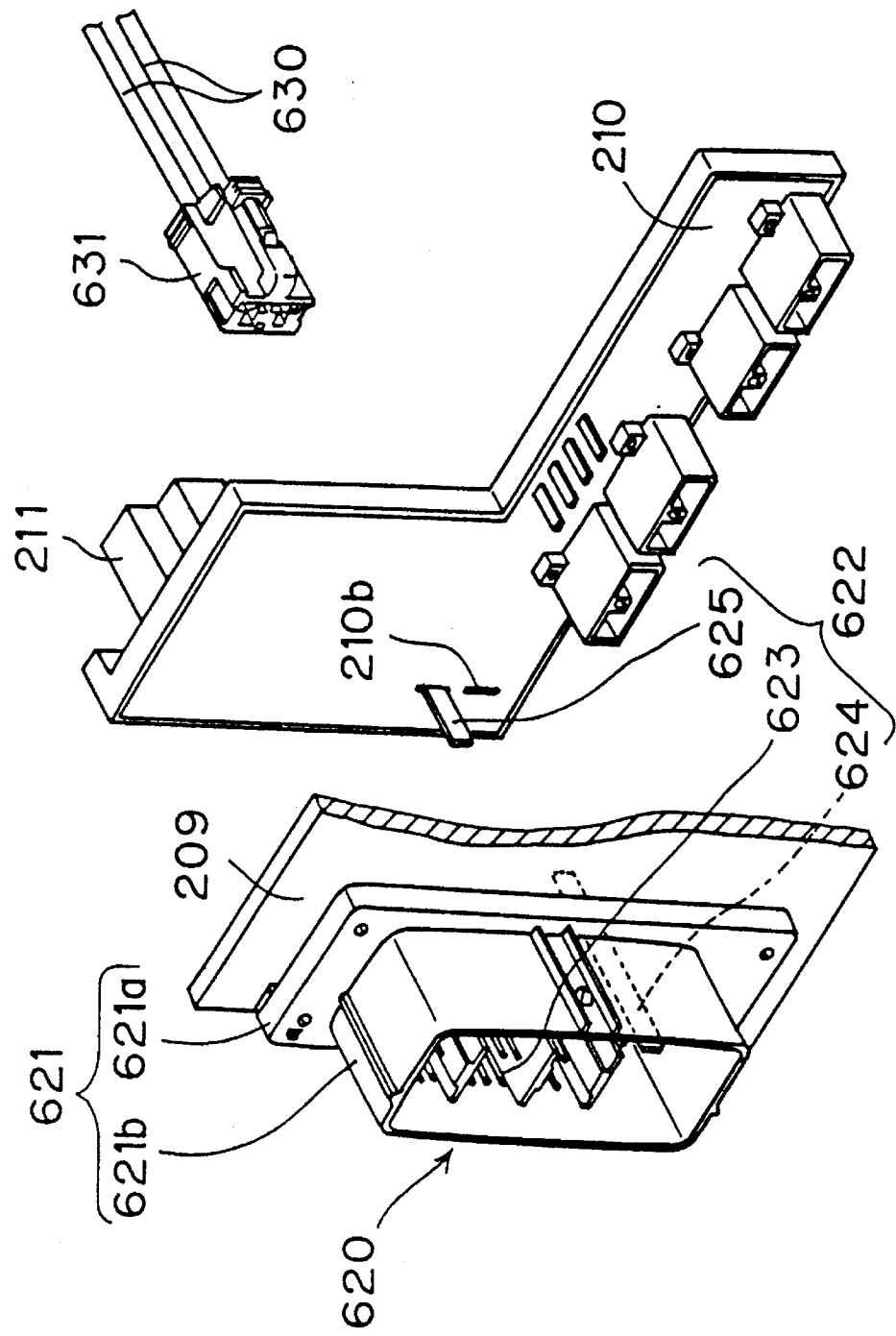
FIG. 51 is a perspective view of the connector of a fifth preferred embodiment according to the present invention.
Figure 52:
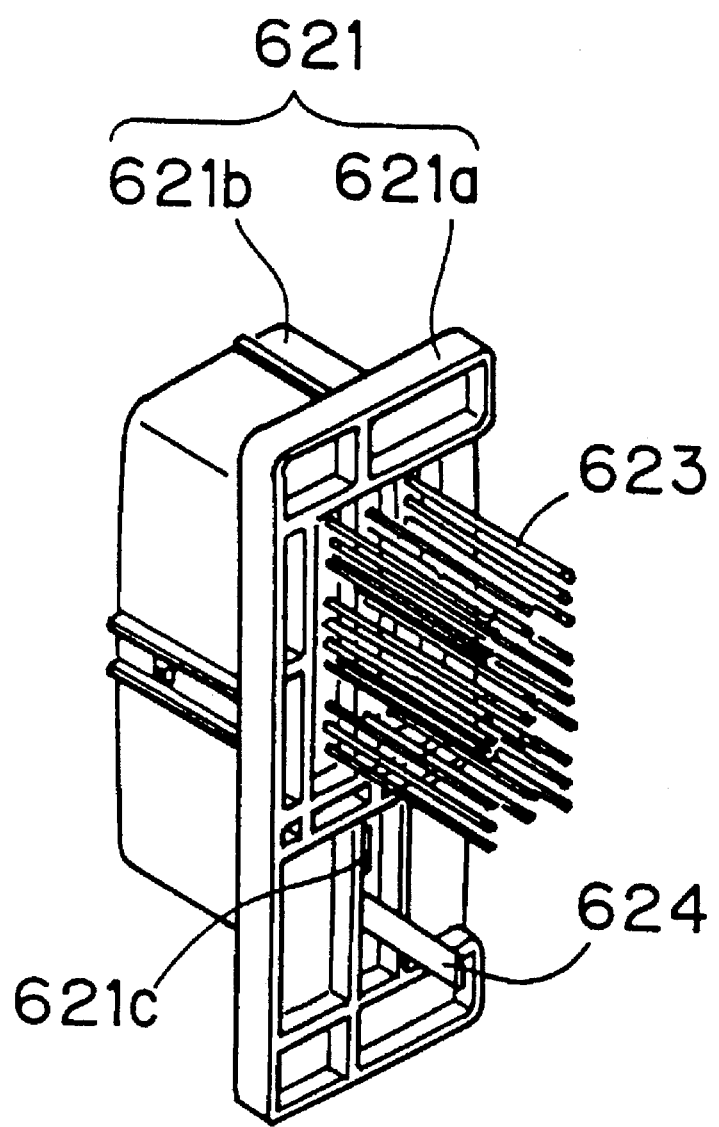
FIG. 52 is a perspective view of the connector of FIG. 51 as viewed from an angle different from that of FIG. 51.

Referring to FIGS. 51 and 52, a connector 620 comprises a connector housing 621 including a base plate 621 and a rectangularly tubular housing body 621b to be fitted in the harness-side connector 219; and a connecting terminal 622. The base plate 621a is fixed on the printed board 209.

The connecting terminal 622 includes a multiplicity of pin terminals 623 connected to the printed board 209; a flat terminal 624 connected directly to the motor 205 of the actuator; and a flat terminal 625 for connection to the junction block 210.

The pin terminals 623 are fixed to the base plate 621a in such a manner as to pass through the base plate 621a to project therefrom toward the interior of the housing body 621b and toward the printed board 209 as shown in FIGS. 51 and 52. The portions of the pin terminals 623 projecting toward the printed board 209 pass through the printed board 209 and are connected to the circuit mounted on the rear surface (the opposite side from the surface on which the connector 620 is formed) of the printed board 209.

Figure 53:
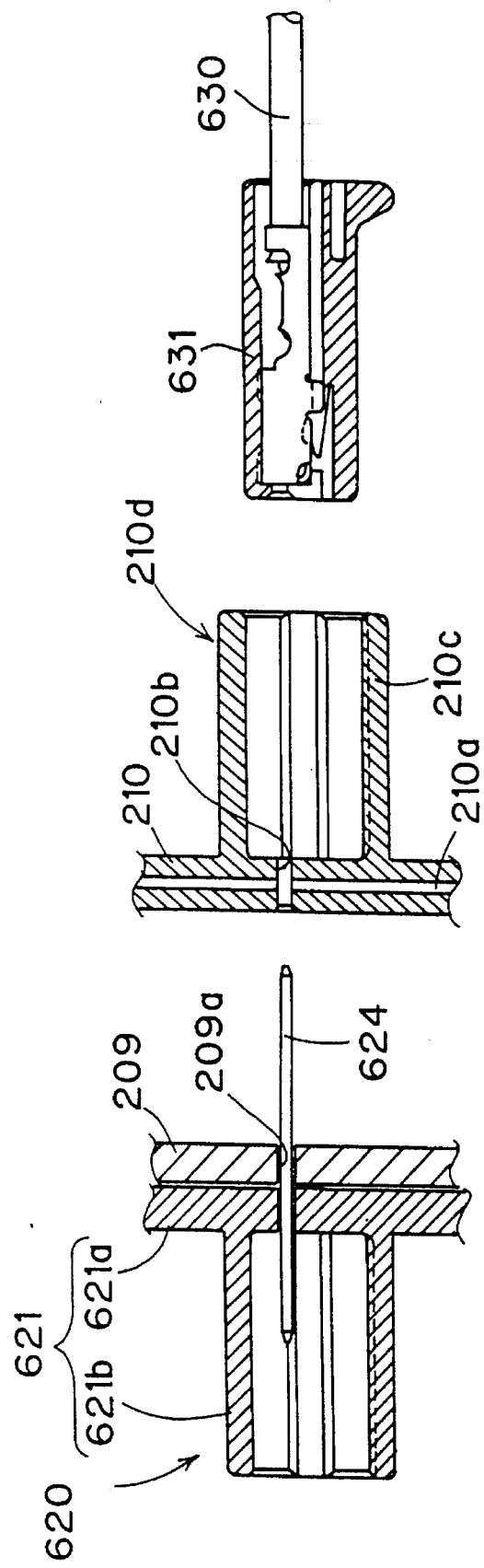
FIGS. 53 and 54 are sectional views of the connector of the fifth preferred embodiment.

Similar to the pin terminals 623, the flat terminal 624 is fixed to the base plate 621a in such a manner that one end thereof projects toward the interior of the housing body 621b and the other end thereof projects toward the printed board 209. As shown in FIG. 53, the other end of the flat terminal 624 is further inserted through the through hole 209a of the printed board 209 to project from the surface of the printed board 209 opposite from the surface thereof on which the connector 620 is formed.

The flat terminal 625 is a partial projection of the bus bar 210a of the junction block 210, and is inserted through a through hole 621c (FIG. 52) of the printed board 209 and base plate 621a and into the housing body 621b, thereby being used as a terminal.

Figure 54:
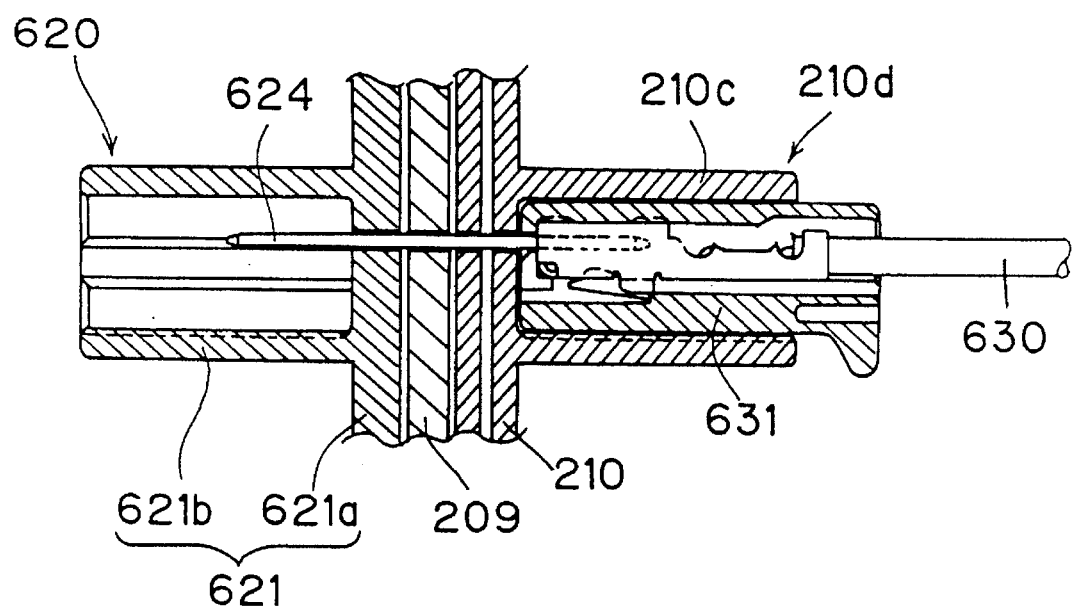

Referring to FIGS. 53 and 54, the junction block 210 includes a through hole 210b formed under the projecting flat terminal 625 for receiving the flat terminal 624. On opposite surface of the junction block 210, a part of the bus bar 210a projects as a terminal in corresponding relation to the flat terminal 625, and a housing 210c is formed to enclose the terminal and the through hole 210b. The terminal projecting in the housing 210c and the flat terminal 625 are interconnected through a switch portion of the relay 212 within the junction block 210.

As shown in FIG. 54, the flat terminal 624 is inserted through the through hole 210b into the housing 210c whereas the flat terminal 625 is inserted through the through hole 621c of the printed board 209 and base plate 621a into the housing 621b, thereby to join the printed board 209 and the junction block 210 together. This completes the connector 620 and forms a female connector portion 210d in the junction block 210 by the housing 210c and the flat terminal 624. The female connector portion 210d is permitted to be connected to a male connector portion 631 provided at the terminal of a pair of power supply cables 630 connected to the motor 205. In this case, the flat terminal 624 passes through the junction block 210 without contacting the bus bar 210c of the junction block 210.

The power supply cables 630 and the flat terminal 624 are not necessarily connector-connected as above described. For example, as shown in FIGS. 55 and 56, a connecting terminal 632 of the power supply cables 630 may be connected to the exposed, projecting flat terminal 624 without providing the housing 210c in the junction block 210.

While the invention has been shown and described in detail, the foregoing description is in all aspects illustrative and not restrictive. It is therefore understood that numerous modifications and variations can be devised without departing from the scope of the invention.

What is claimed is:

1. A connector for a device connecting an actuator for a hydraulic unit and an electronic control having a control circuit to the exterior of said device, said hydraulic unit and said electronic control being integrated, said connector comprising a first terminal group for a large current in electrical contact with a power line whereby power is supplied to said actuator, said second terminal group for a small current which is smaller than said large current, said second terminal group electrically connected to components of said electronic control, a connector housing comprising a base plate carrying said first terminal group and said second terminal group, and a tubular housing body enclosing said first terminal group and said second terminal group, a junction block, said first terminal group being connected to said actuator through said junction block, and said second terminal group being connected to said components through said junction block without electrical contact with said junction block.

2. The connector of claim 1, wherein said connector housing includes a connector portion formed on a surface of said base plate on which said tubular housing body is not formed, and said connector portion includes a tubular housing formed integrally with said base plate and enclosing a portion of said first or second terminal group which is directed outwardly of said connector housing.

3. The connector of claim 1, wherein a relay terminal is provided in at least a part of a portion of said first or second terminal group which is directed outwardly of said connector housing and which projects from a surface of said base plate on which said tubular housing body is not formed.

4. The connector of claim 1, wherein said first terminal group is electrically connected to said actuator through a wiring harness, and at least some terminals of said first terminal group include terminals electrically connected to an end of said wiring harness.

5. The connector of claim 4, wherein said connector housing includes a terminal receiving chamber formed on a surface of said base plate on which said tubular housing body is not formed for housing and holding the terminals electrically connected to the end of said wiring harness.

6. The connector of claim 4, wherein the terminals electrically connected to the end of said wring harness are formed by insert molding on said base plate.

7. The connector of claim 1, wherein said first terminal group includes a part of a bus bar of said junction block.

* * * * *